(12) United States Patent
Cohan

(10) Patent No.: US 8,046,295 B1
(45) Date of Patent: Oct. 25, 2011

(54) PRIVATE CAPITAL MANAGEMENT SYSTEM AND METHOD

(75) Inventor: James Anthony Cohan, Tiburon, CA (US)

(73) Assignee: AllRounds, Inc., Tiburon, CA (US)

( * ) Notice: Subject to any disclaimer, the term of this patent is extended or adjusted under 35 U.S.C. 154(b) by 607 days.

(21) Appl. No.: 12/036,160

(22) Filed: Feb. 22, 2008

Related U.S. Application Data

(60) Provisional application No. 60/964,341, filed on Aug. 10, 2007.

(51) Int. Cl.
*G06Q 40/00* (2006.01)
(52) U.S. Cl. .......................................... 705/37; 705/38
(58) Field of Classification Search .............. 705/37–38
See application file for complete search history.

(56) References Cited

U.S. PATENT DOCUMENTS

| | | | |
|---|---|---|---|
| 6,014,643 A | 1/2000 | Minton | |
| 6,161,099 A | 12/2000 | Harrington et al. | |
| 7,146,335 B2 | 12/2006 | Rose | |
| 7,242,669 B2 | 7/2007 | Bundy et al. | |
| 7,447,654 B2 | 11/2008 | Ben-Levy et al. | |
| 7,475,046 B1 | 1/2009 | Foley et al. | |
| 7,676,455 B2 | 3/2010 | Ursitti et al. | |
| 7,685,048 B1 | 3/2010 | Hausman et al. | |
| 7,689,495 B1 | 3/2010 | Kim et al. | |
| 7,698,188 B2 | 4/2010 | Hollas et al. | |
| 7,774,247 B2 | 8/2010 | Hausman et al. | |
| 7,778,913 B2 | 8/2010 | Greene et al. | |
| 7,822,672 B2 | 10/2010 | Hausman | |
| 2002/0042765 A1 | 4/2002 | Dawson | |
| 2002/0111896 A1 | 8/2002 | Ben-Levy et al. | |
| 2003/0028467 A1 | 2/2003 | Sanborn | |
| 2004/0143525 A1 | 7/2004 | Nishimaki | |
| 2004/0148248 A1 | 7/2004 | Allen et al. | |
| 2007/0100724 A1 | 5/2007 | Hollas et al. | |
| 2008/0109381 A1 | 5/2008 | Gottschalg | |
| 2009/0037236 A1* | 2/2009 | Miller et al. ............... 705/7 |

OTHER PUBLICATIONS

"Equity Edge 7", E*Trade Financial Corporate Services, 2006, 4 pages.
"Round1 Introduction & Product Overview", Round1, Inc., 2001, 32 pages.
"Round1 Unveils Vision, Product for Private Capital Markets at DEMO 2001", Feb. 12, 2001, http://www2.prnewswire.com/cgi-bin/stories.pl?ACCT=104&STORY=/www/story/02-12-2001/0001425192&EDATE=, 2 pages.
"Round1 Launches Family of Products and Services for Private Capital Market.", Feb. 12, 2001, http://www.thefreelibrary.com/Round1+Launches+Family+of+Products+and+Services+for+Private+Capital...-a070354507, 4 pages.

* cited by examiner

*Primary Examiner* — Thu Thao Havan
(74) *Attorney, Agent, or Firm* — Foley & Lardner LLP

(57) ABSTRACT

A computer-implemented data processing system comprises capital management logic accessible to a plurality of users by way of a communication network. The plurality of users include companies, institutional investors, individual investors, and exchanges. The capital management logic is configured to facilitate pre-financing and post-financing interactions between the companies, the institutional investors, the individual investors, and the exchanges throughout one or more rounds of financing of the companies.

20 Claims, 49 Drawing Sheets

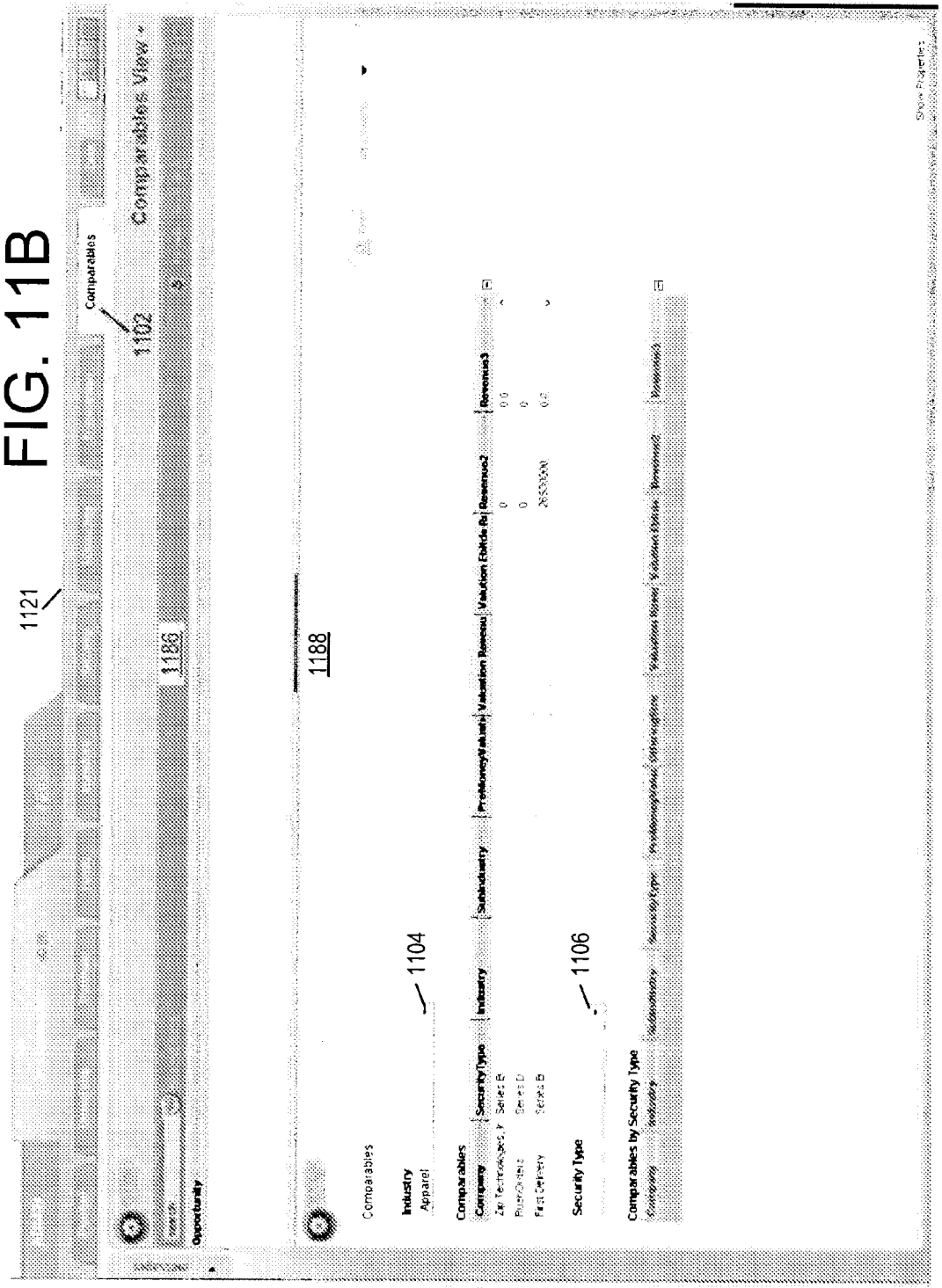

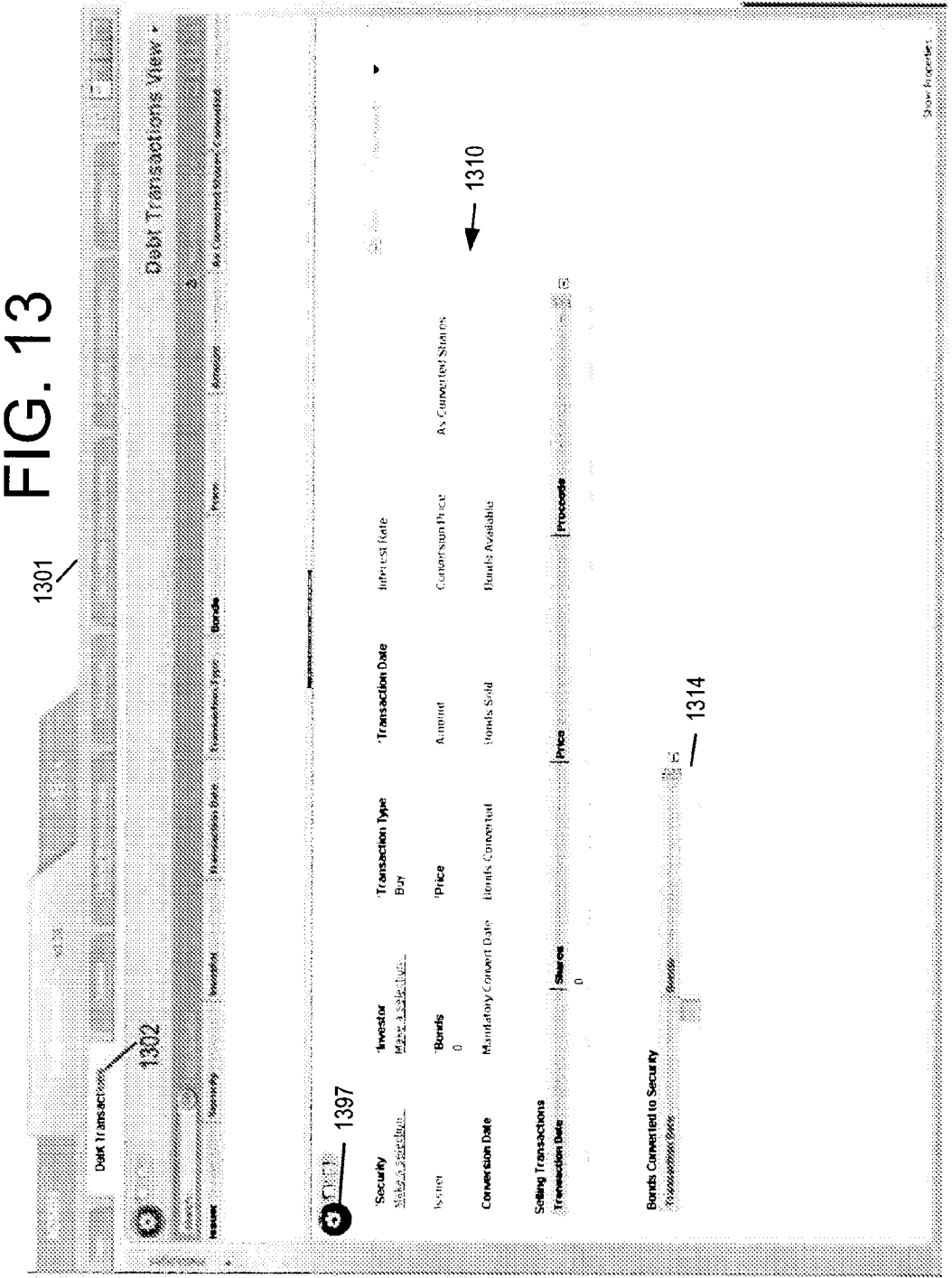

PRIVATE CAPITAL MANAGEMENT SYSTEM AND METHOD

CROSS-REFERENCE TO RELATED PATENT APPLICATIONS

The present application claims priority to U.S. Prov. Ser. No. 60/964,341, entitled "Private Capital Management System," filed Aug. 10, 2007, hereby incorporated by reference in its entirety.

BACKGROUND OF THE INVENTION

The present disclosure relates generally to the field of financial management systems. More particularly, this disclosure relates to a multi-faceted capital management system that facilitates interactions among investors, companies, and exchanges and/or other secondary stakeholders in private capital markets.

The public capital markets have been made efficient by frictionless trading mechanisms, continuous valuation opportunities, and transparency of information that underpins the value of publicly traded securities. In contrast, the private capital markets lack a standard process for exchanging securities, transparency of information, continuous valuation opportunities and a critical mass of investors valuing opportunities. For example, without a standard, efficient process for exchanging securities, transactions occur relatively infrequently. When such transactions do occur, information about such transactions is not widely available, resulting in a lack of transparency. These features of the private capital markets result in deadweight loss and uncaptured value. A private capital management system that facilitates interactions among investors, companies, and exchanges and/or other secondary stakeholders in private capital markets would help eliminate such deadweight loss and uncaptured value.

SUMMARY OF THE INVENTION

According to an example embodiment, a computer-implemented data processing system comprises capital management logic accessible to a plurality of users by way of a communication network. The plurality of users include companies, institutional investors, individual investors, and exchanges. The capital management logic is configured to facilitate pre-financing and post-financing interactions between the companies, the institutional investors, the individual investors, and the exchanges throughout one or more rounds of financing of the companies.

According to an example embodiment, a computer-implemented data processing system comprises capital management logic accessible to a plurality of users by way of a communication network. The plurality of users include companies and investors in the companies. The capital management logic is configured to facilitate transactions between the companies and the investors including issuance of securities by the companies. The securities including debt securities and equity securities. The capital management logic is further configured to facilitate transactions between the investors including secondary market trading of the securities.

BRIEF DESCRIPTION OF THE DRAWINGS

FIGS. 3A-3C are a screen display provided in connection with a pipeline tab according to an example embodiment.

FIGS. 4A-4B are a screen display provided in connection with an ownership tab according to an example embodiment.

Figure 7A:
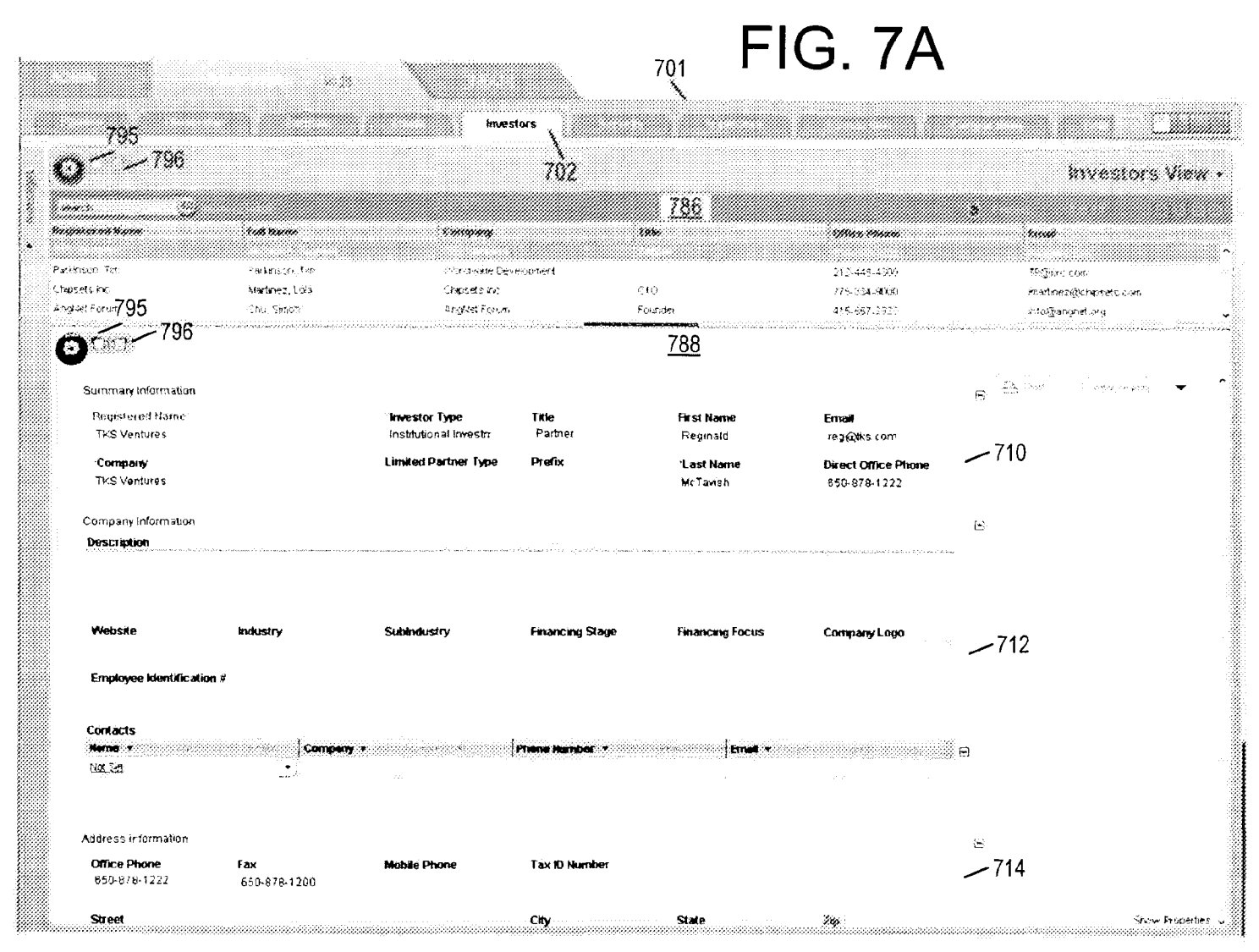
Figure 7B:
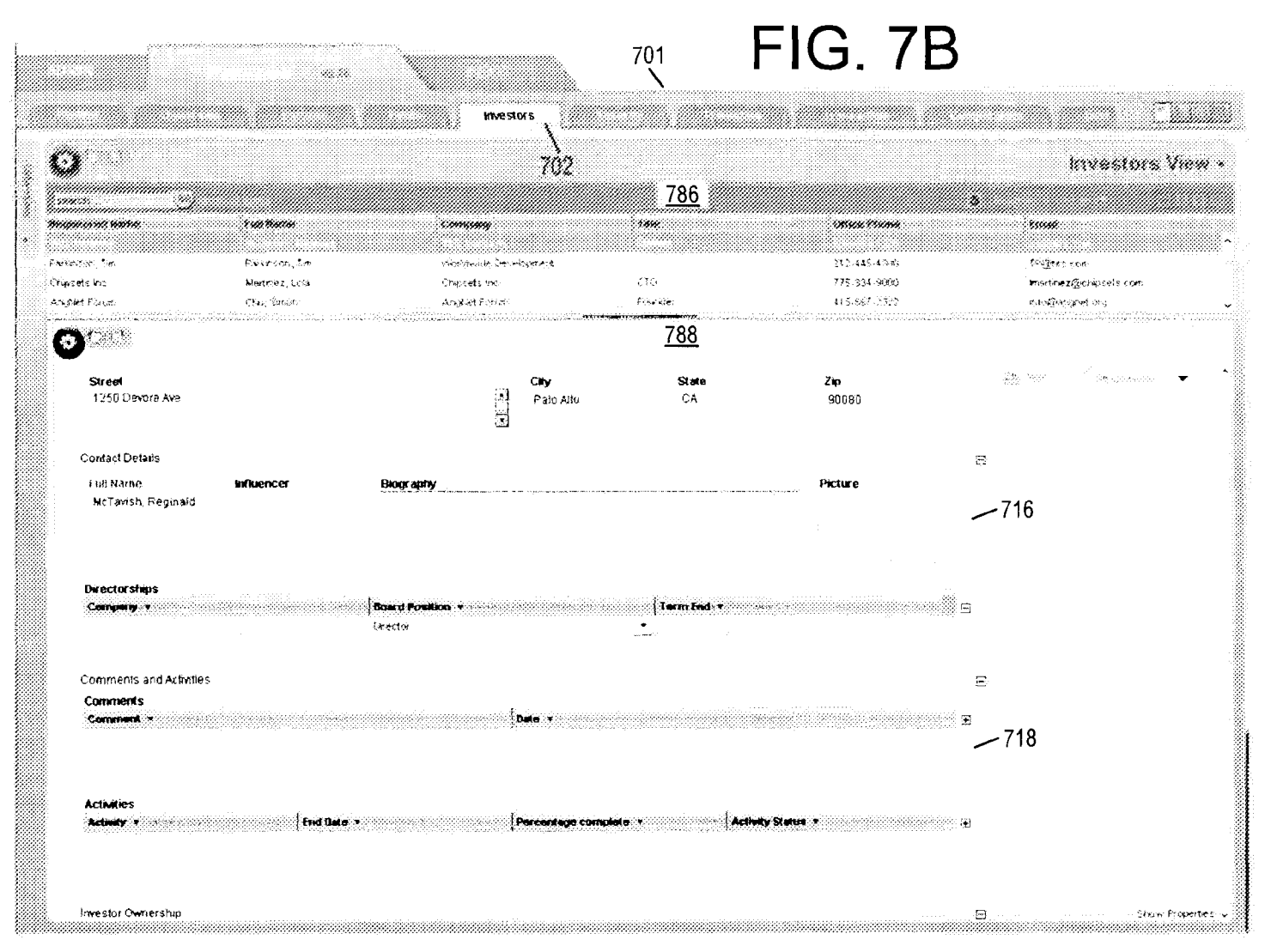
Figure 7D:
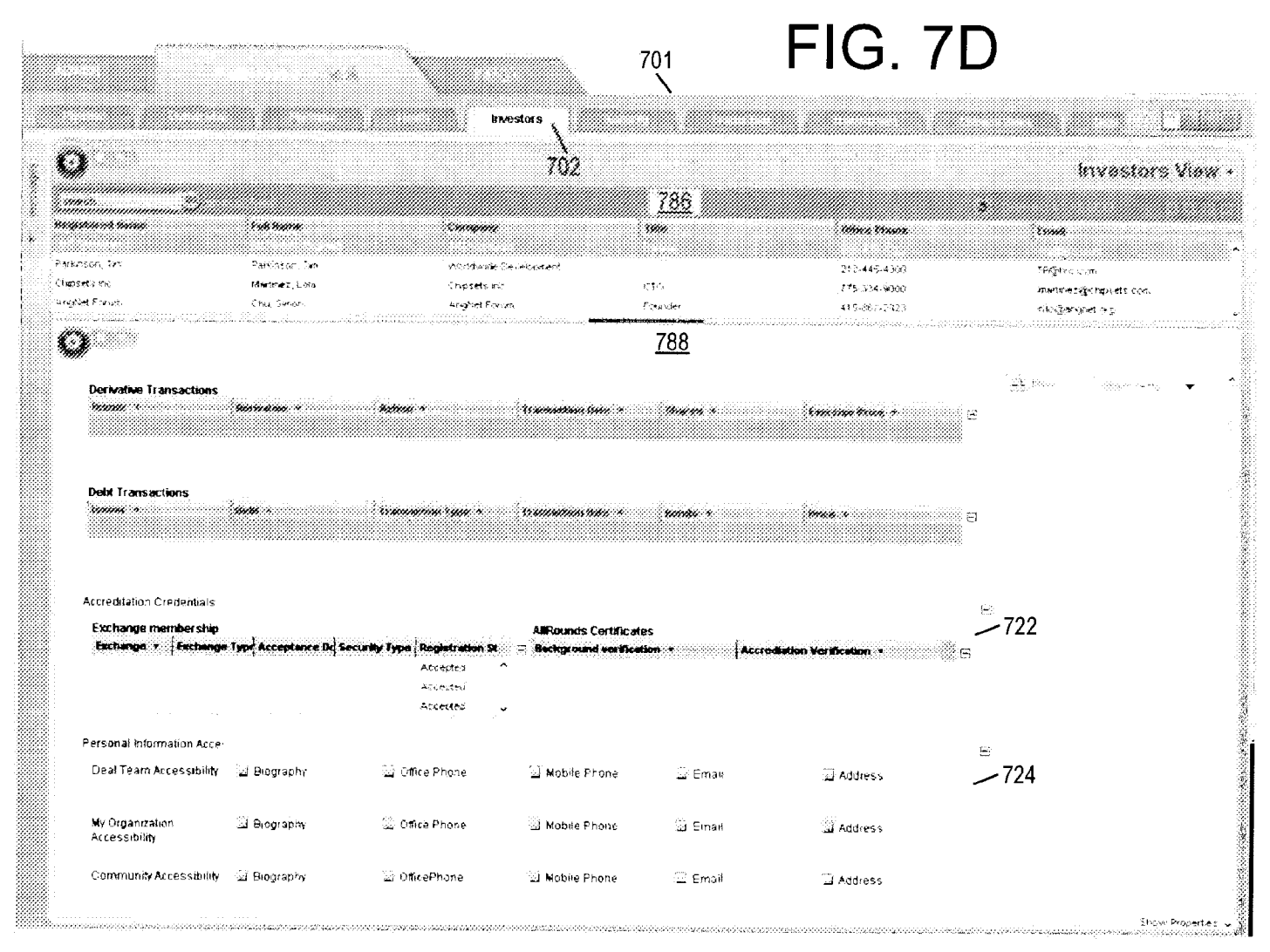

FIGS. 7A-7D are a screen display provided in connection with an investors tab according to an example embodiment.

FIGS. 8A-8B are a screen display provided in connection with a security tab according to an example embodiment.

FIGS. 9A-9D are screen displays provided in connection with a traunches tab according to an example embodiment.

FIGS. 11A-11C are a screen display provided in connection with a comparables tab according to an example embodiment.

FIG. 13 is a screen display provided in connection with a debt transactions tab according to an example embodiment.

FIG. 14 is a screen display provided in connection with an options tab according to an example embodiment.

FIGS. 15A-15B are a screen display provided in connection with an option transactions tab according to an example embodiment.

FIG. 17 is a screen display provided in connection with a derivative transactions tab according to an example embodiment.

FIG. 27 is a screen display provided in connection with a investor registrations tab according to an example embodiment.

DETAILED DESCRIPTION OF THE PREFERRED EMBODIMENTS

Figure 1:
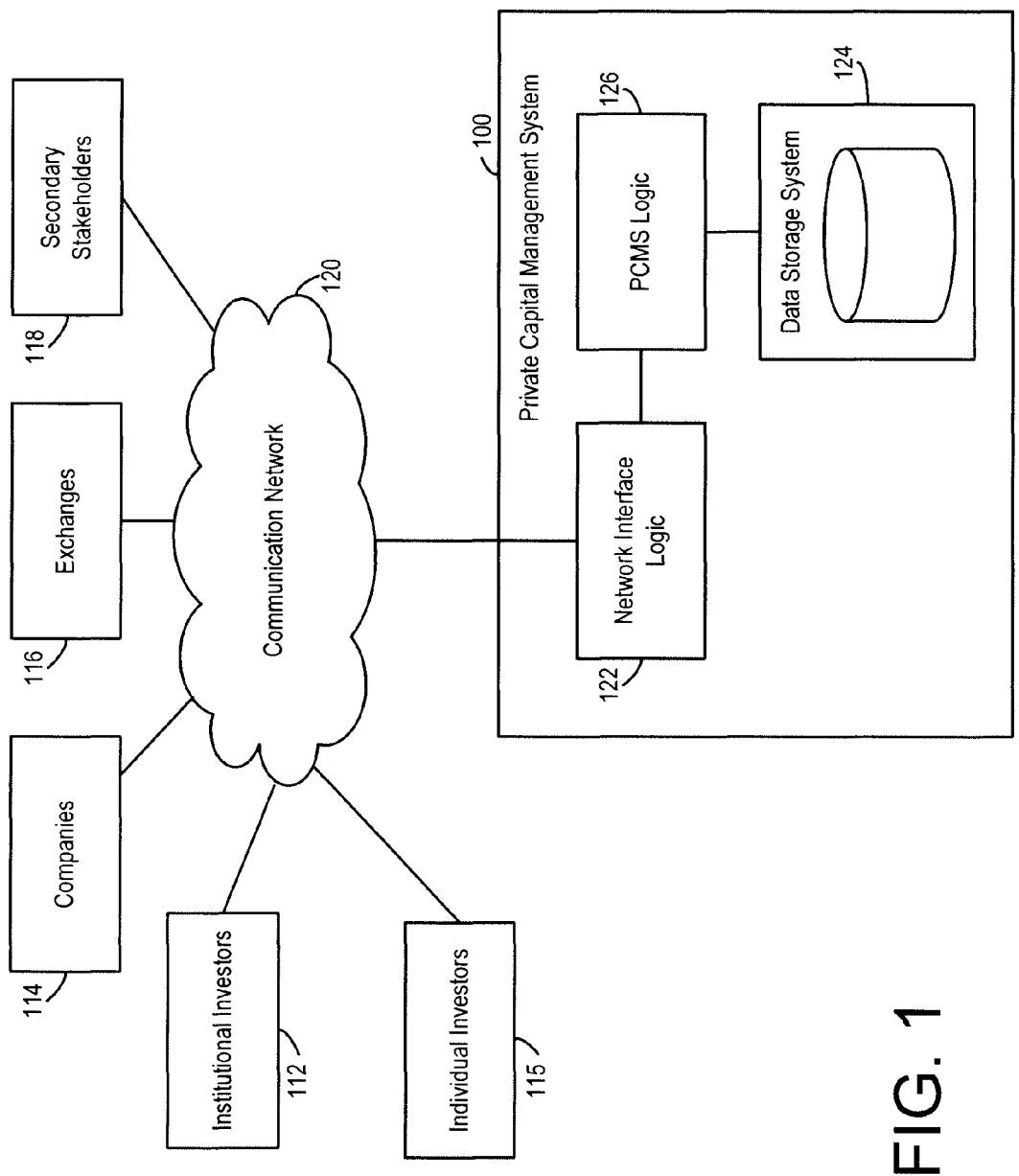
FIG. 1 is a schematic overview of a private capital management in communication with various stakeholders system according an example embodiment.

Referring to FIG. 1, a private capital management system 100 according to an example embodiment is shown. The capital management system 100 facilitates interactions among investors, companies, exchanges, and secondary stakeholders in order to enable the exchange of data, communications, transactions, analysis, and so on.

Thus, as shown in FIG. 1, system 100 is accessible by computers 112-118 associated with different ones of such entities. Computers 112-118 may access system 100 by way of a network 120, such as the Internet.

System 100 may be implemented on one or more host computers. System 100 includes network interface logic 122, data storage system 124, PCMS logic 126. Network interface logic provides a user interface for system 100 that is accessible by computers 112-118 through network 120, e.g., web pages that are accessible through the Internet. Data storage system 124 stores data regarding companies, investors, and so on. PCMS logic 126 comprises logic (e.g., stored program code executed by one or more computer processors) that provides underlying operations associated with system 100, such as permitting users to view, create, and edit data stored in data storage system 100 in accordance with respective user roles.

In an example embodiment, PCMS logic 126 provides tools that facilitate the business workflow of companies, investors, and exchanges participating in the private equity and debt markets. Such tools may facilitate the performance of tasks throughout the private capital life cycle, such as deal sourcing and relationship management, deal flow management, project management (e.g., due diligence), ownership management, managing capitalization tables (including preferred stock, common stock, employee stock options, debt, convertible debt, and so on), portfolio analytics, market analytics, partnership accounting, investor and other stakeholder relations, and so on. By way of example, system 100 is described in the context of private capital. As will be appreciated, system 100 may also be used in the context of other types of assets, such as real estate, oil & gas partnerships, public capital, and non-profit financing.

Figure 2A:
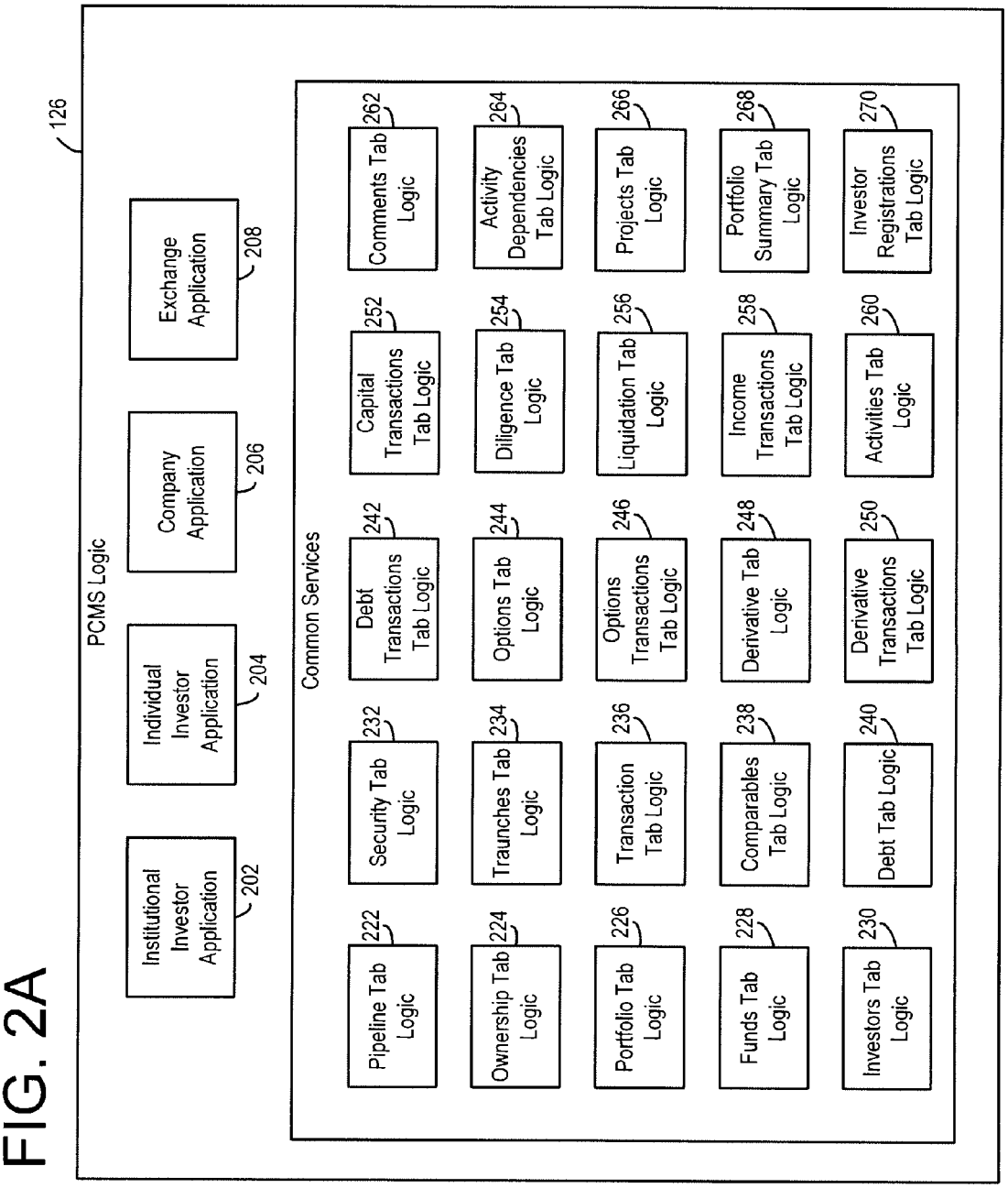
FIG. 2A is a schematic diagram showing PCMS logic of FIG. 1 in greater detail according to an example embodiment.
Figure 2B:
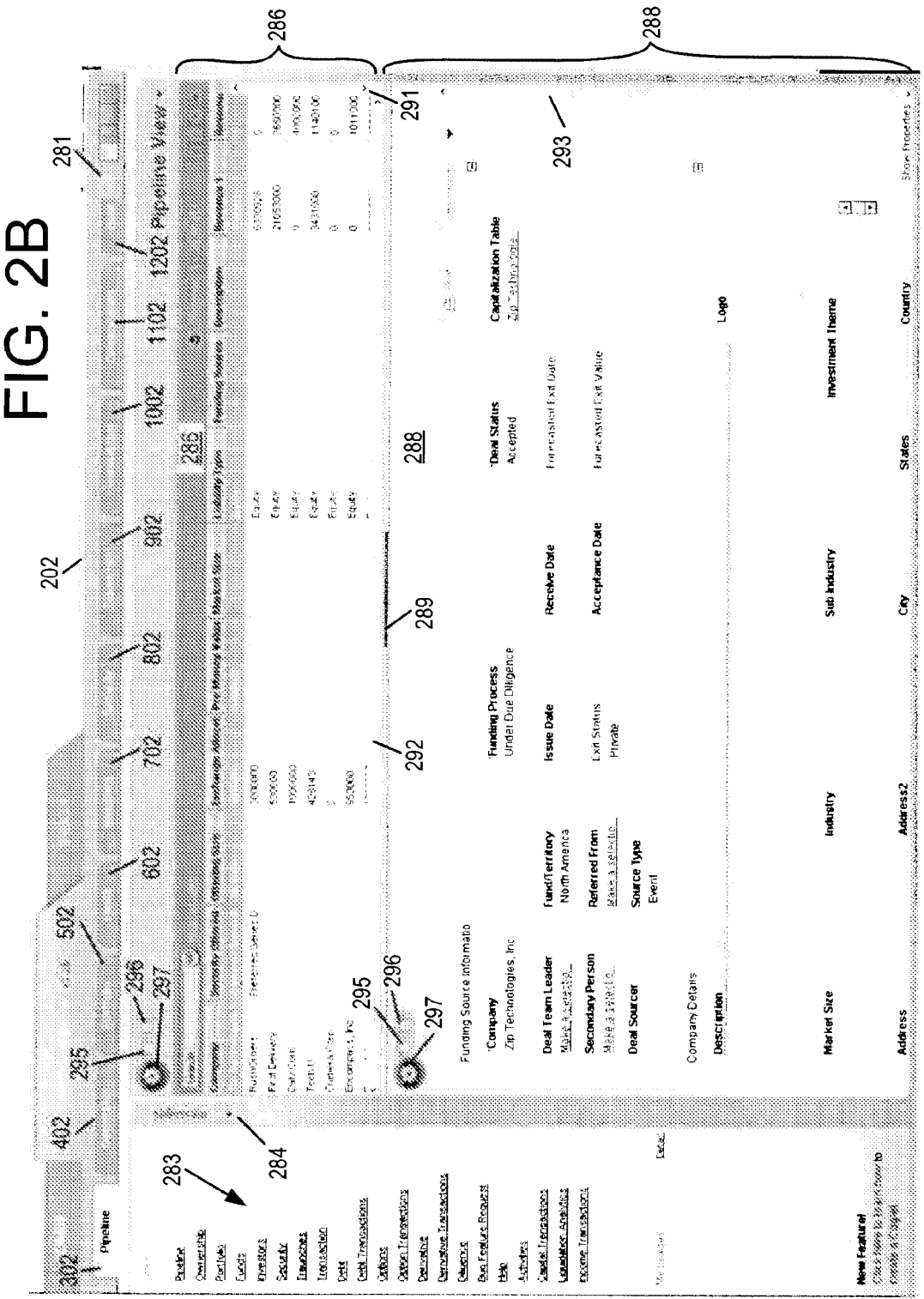
FIGS. 2B-2C are screen displays showing tools provided by the PCMS logic according to an example embodiment.

Referring now also to FIGS. 2A-2B, the PCMS logic 126 is shown in greater detail. Referring first to FIG. 2A, the PCMS logic 126 may comprise different applications which are accessible via the Internet by different types of stakeholders. For example, the PCMS logic 126 may comprise an institutional investor application 202 accessible to institutional investors, such as venture capitalists, hedge funds, private equity firms, other capital management firms, and so on. The investor application 202 may provide tools to investors to facilitate operations such as exchange registration/accreditation (e.g., permitting direct investors and limited partners to register and become accredited according to exchange rules), deal flow management (e.g., permitting investors to view deal inventory and deal flow preferences), deal management (e.g., to facilitate due diligence management, submissions of indications of interest, and so on), deal syndication (e.g., permitting deals to be carved out amongst affiliate investors), valuation analysis (e.g., permitting valuation to be triangulated based on multiple valuation methodologies), portfolio analytics (such as sector analysis, return analysis, scenario analysis, capitalizations), fund management (e.g., facilitating partnership accounting, disbursements, capital calls, and so on), dilution analysis (e.g., permitting exit dilutions to be forecast based on future events, permitting analysis of portfolio company capitalizations, and so on), market analytics (e.g., sector ratios, performance ratios, capital flows), buying/selling of primary and secondary securities while ensuring compliance with covenants, and so on.

The PCMS logic 126 may also comprise an individual investor application 204 accessible to individual investors, such as high net worth individuals, limited partnerships, and so on. Individual investor application 204 may offer tools to facilitate many of the same operations facilitated by the institutional investor application 202, or may instead offer a subset of the tools sufficient to fulfill the typically streamlined needs of the individual investor. For example, whereas the institutional investor application may include partnership accounting tools to perform accounting for funds managed by the institutional investor, an individual investor may not have a need for such tools.

The PCMS logic 126 may also comprise a company application 206 accessible to companies, i.e., entities in whom investments are made. The company application 202 may provide tools to companies to facilitate operations such as exchange registration/accreditation (including the ability to control access of confidential information and ensure investor accreditation and compliance), investor management (including providing performance updates and facilitating investor relations), ownership/capitalization management (including facilitating dilution analysis based on future financing needs), deal management (including syndication to multiple financing sources, due diligence management, allocation of indication of interests, and so on.

The PCMS logic 126 may also comprise an exchange application 208 accessible by one or more exchanges 116, e.g., angel networks, brokers (e.g., brokers that bring together individual investors and institutional investors, brokers that bring together investors and companies, and so on), and so on. The exchange application 208 may provides tools to exchanges to facilitate operations such as registration and accreditation of investors interested in investing in private securities, registration and accreditation of companies attempting to raise capital, investor relations management, comparables analysis, company relations management, syndication, market analytics, deal flow management, and so on.

System 100 may further be accessed by secondary stakeholders 118 including agents of the primary stakeholders, e.g. bankers, accountants, attorneys, etc., who facilitate the primary stakeholders' interactions. The secondary stakeholders 118 may also include limited partners of the primary stakeholders (e.g., where the investor entity is a limited partnership). Such secondary stakeholders may access the system using one of the afore-mentioned applications 202-208. Although different applications 202-208 are provided, the applications 202-208 are provided common access to data storage system 124, such that data collected by one application may be accessible to the remaining applications. Thus, for example, as described below, data regarding transactions may be more widely disseminated among various users of system 100. As also described below, the data exchange between applications 202-208 may facilitate project management, e.g., such that various stakeholders may view tasks that have been assigned to other types of stakeholders involved in the same deal.

Also shown in FIG. 2A are various common services components that provide access to the data in the data storage system 124. The common services components provide services that are accessible to users through various tabs on screen displays generated by the PCMS logic 126 using the network interface logic 122. The common services components include pipeline tab logic 222, ownership tab logic 224, portfolio tab logic 226, funds tab logic 228, investors tab logic 230, security tab logic 232, traunches tab logic 234, transaction tab logic 236, comparables tab logic 238, debt tab logic 240, debt transactions tab logic 242, options tab logic 244, options transactions tab logic 246, derivative tab logic 248, derivative transactions tab logic 250, capital transactions tab logic 252, diligence tab logic 254, liquidation tab logic 256, income transactions logic 258, activities tab logic 260, comments tab logic 262, activities dependencies tab logic 264, projects tab logic 266, portfolio summary tab logic 268 and investor registrations tab logic 270. As will be appreciated, less, additional, or different logic may also be provided.

Referring now to FIG. 2B, FIG. 2B shows a screen display 201 generated by the PCMS logic 126. As shown in FIG. 2B, the tab logic 222-270 of FIG. 2A corresponds to a series of tabs 275 that may be accessed by a user to perform various operations on the data stored in the data storage system 124. The series of tabs 275 include a pipeline tab 302, an ownership tab 402, a portfolio tab 502, a funds tab 602, an investors tab 702, a security tab 802, a traunches tab 902, a transaction tab 1002, a comparables tab 1102, and a debt tab 1202. In the example shown in FIG. 2B, the user has selected the pipeline tab 302. Although not specifically shown in FIG. 2B, additional tabs are available by way of a pair of scroll buttons 281 which permit the user to scroll left and right to select which tabs are displayed. Thus, in FIG. 2B, as will become apparent below, additional tabs are available to the user by clicking on the right scroll button. (In the state shown in FIG. 2B, no further tabs are available via the left scroll button.) A side-bar menu 283 includes a more complete listing of tabs that are available. The side-bar menu 283 is retractable responsive to the user clicking on button 284. A user may also navigate through the various screen displays by selecting particular fields and following links to screen displays associated with those fields. For example, if the user clicks on a company, the user may be taken to the ownership tab 402 showing capitalization information for that company. If the user selects one of the securities, the user may be taken to security tab 802 to be provided with additional information concerning a selected one of the securities.

In the example shown in FIG. 2B, the screen display 201 is generated from within the institutional investor application 202. In one example embodiment, functionality associated with each tab 275 is reused in each of the applications 202-208. The user interface presented through the tabs 275 may operate the same way within each of the applications, although the data that the user may view (or create, edit, or delete) may vary depending on the user and the other entities with which it has a financial relationship. The applications 202-208 may be distinguishable from in that different ones of the applications 202-208 may provide different ones of the tabs 275. Herein, for purposes of providing an example, it is assumed that the other application 204-208 are provided with a subset of the tabs 275 that are provided in connection with the institutional investor application 202. The tabs 275 each provide a different view into the data stored in data storage system 124. Hence, institutional investors, companies, individual investors, exchanges, and secondary stakeholders are provided with different views depending on which tabs 275 they are provided.

The user interface may be generally similar across various ones of the tabs 275 provided by tab logic 222-270. The user interface is now described in greater detail in the context of the pipeline tab 302. However, the other tabs 275 may be configured in generally the same manner.

For each of the tabs 275, data is displayed using an upper view pane 286 and a lower view pane 288. The upper view pane 286 lists records available through the respective tab and the lower view pane 288 shows details for the highlighted records. The size of the viewable portion of the upper view pane 286 relative to the size of the viewable portion of the lower view pane 288 may be adjusted responsive to the user grabbing and moving a handle 289.

Figure 2C:
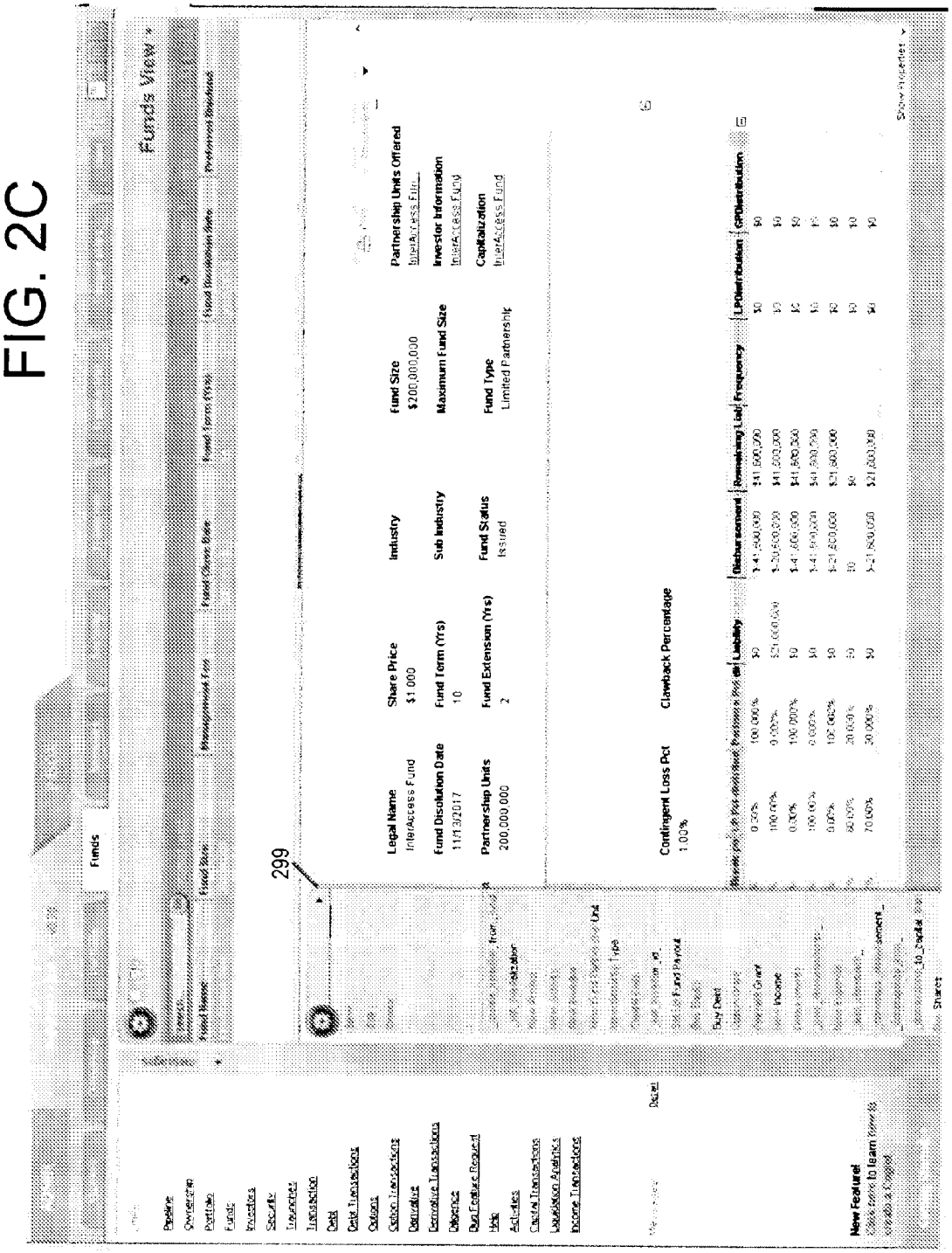

The upper view pane 286 displays summary information for each record and the lower view pane 288 displays detailed information for the record that is highlighted above (i.e., in the upper view pane). If the user clicks on the header for a particular column, the system re-sorts the data based on the header selected by the user (e.g., to sort the companies in alphabetical order if the user selects the company header). The upper view pane 286 includes a side scroll bar 291 to display additional records and a bottom scroll bar 292 to view additional information for each record. Likewise, the lower view pane 288 includes a side scroll bar 293, and may also include a bottom scroll bar (not shown) to display additional information for a particular record. New records may be added responsive to the user clicking on icon 295. Thus, if the user wants to add a new company to the pipeline, the user may click on icon 295. Records may be edited responsive to the user clicking on icon 296. Icon 297 provides tools to permit additional functions to be performed. FIG. 2C shows an example menu 299 provided in response to the user clicking on icon 297. Menu 299 is shown as being provided in the context of funds tab 602, although other menus may be available in connections with other ones of the tabs 275.

Referring now to FIG. 3A to FIG. 27, the tools that are provided to the various types of users are now described. FIG. 3A to FIG. 27 show screen displays provided responsive to the user selecting various ones of the series of tabs 275. Again, although the tools are described in the context of an institutional investor using institutional investor application 202, it will be appreciated that the same tools may be provided to other types of users using one of the other applications 204-208.

Figure 3A:
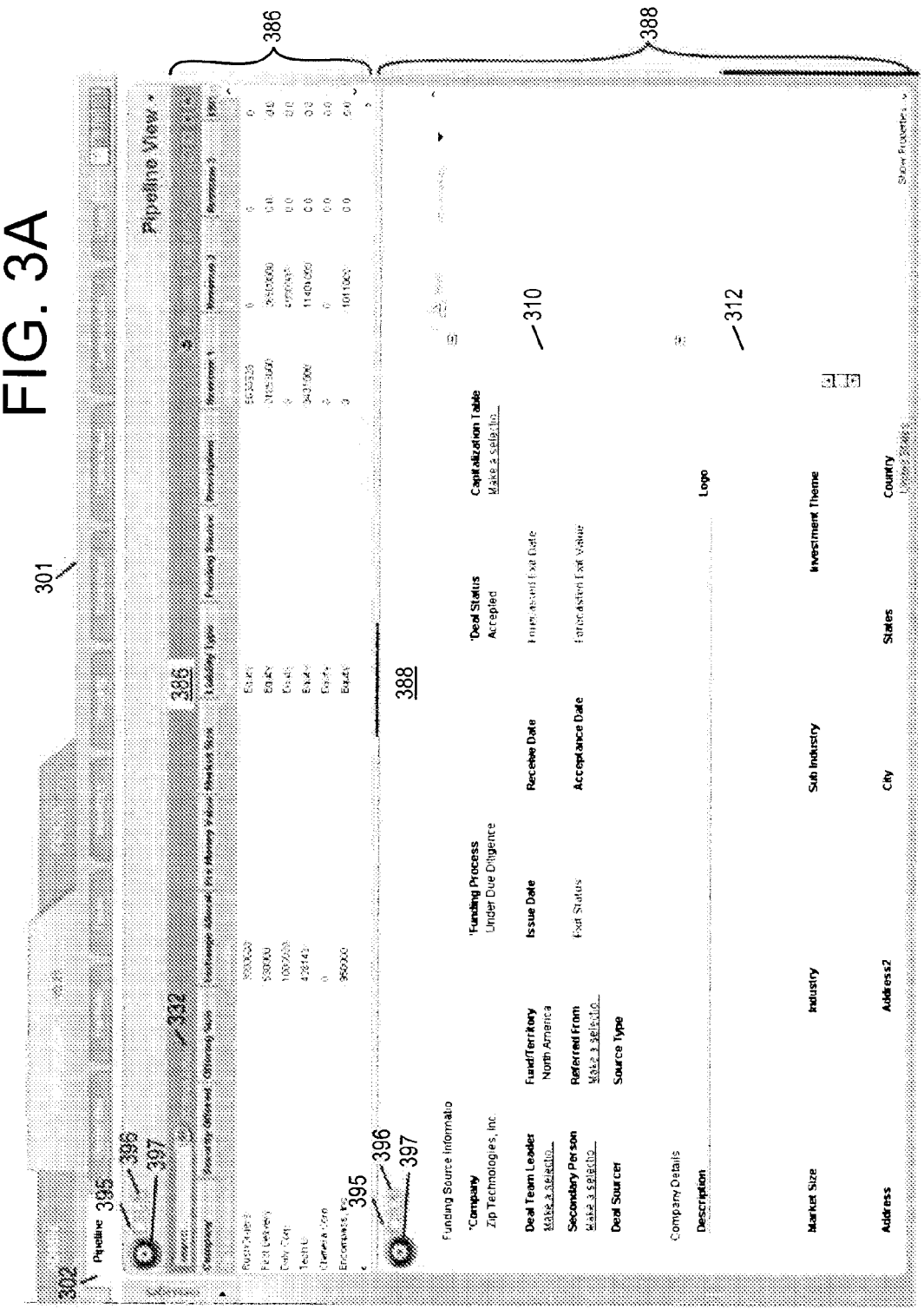
Figure 3B:
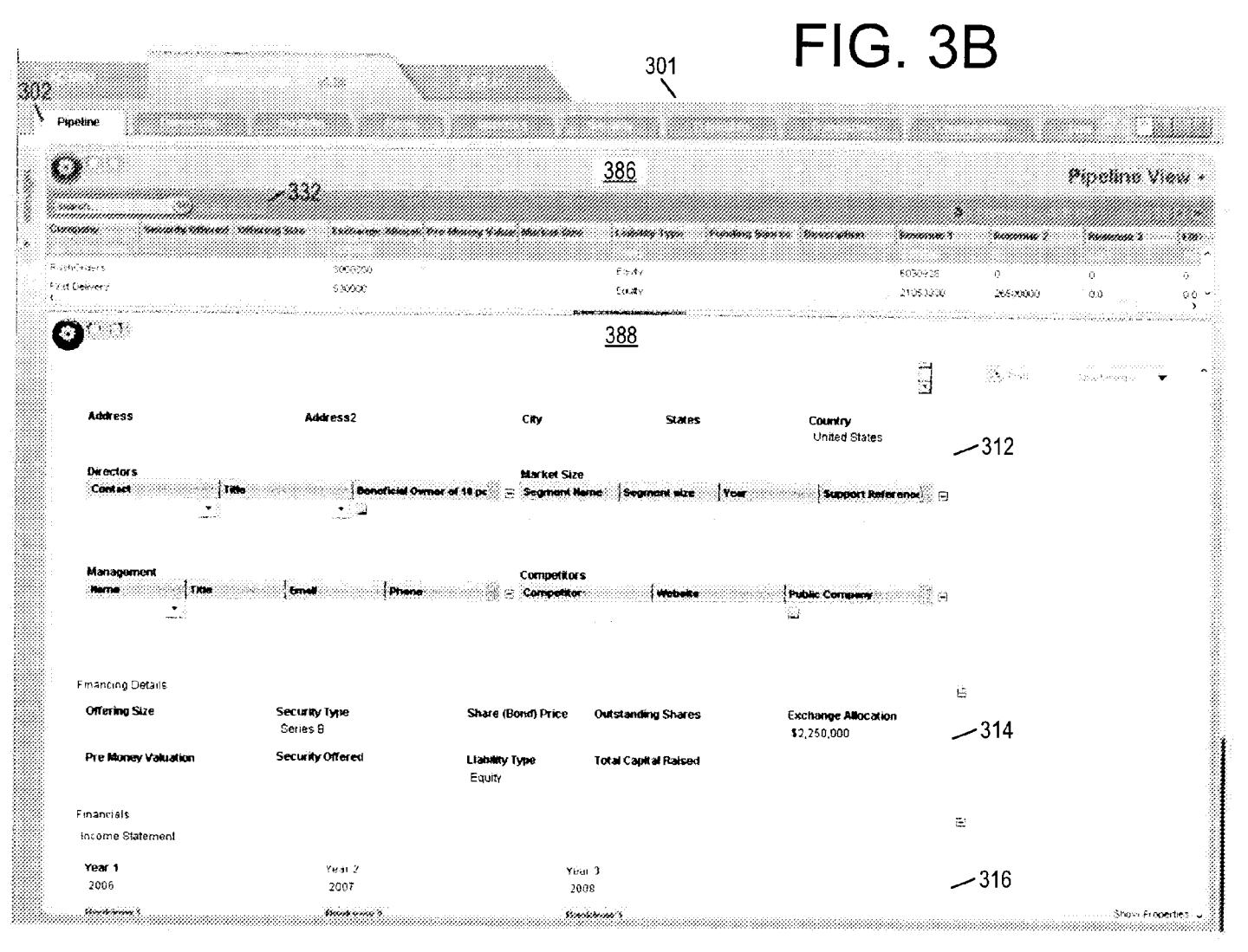
Figure 3C:
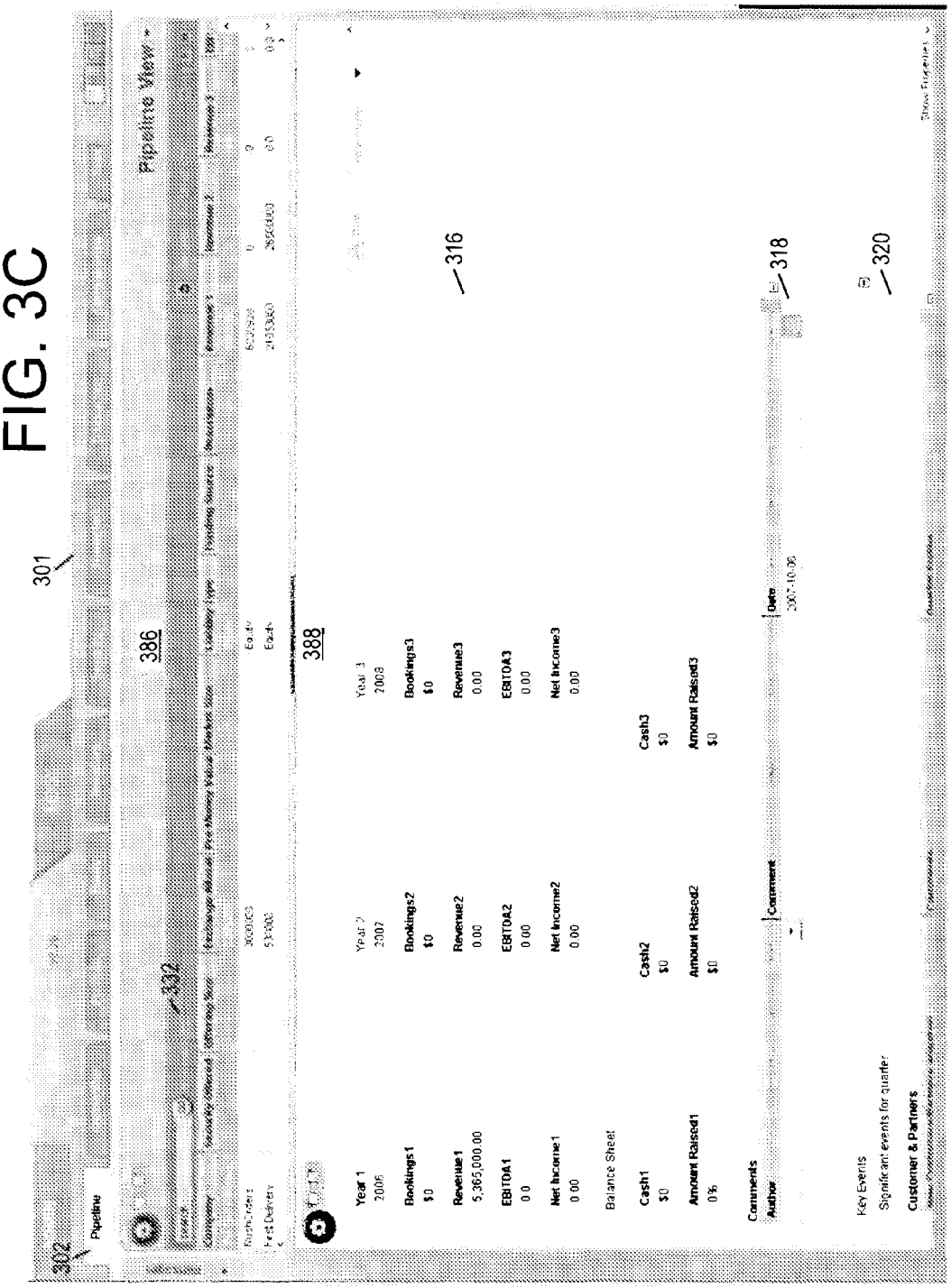

Referring first to FIGS. 3A-3C, a screen display 301 is shown that may be generated for example when the user selects pipeline tab 302. The screen display 301 is generated using the pipeline tab logic 222. The pipeline tab 302 is used to track the status of pre-deal companies in the investor's pipeline. The individual companies in the investor's pipeline are listed as records in upper view pane 336. Specific information about a selected one of the companies is provided in lower view pane 338. For example, the user may be provided with information pertinent to the funding source in field 310, company details in field 312, financing details in field 314, company financial information in field 316, a comments field 318, and other information about key events (e.g., new business opportunities) in field 320.

Responsive to the user selecting new record button 395, the pipeline tab logic 222 creates a new record. The user may be provided the ability to enter the company name and choose from the options beneath the funding process and deal status labels to indicate the deal's position in the pipeline. Reference information including the deal team leader, secondary person and referrer can also be selected from the drop down menus as shown in field 310. Dates may also be entered in field 310 and company details may be entered in field 312. Individuals are entered into the system on the investor tab 702. FIGS. 3B and 3C show portions of the screen display 301 that are presented responsive to the user scrolling further down the page. As shown in fields 314 and 316 in FIGS. 3B and 3C, details for a proposed financing may be entered, including offering size, share price, and valuation. Summary financial information for the company may also be displayed.

By clicking on an advanced search button 332, the user may cause a search to be performed to identify potential investment opportunities. Any of the data in lower view pane 388 may be used as search parameters. Thus, a search may be performed for companies meeting specified search criteria (e.g., all companies within a particular industry/sub-industry), in which case only the companies meeting the specified search criteria are displayed in upper view pane 386.

Figure 4A:
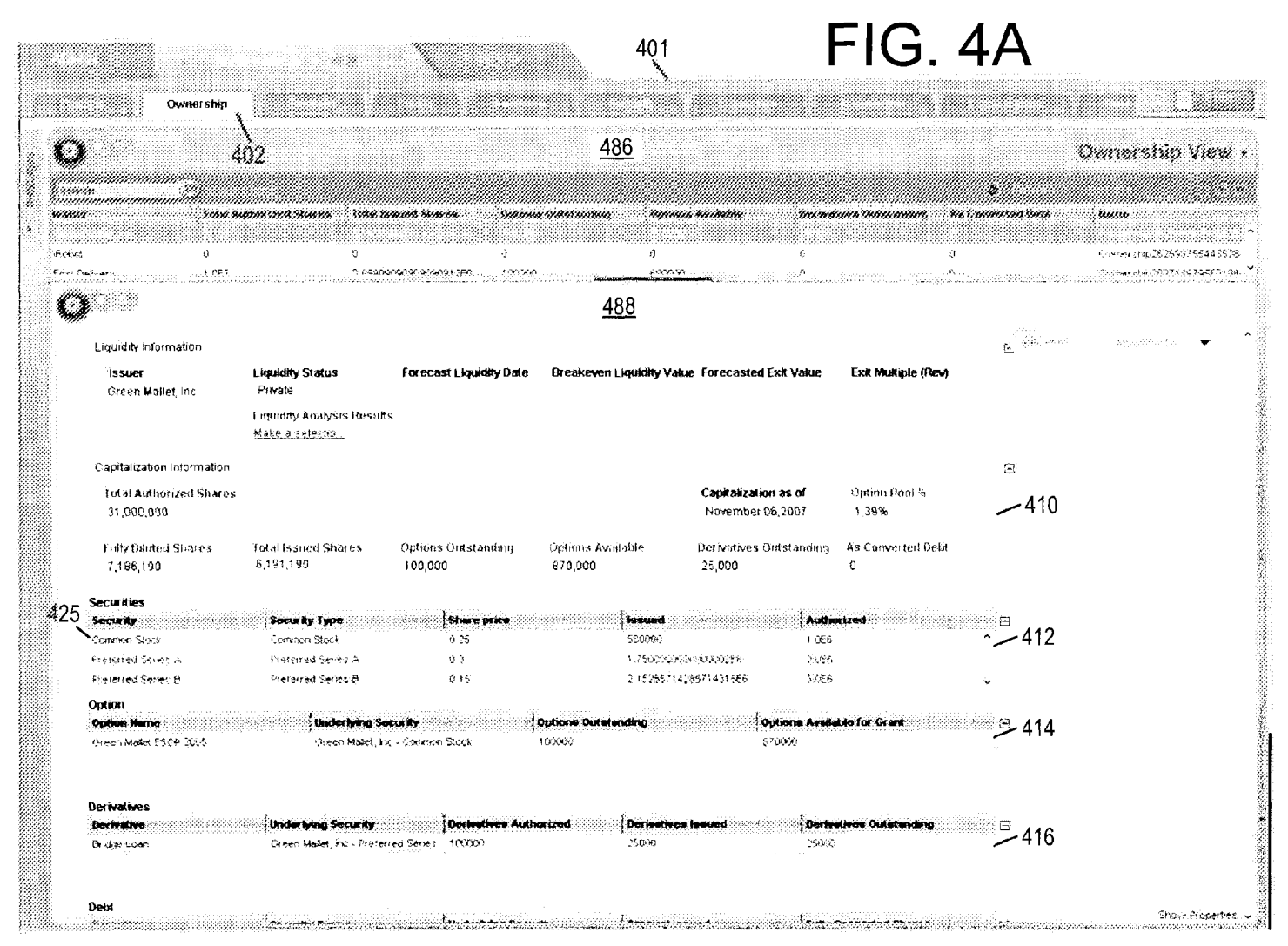
Figure 4B:
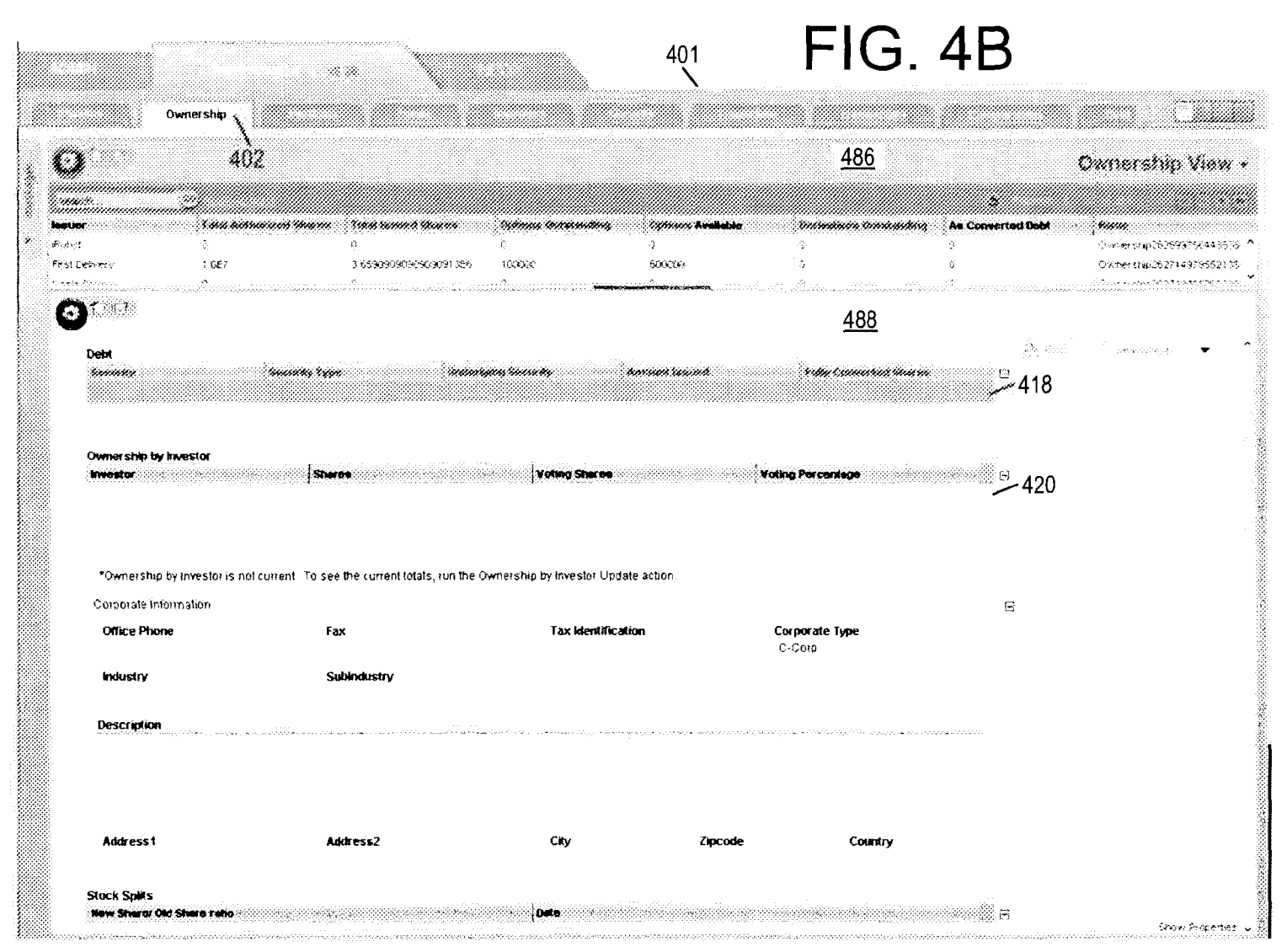

Referring now to FIGS. 4A-4B, a screen display 401 is shown that may be generated for example when the user selects ownership tab 402. The screen display 401 is generated using the ownership tab logic 224. The ownership tab 402 provides the user with the ability to track the information regarding the ownership or capitalization tables of companies registered in system 100. By selecting different companies, the capitalization tables of different companies may be viewed. In an example embodiment, the user is provided with the ability to view all companies. In another example embodiment, the user is only able to view the capitalization tables of a subset of the companies, e.g., those companies in which the investor has an ownership interest (e.g., ownership of an equity interest and/or ownership of a debt interest).

Upper view pane 486 comprises a listing of companies for which capitalization information is available. Specific information about a selected one of the companies is provided in lower view pane 488. For example, the user may be provided with information about total authorized shares, total issued shares, securities issued, securities authorized, options outstanding, options available for grant, derivatives authorized, derivatives issued, derivatives outstanding, debt issued, and so on, in fields 410-420. It may be noted that the price per share is based on transactional data, i.e., it may be the current price per share, not the price per share when issued (which is shown in the traunches fields). Such information may be dynamically updated based on transaction data collected by system 100. As described in greater detail below, system 100 may be used to conduct equity and debt transactions between companies and investors and between investors and other investors. Thus, for example, when common stock is traded between two investors, the price at which the transaction occurred may be reflected as an updated share price in field 412. Likewise, when indications of interested are converted to common stock, such transactions may be reflected in the number of shares issued in field 412. Likewise, when options are converted to stock, or when new debt is issued, such transactions may also be reflected. Such transactional data may be reflected in the views provided to all interested parties, regardless whether such party was involved in a particular transaction. Thus, transparency into companies' financial information is enhanced for the various stakeholders. Additionally, tab 402 provides a standard format for presenting the capitalization information of companies. Thus, the stakeholders are provided with a standardized, transparent view into the into company finances, which facilitates comparison and valuation.

The user is also provided with the ability to "drill down" on various entries in fields 410-418. For example, if the user wishes to view additional information about a security in entry 425, the user may click on the security. The user is then delivered to the screen display provided by tab 802 and is provided with additional information about the security from within tab 802. Tab 802 is described in greater detail below in connection with FIG. 8.

From within the company application 206, companies may use the tools provided by tab 402 to manage their capitalization tables. Where an investor has invested in a company that has not registered in system 100, the tab 402 may be used by the investor to track capitalization information for the company. In example embodiment, the source of data regarding companies is also tracked and presented to users (e.g., whether the data is provided by the company, by an investor in the company, and so on).

A dilution analyzer may be provided that provides dilution information based on pre-money valuation, the amount of money that is being raised, the option pool target, whether the debt is to be converted, and so on. Based on this information, the dilution analyzer may calculate per share price. The dilution analyzer may store information concerning rights and terms (e.g., liquidation preferences) and perform calculations to determine whether any of rights are triggered. A first year price may be calculated to convert debt. Liquidation preferences and other criteria may be included in the calculations.

Ownership logic 224 may include business rules to analyze information as it is dynamically updated. For example, information about security issuances may be analyzed, e.g., to detect approaching dilution authorization limits and provide warnings to company management and the board of directors.

Figure 5:
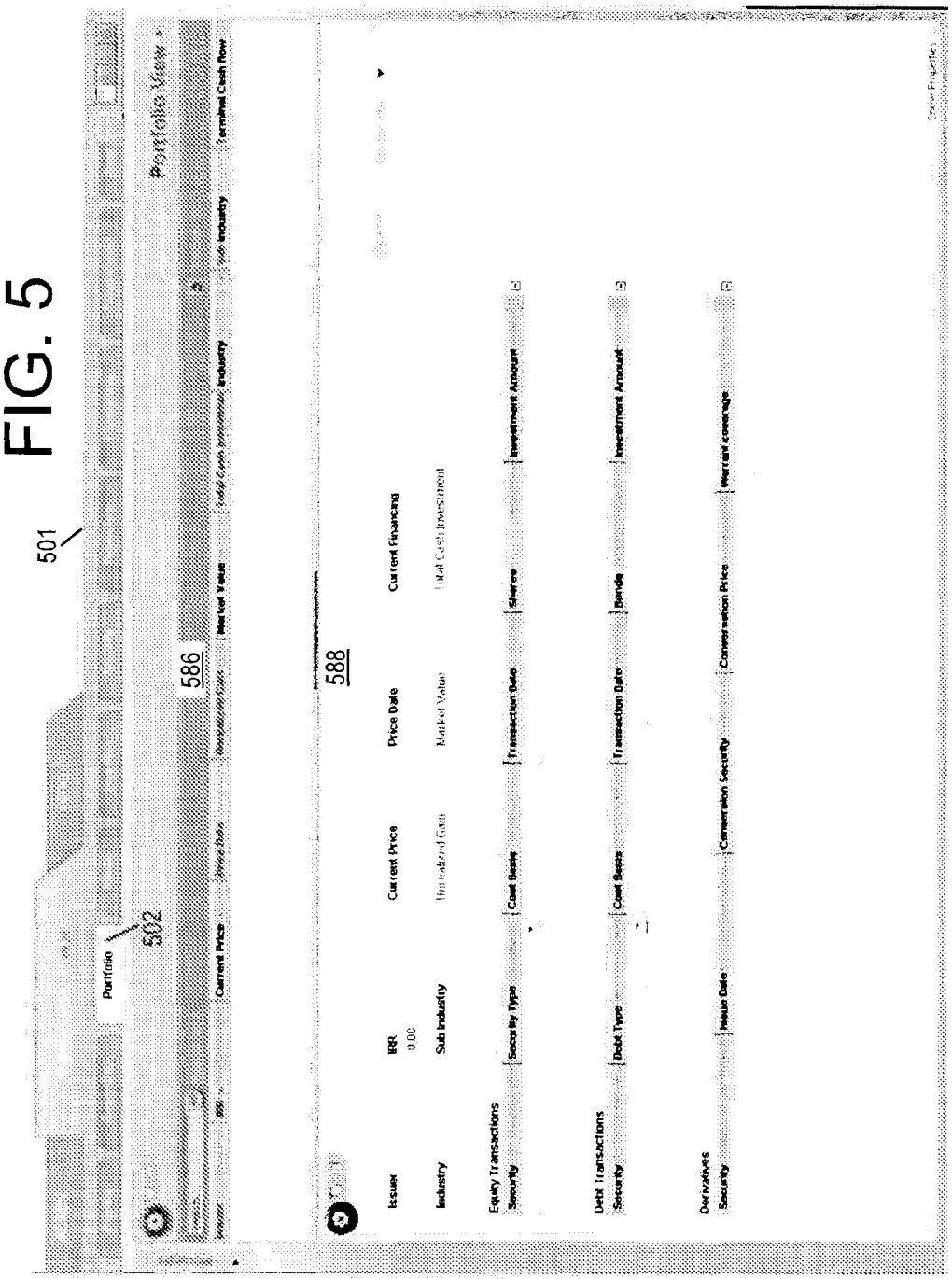
FIG. 5 is a screen display provided in connection with a portfolio tab according to an example embodiment.
Figure 6A:
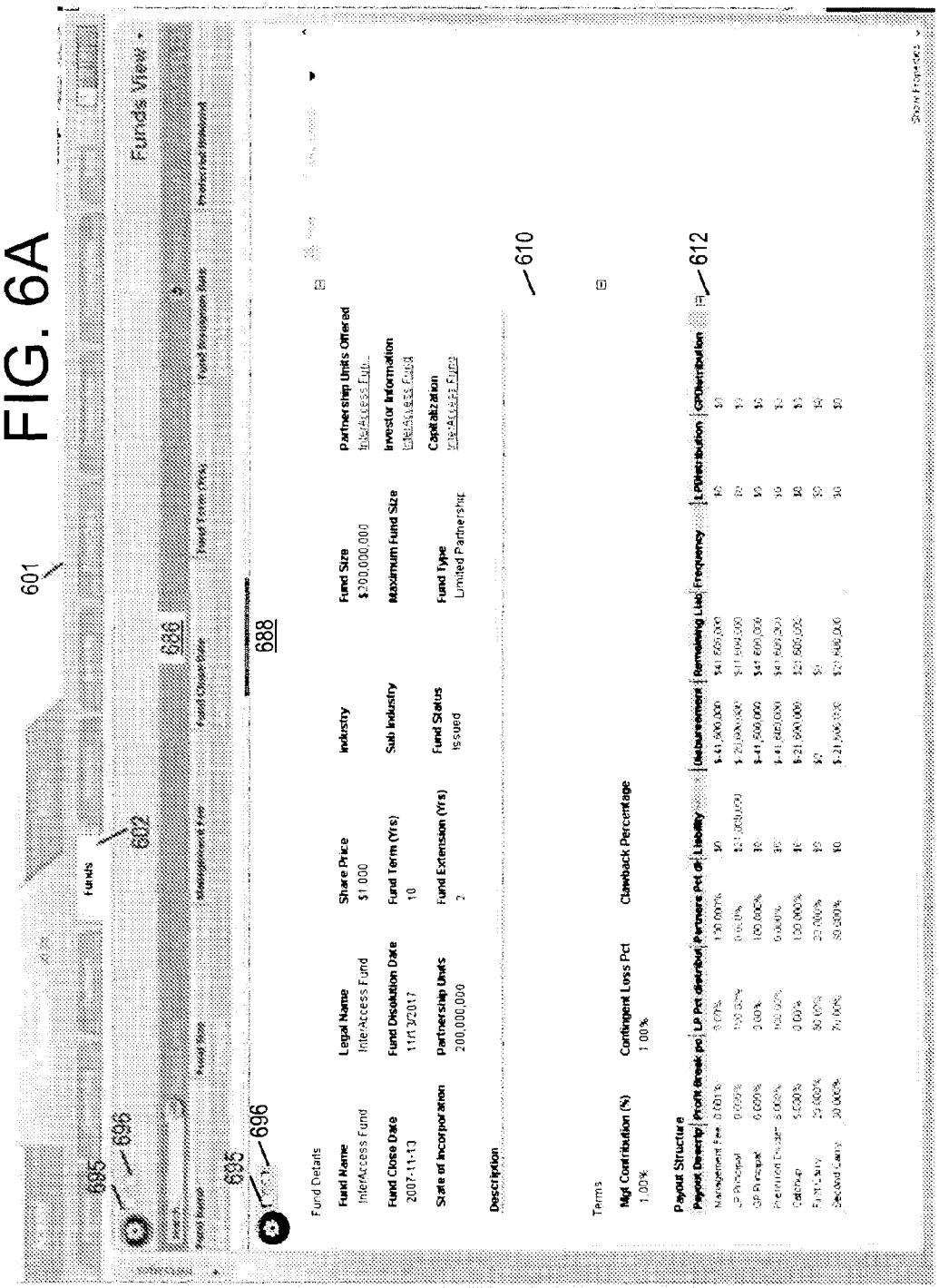
FIGS. 6A-6D are a screen display provided in connection with a funds tab according to an example embodiment.
Figure 6B:
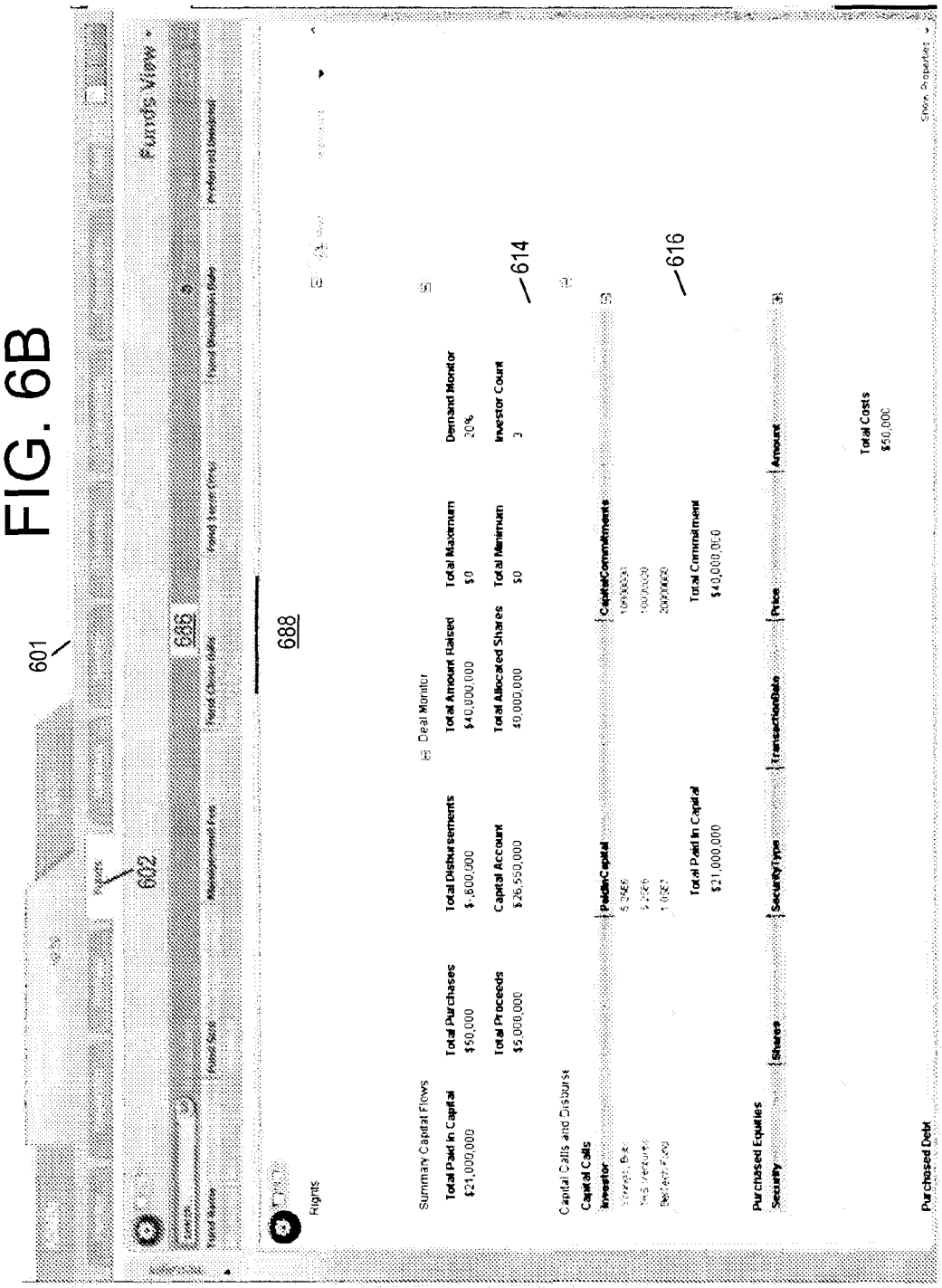
Figure 6C:
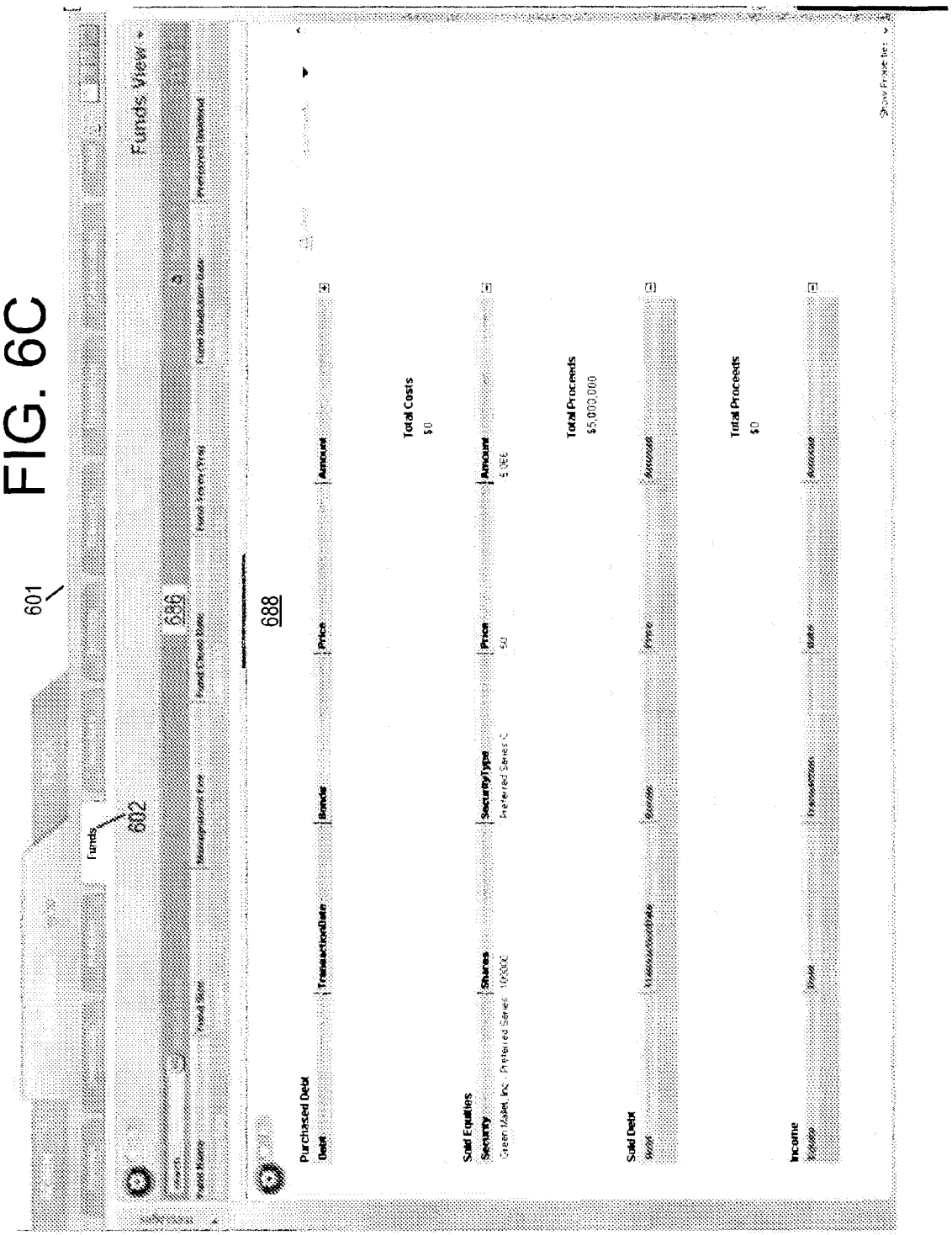
Figure 6D:
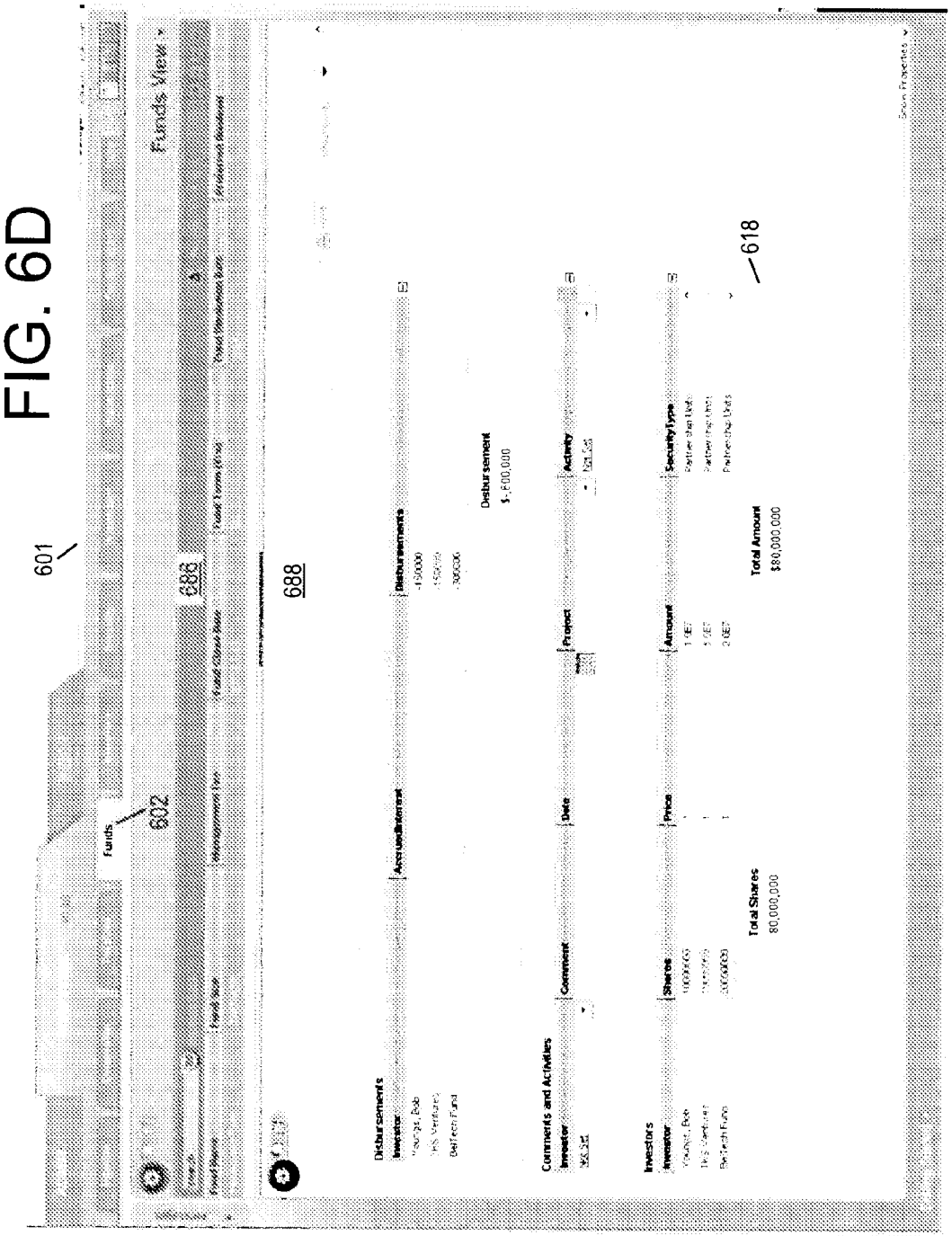
Figure 7C:
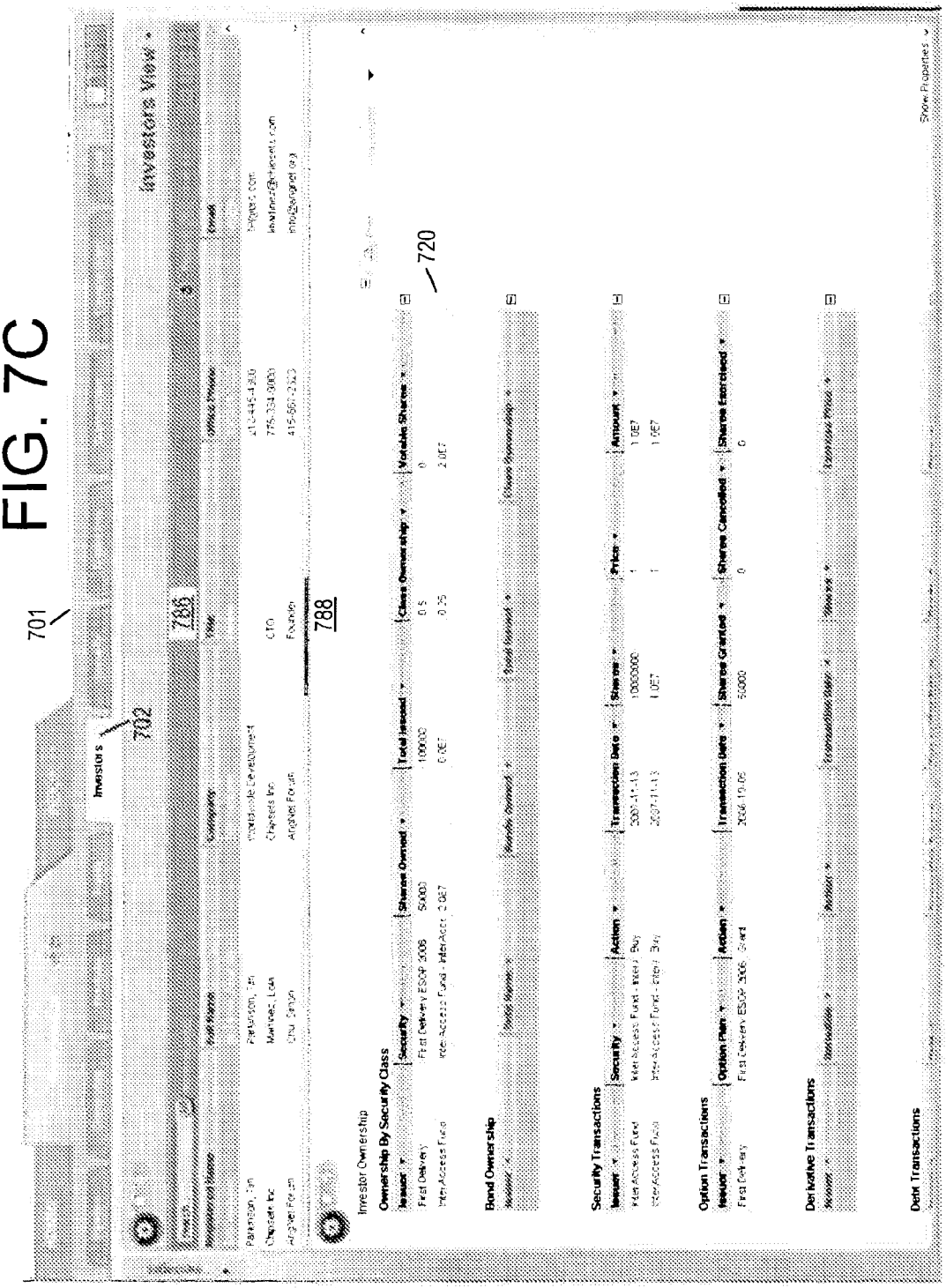

Referring now to FIG. 5, a screen display 501 is shown that may be generated for example when the user selects portfolio tab 502. The screen display 501 is generated using the portfolio tab logic 226. The screen display 501 may be used by the investor to view information regarding equity and debt transactions with individual companies in its investment portfolio.

In the upper view pane 586, various data regarding each of the companies in the investor's portfolio is shown, including the issuer/company name, internal rate of return (IRR), current price, price date, unrealized gain, market value, total cash investment, industry, sub-industry, and terminal cash flow. Again, the user may select a specific company in upper view pane 586 and, in response, information regarding the company is displayed in lower view pane 588. In the lower view pane 588, additional data regarding a selected company is shown. As elsewhere, data shown in the lower view pane 588 may be dynamically updated. For example, if the user enters a new current price, the IRR may be dynamically updated. Alternatively, the new current price may be obtained from other sources, such as third party data or data collected by the system 100 in connection with other transactions involving the respective company being viewed.

Referring now to FIGS. 6A-6D, a screen display 601 is shown that may be generated for example when the user selects funds tab 602. The screen display 601 is generated using the funds tab logic 228. The screen display 601 is used to track partnership accounting information (e.g., where a fund is organized as a partnership entity).

In upper view pane 686, a listing of individual funds is provided. For example, a capital management firm may manage twenty-five different funds that it makes available to its customers (e.g., individual investors, partnerships, etc.) for investment. In such a scenario, in upper view pane 686, a listing of the twenty-five different funds is provided.

In lower view pane 688, additional information about a selected one of the funds is provided. In field 610, certain basic details regarding the fund are provided, such as its legal name, fund type, number of partnership units, and so on. Fields 612-618 provide other related information, such as information regarding the payout structure of the fund, information about capital flows and capital calls, information about individual investors in the fund, and so on. The information about the payout structure of the fund received in field 612 may be used for liquidation analytics, as described in connection with FIGS. 20A-20B, below Responsive to the user selecting new record button 695 or edit record button 696, the system 100 creates a new fund record or edits an existing fund record, respectively. Additional inputs may then be received from the user to populate various fields, such as the fund name, fund size, dates, term, fees, price, and so on.

Again, the information in fields 610-618 may be dynamically updated based on transaction data collected concerning transactions conducted through system 100. For example, if disbursements are made to partners in a fund, this information may be reflected in field 612.

Referring now to FIGS. 7A-7D, a screen display 701 is shown that may be generated for example when the user selects investors tab 702. The screen display may also be generated responsive to other user inputs, for example, if the user clicks on a particular investor from within another screen display. The screen display 701 is generated using the investors tab logic 230. The screen display 701 shows information for investors in the funds shown in FIGS. 6A-6D. The screen display 701 may also show other investors. In an example embodiment, all investors, employees and stakeholders are entered on the investors tab 702.

The screen display 701 shows various information regarding the investors. In field 710, various summary information is shown, such as the registered name of the investor, the investor type, and so on. In field 712, various company information is shown, such as a description of the company, the company's website, and so on. (Depending on the investor, some fields may remain unpopulated.) In fields 714 and 716, address and contact information for the investor is shown, respectively. In field 718, comments and activities are shown. In field 720, various information regarding ownership is shown, such as securities ownership, bond ownership, security transactions, option transactions, and so on. In field 722, accreditation information is shown, including membership in exchanges and any verifications/certifications that have been received. In field 724, other personal information is shown regarding individuals associated with the investor.

Responsive to the user selecting new record button 795 or edit record button 796, the system 100 creates a new investor record or edits an existing investor record, respectively. System 100 may be configured to permit the user to enter the name of the investor and to choose the investor type from the drop down menu. Further details may be entered in the fields 712-724, previously described.

Figure 8A:
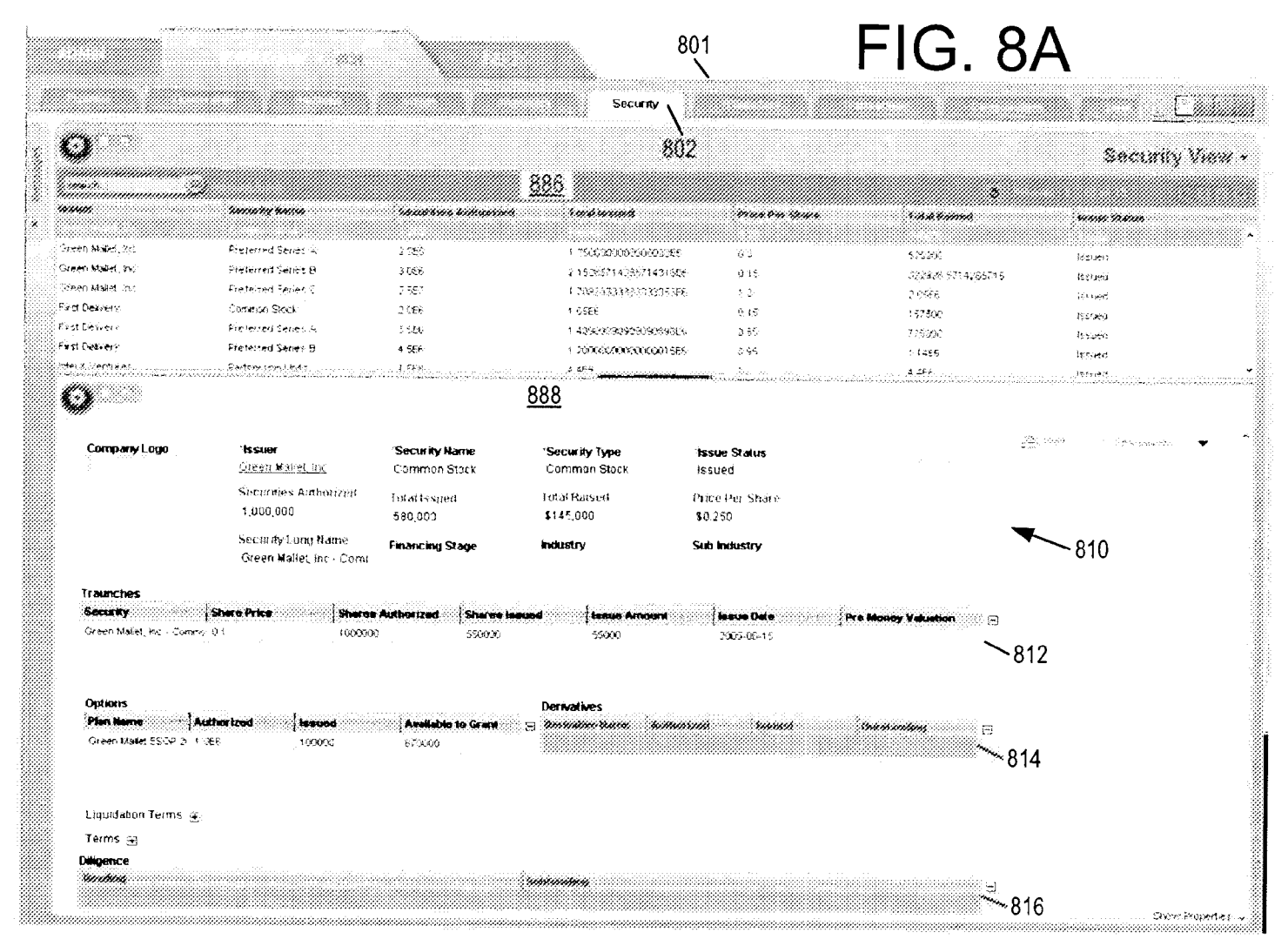
Figure 8B:
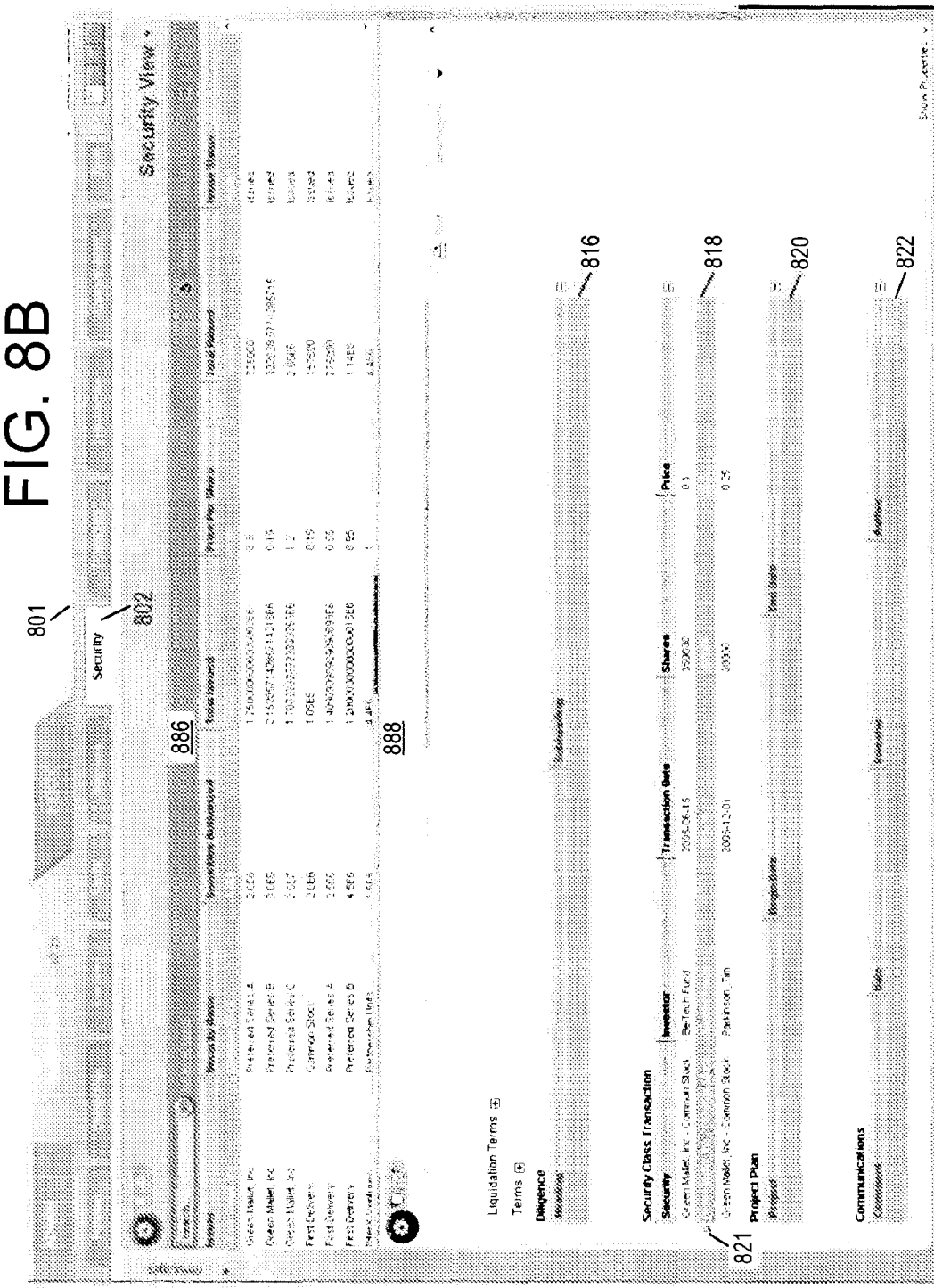

Referring now to FIGS. 8A-8B, a screen display 801 is shown that may be generated for example when the user selects security tab 802. The screen display may also be generated responsive to other user inputs, for example, if the user clicks on a particular security from within another screen display. The screen display 801 is generated using the security tab logic 232.

In the upper pane view 886, a listing of individual securities is provided. As shown, a given company may have several different securities listed (e.g., common stock, preferred series A, preferred series B, and so on). The securities listed may include securities the investor owns and securities that the investor has issued (e.g., partnership units). For example, whereas a company may use security tab logic 832 to issue different classes of securities, an institutional investor may use the security tab 802 to issue partnership units. Both sets of securities are viewable from within the screen display 801.

In the lower pane view 888, additional information regarding a selected one of the securities is provided. In field 810, the user is provided with basic information about the security, such as the name of the security, the type of security, the issue status, and so on. In fields 812 and 814, the user is provided with information about traunches, options and derivatives for the security. In field 816, the user is provided with a location to enter due diligence information.

Figure 10:
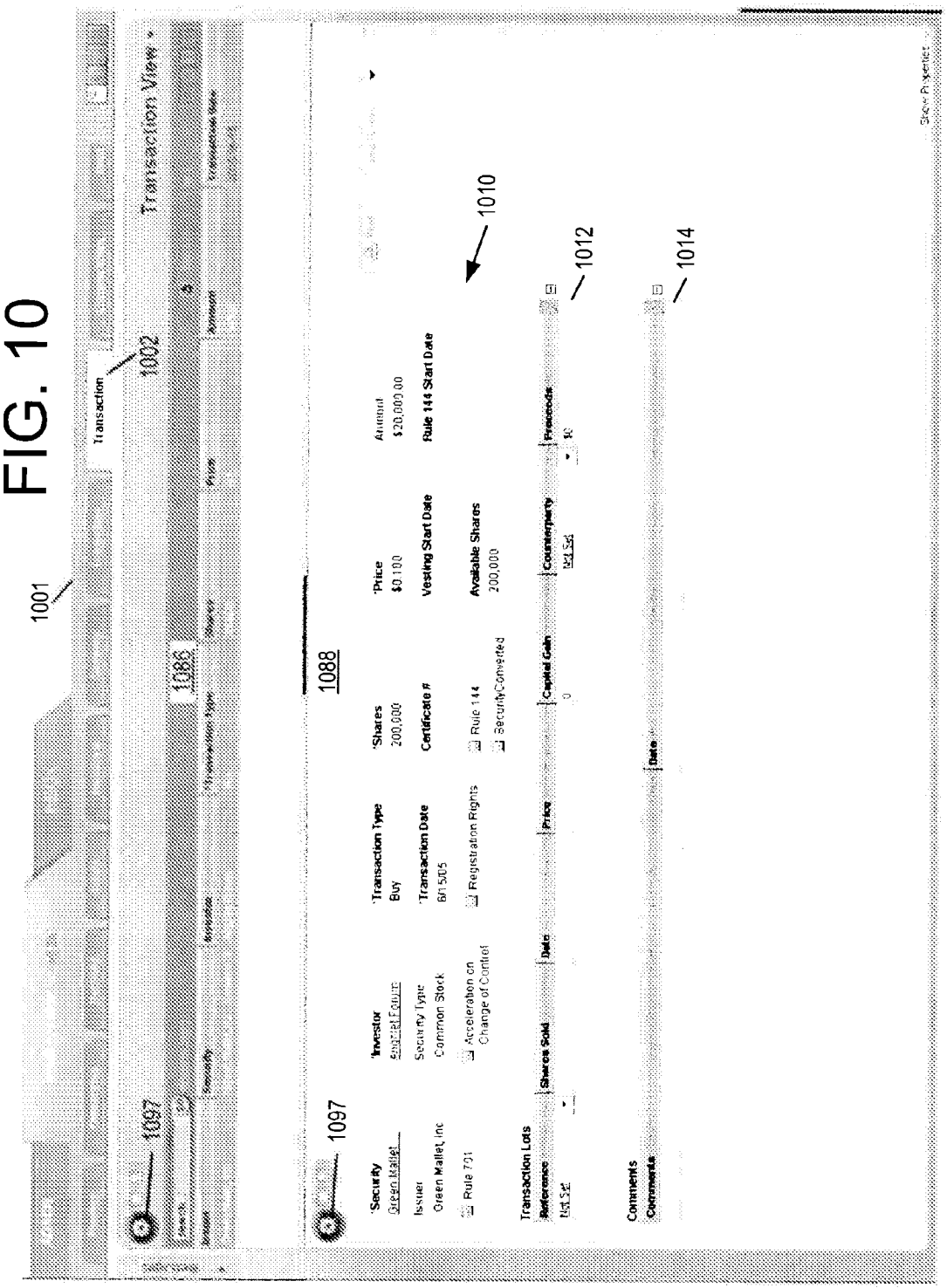
FIG. 10 is a screen display provided in connection with a transactions tab according to an example embodiment.

In field 820, the user is provided with information about security transactions. In FIG. 8B, the user has selected one of the security class transactions. When the user clicks on icon 821, additional details regarding the selected transaction are provided (i.e., the user is able to "drill down" on the transaction). FIG. 10 (discussed below) shows the screen display provided to the user when the user clicks on icon 821.

Responsive to the user selecting new record button 895 or edit record button 896, the system 100 creates a new security record or edits an existing security record, respectively. In the context of an added security record, the security may be given a name (e.g., "preferred series A"), designated with a security type, and assigned an issue status responsive to user inputs. The totals for any issues of stock do not appear in screen display 401 of the ownership tab 402 until the user indicates the traunche has been issued. After saving, the user proceeds to the traunche to provide inputs to create the details for a particular issuance (traunche) of equity.

Figure 9A:
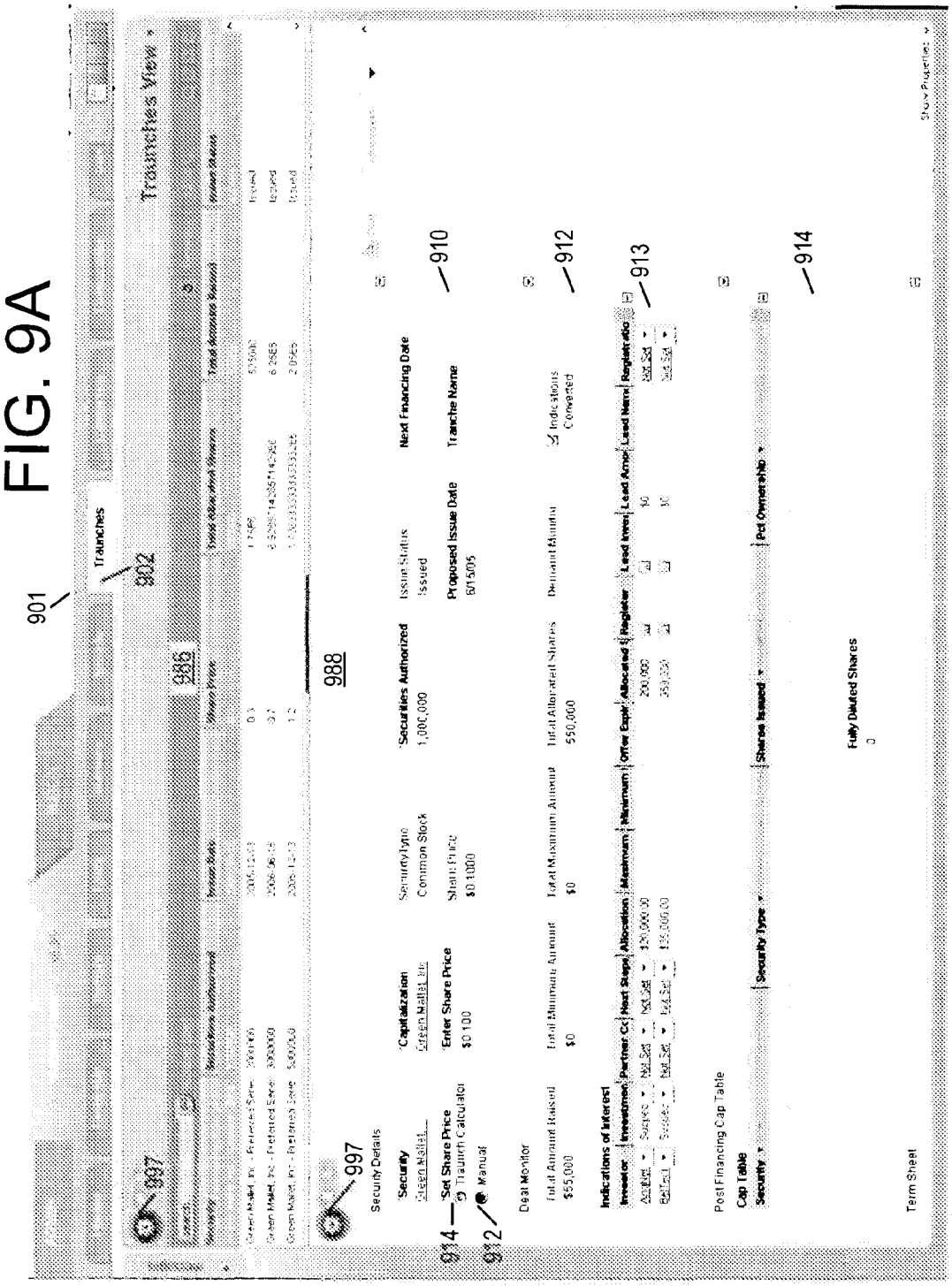
Figure 9B:
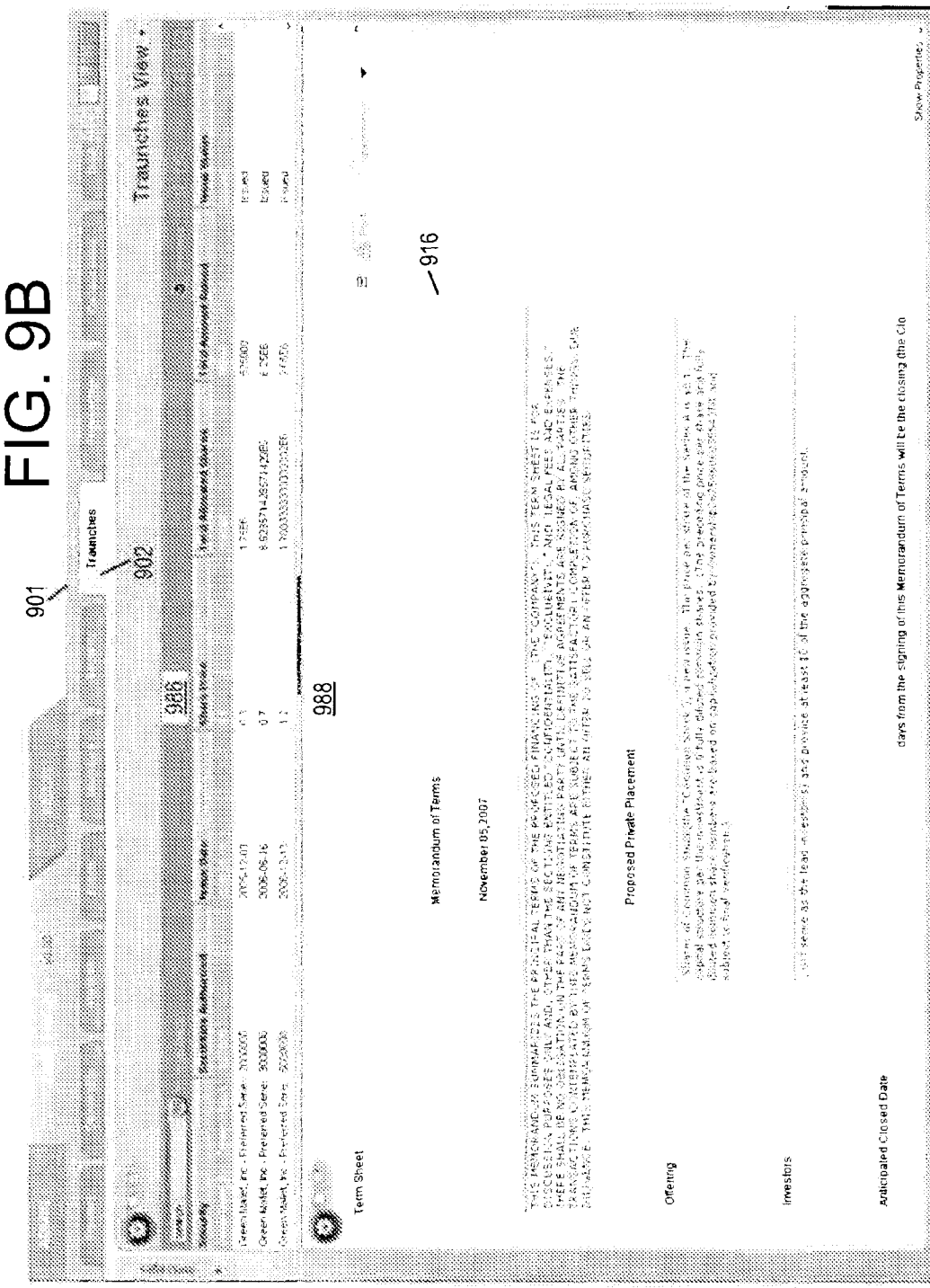
Figure 9C:
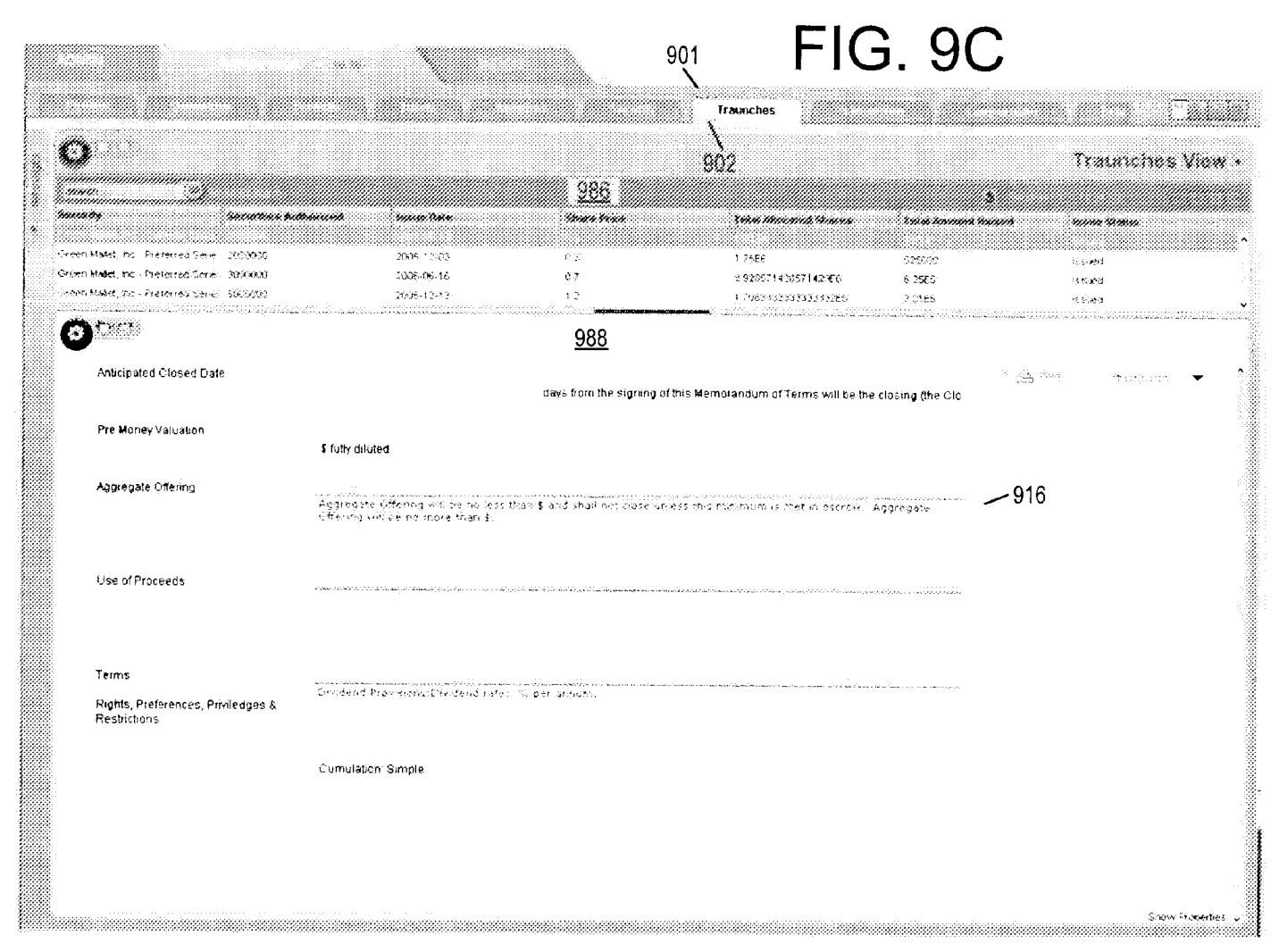

Referring now to FIGS. 9A-9C, a screen display 901 is shown that may be generated for example when the user selects traunches tab 902. The screen display 901 is generated using the traunches tab logic 234.

The traunches tab logic 234 permits the user to create multiple traunches for a single security, e.g., to accommodate situations where a company may have multiple issuances, or traunches, of a particular equity security. Within each traunche, the user may specify the number of shares authorized, the price, the purchases, the number of shares issues, and the issue status, as shown in field 910. New records may be created responsive to user inputs and the appropriate security and issuer capitalization may be chosen from drop down menus. The number of securities authorized may also be entered by the user.

The user may enter the price for the stock issuance manually by selecting the manual price button 912 and entering the price. Once an issue date is entered and saved, the issuance is registered within the system 100. If the issuance is saved but an issue date is not specified, the issuance is left as proposed. This allows for scenario analysis using a traunche calculator, as described below. The purchase of the equity may be recorded by receiving an issue date from the user so the traunche is recorded. Information about each transaction may then be received from the user using the transaction tab 1002, discussed below in connection with FIG. 10. The purchase of the equity may be recorded using a deal monitor shown in field 912. The deal monitor may be used to track investor interest in a traunche.

System 100 is also able to syndicate allocation, and different portions of a round of financing may be allocated to different venture capitalists, angel networks, and so on. In the indications of interest table 913, information regarding investors may be received from the user using a drop-down menu. In the allocation column, information regarding each investor's proposed amount may be received. Additional rows for additional inventors may also be added. Once the record has been saved, the indications may be converted to actual purchases of the fund responsive to the user clicking on the icon 997 and making appropriate menu selections. The data does not then need to be re-entered by the user in the transactions tab 1002. The indications will be converted to transactions at the traunche share price.

Figure 9D:
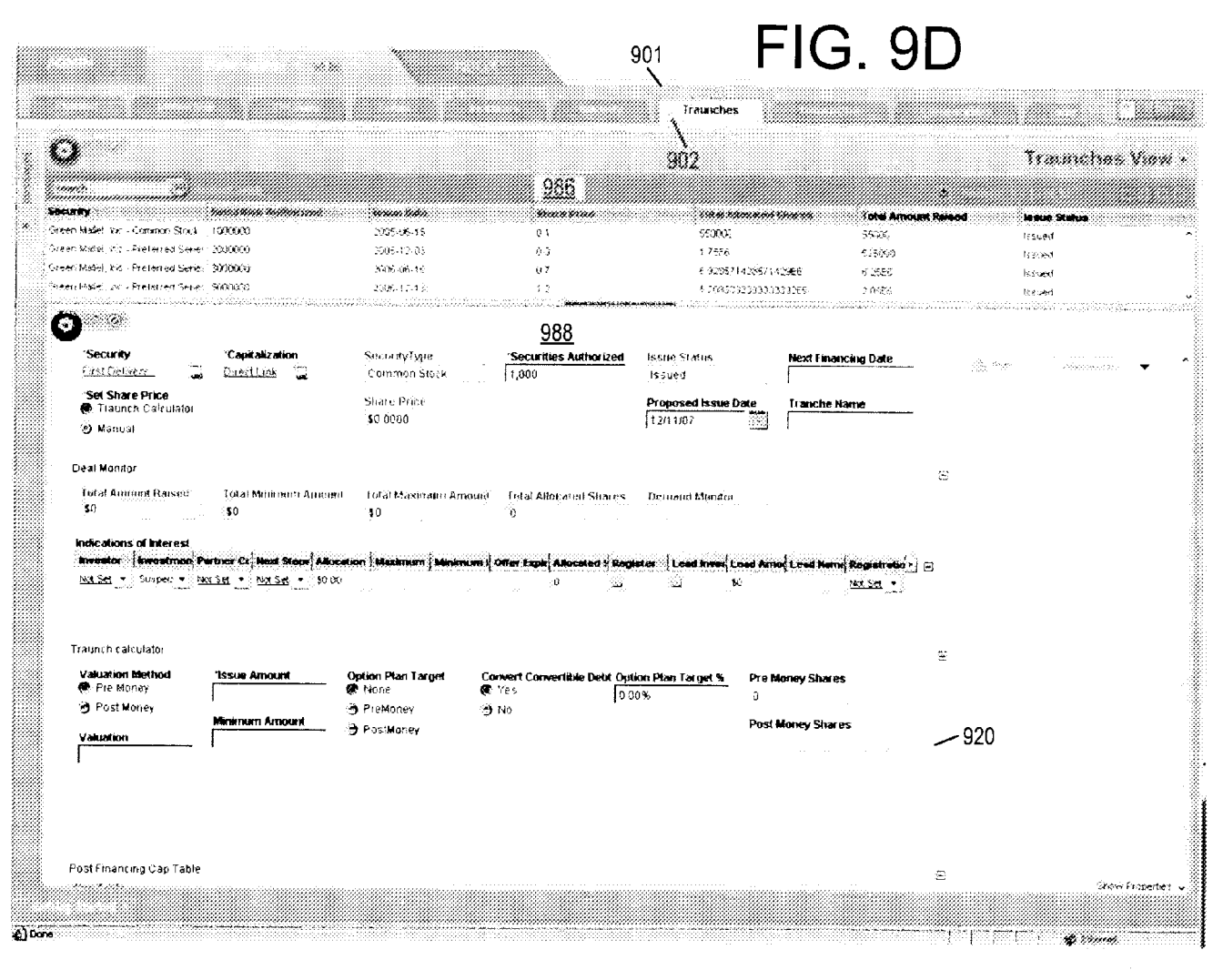

A traunche calculator button 914 is provided which used by the user to calculate a share price based on a proposed valuation and proposed issue amount. The traunche calculator facilitates the comparison of financing scenarios and the assessment of their impact on the company capitalization. FIG. 9D shows screen display 901 when the traunche calculator is displayed in field 920. The user selects pre-money or post-money valuation and enters the proposed valuation and issue amount. If the user wants a target option pool, the appropriate option is selected and the percent is entered. Lastly, the user selects whether convertible debt should be converted to equity. Once the record is saved, the post money shares are displayed and the share price is displayed in field 910. Also, as indicated above, the record can be saved without incorporating the data into the company capitalization. If the record is saved but an issue date is not specified, then the company capitalization is not updated. The traunche calculator may therefore be used to compare of financing scenarios and assessing their impact on the company capitalization without necessarily updating the capitalization table.

Once the traunche has been saved, the prospective capitalization table of the company can be previewed by highlighting the traunche and clicking the icon 997. In response to selection of icon 997, a menu is provided from which the user may make further selections to view the prospective capitalization table. The preview of the company capitalization table is provided in field 914.

The traunches tab logic 234 includes a term sheet generator that generates a term sheet for the financing (see FIGS. 9B and 9C). The term sheet generator generates term sheets based on template language and, for example, incorporates the share price, total shares issued, structure of the investment, and other information. The information for the term generator is populated using the information associated with the security class.

Referring now to FIG. 10, a screen display 1001 is shown that may be generated for example when the user selects transactions tab 1002. The screen display 1001 may also be provided in response to other user inputs, for example, if the user clicks on a particular transaction from within another screen display. The screen display 1001 is generated using the transaction tab logic 236.

Responsive to the user clicking on new record icon 1097, the transaction tab logic may receive and store information regarding new equity transactions. Data received from the user may include information regarding the security, the investor, the transaction type, shares, price and transaction date. If a counterparty in a transaction is not a registered user, then an e-mail may be sent to the counterparty by system 100 inviting the counterparty to become a registered user. The natural progression of conducting transactions through system 100 causes the base of users to increase.

By permitting users to conduct transactions involving equity securities through transactions tab 1002, system 100 is able to collect market data regarding registered companies. The data is collected at the most atomic level, in the context of individual transactions. Further, as described below, information regarding other types of transactions including debt transactions and options transactions may also be collected in the same manner. Transactions may be conducted in the context of primary market trading (e.g., between a company and an investor) or secondary market trading (e.g., between two investors). System 100 thereby provides a private equity and private debt marketplace for trading in the primary and secondary markets. The data collected during operation of the marketplace may then be fed back into other portions of system 100, for example, to provide updated company financial information, to provide updated market analytics, and so on.

Figure 11A:
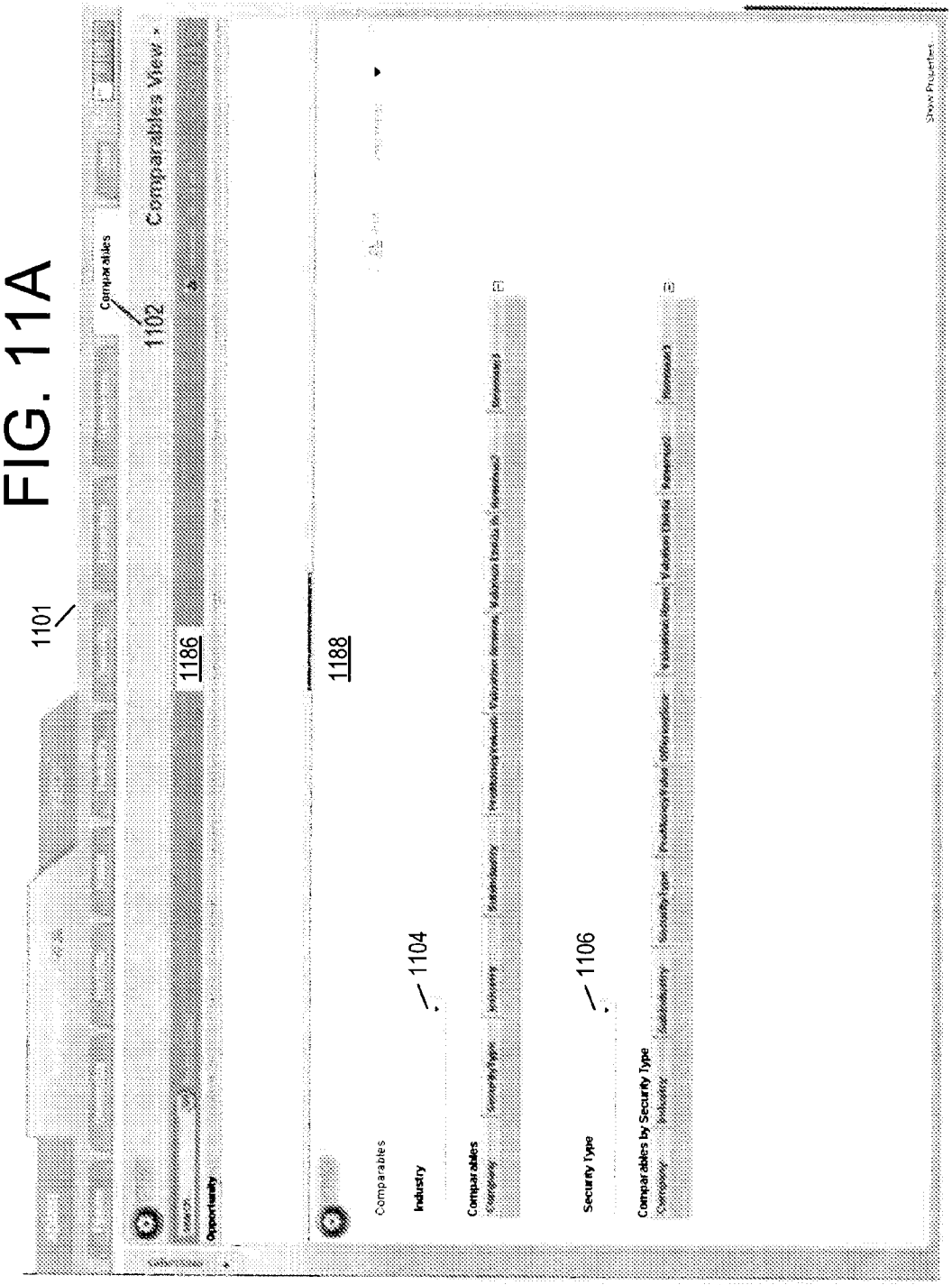
Figure 11C:
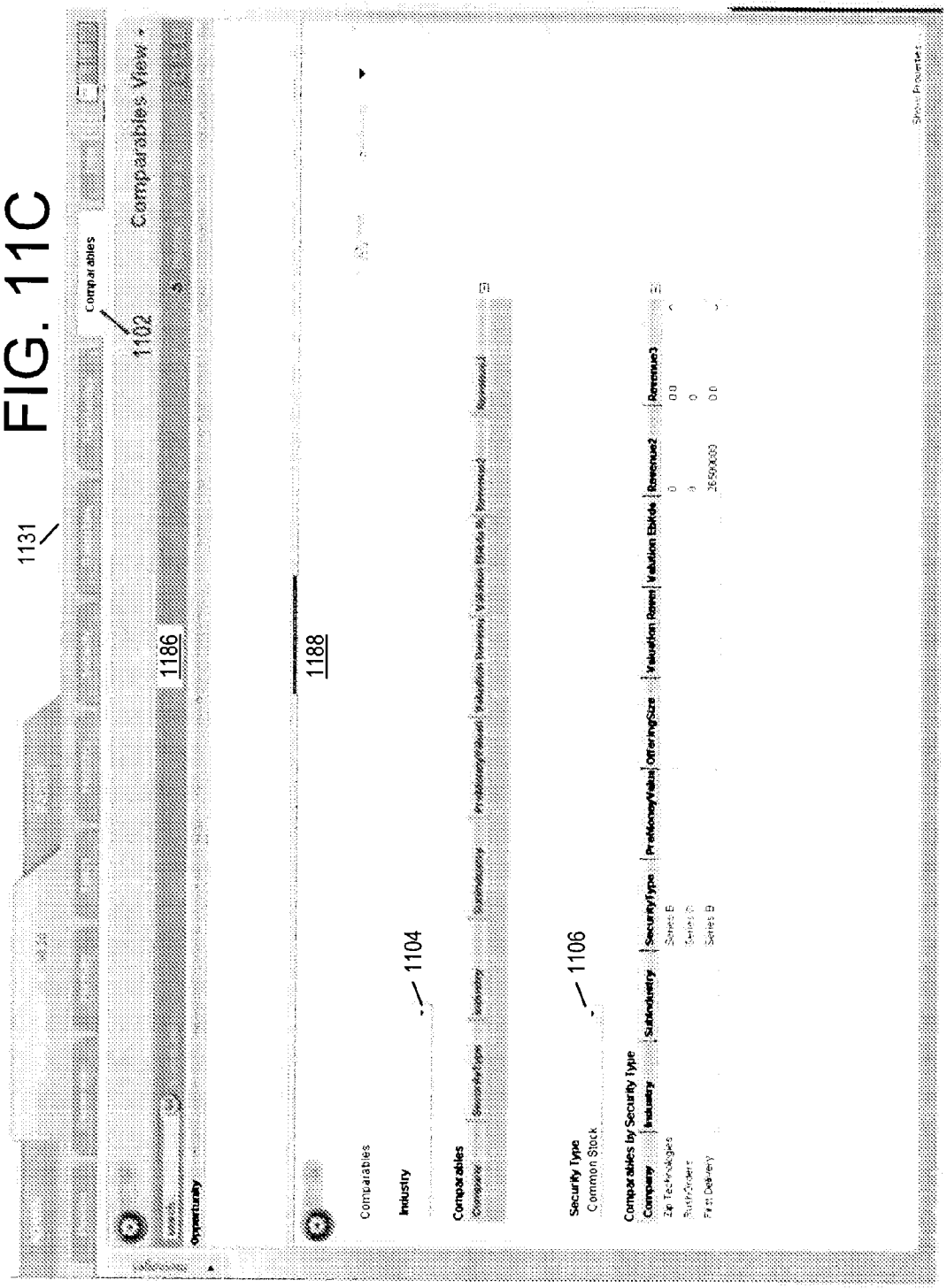

Referring now to FIGS. 11A-11C, a screen display 1101 is shown that may be generated for example when the user selects comparables tab 1102. The screen display 1101 is generated using the comparables tab logic 238.

As shown in FIG. 11A, the user may obtain comparables information based on industry using a pull-down menu 1104 or may obtain comparables information based on security type using a pull-down menu 1106. In FIG. 11B, the user has selected to be provided comparables for the apparel industry, and is provided such information in screen display 1121. In FIG. 11C, the user has selected to be provided comparables for the apparel industry, and is provided such information in screen display 1131. The user may be provided with information such as valuation, revenue, EBITDA, and so on, for comparable companies.

The system aggregates data from all companies and presents it (on an opt-in basis for each company) on the screen display 1101. Market data (e.g., whether a company is in a particular sub-industry) may be collected in the pipeline tab 302 when a company is registered in system 100. For example, the comparables data may be based on the company registration data, where the issue status has gone from proposed to issued. The comparables data may also be generated based on actual transaction data collected by the system 100 using transaction tab 1002. The comparables data may also be anonymized, e.g., the screen display may not provide company-identifying information for companies in which the user is not an investor or other stakeholder.

Figure 12A:
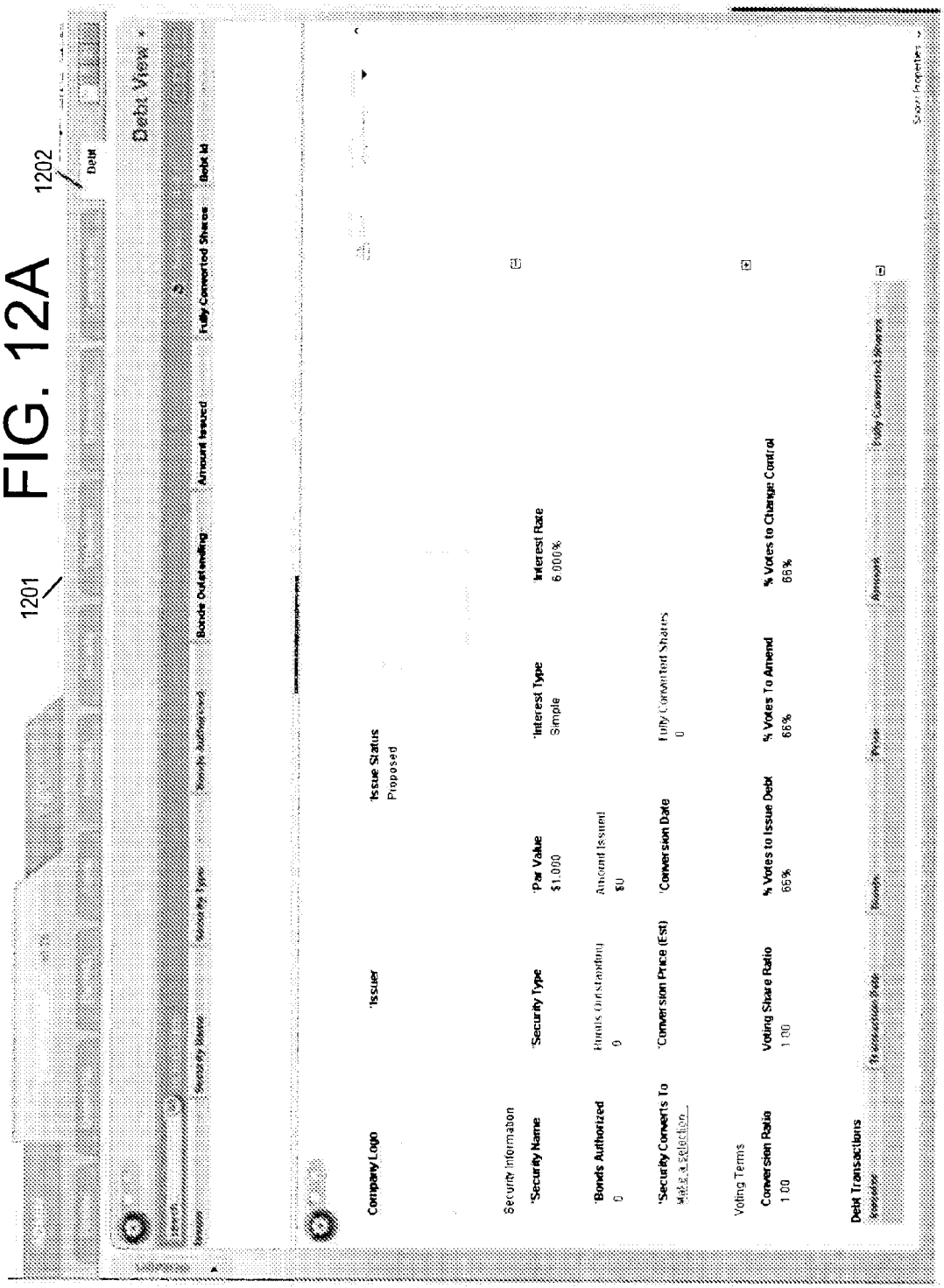
FIGS. 12A-12B are a screen display provided in connection with a debt tab according to an example embodiment.
Figure 12B:
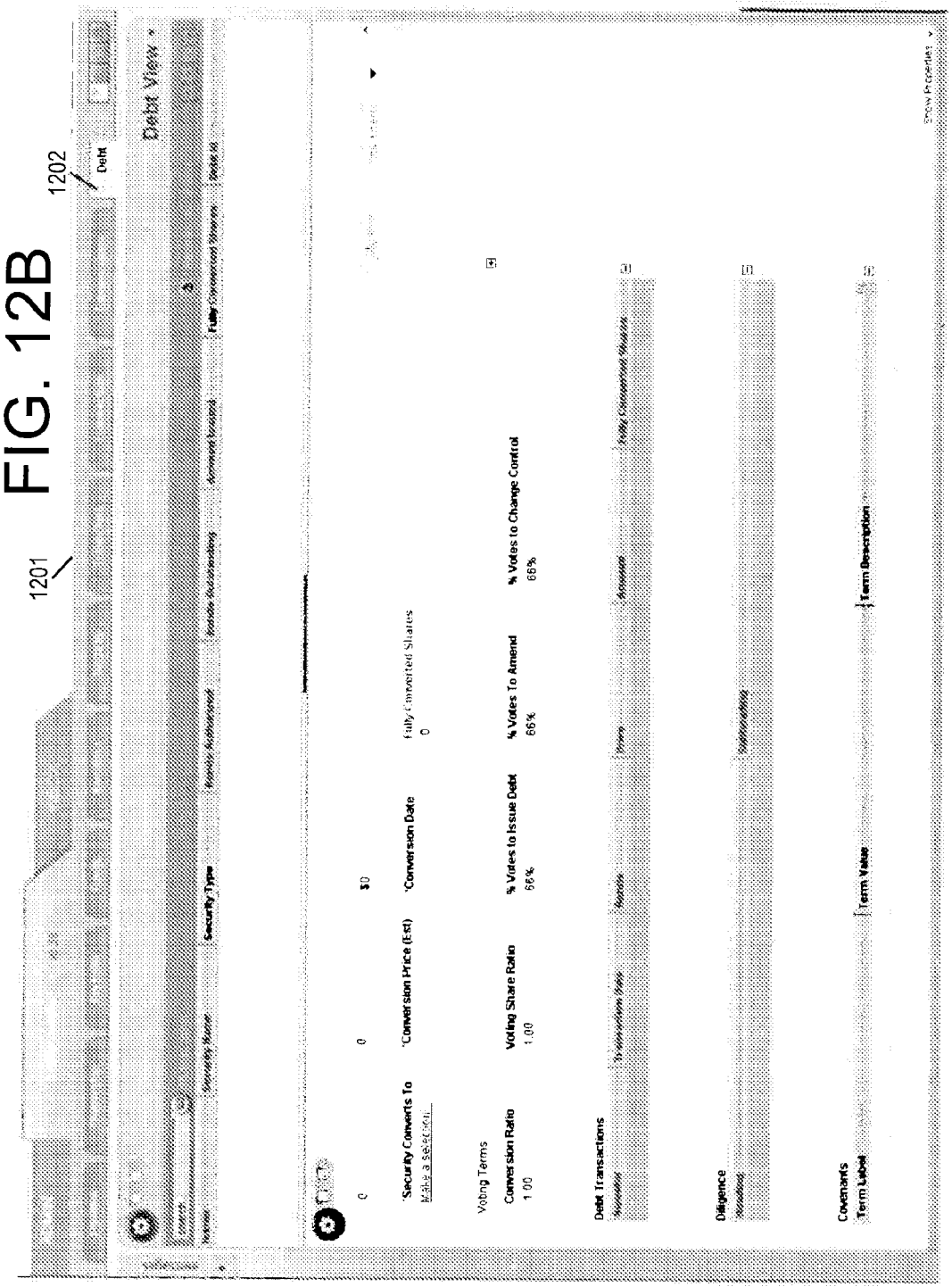

Referring now to FIGS. 12A-12B and FIG. 13, a screen display 1201 is shown in FIGS. 12A-12B that may be generated for example when the user selects debt tab 1202. The screen display 1201 is generated using the debt tab logic 240. In FIG. 13, a screen display 1301 is shown that may be generated for example when the user selects debt transactions tab 1302. The screen display 1301 is generated using the debt transactions tab logic 242. The debt tab 1202 and debt transactions tab 1302 may provide similar tools for the user as are provided by the security tab 802 and the transaction tab 1002. That is, the debt tab 1202 may be used to create/edit records for new/existing debt securities (instead of equity securities), and the debt transactions tab 1302 may be used to create and edit records for debt security transactions (instead of equity securities transactions).

In an example embodiment, debt transactions tab 1302 is configured to facilitate debt conversions. To convert debt into equity, the user may select the debt transaction that is to be converted from within the debt transactions tab 1302. Icon 1397 may be selected to cause a window to open in which the user enters the number of bonds to convert (which equals the value of the debt if the notes were issued at $1.00 par value) and the transaction date. The number of bonds held as shown in field 1310 then decreases by the number converted and the investor will own shares based on a conversion ratio. Field 1314 shows previously converted bonds. The capitalization table in FIGS.

Figure 14:
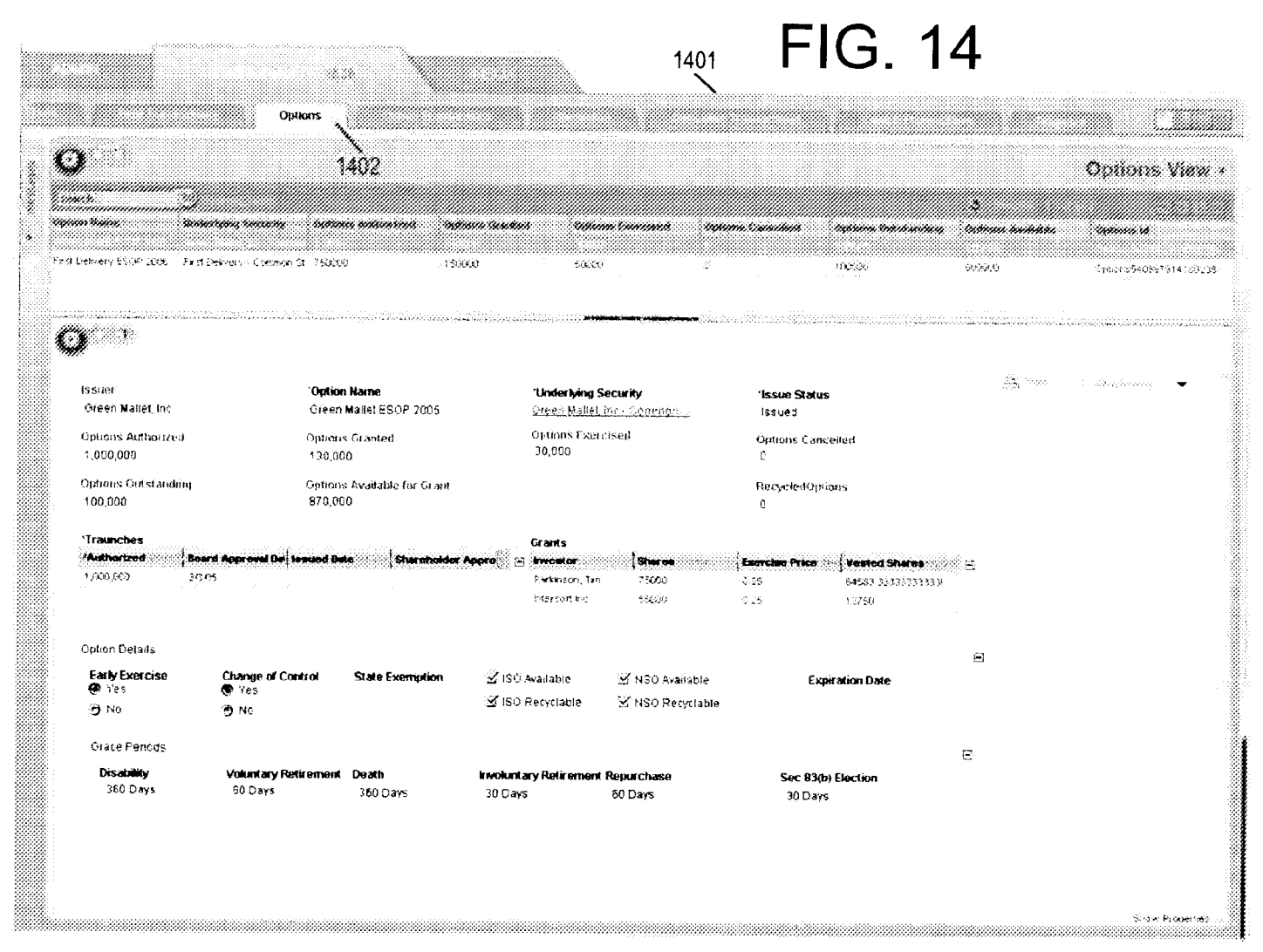
Figure 15A:
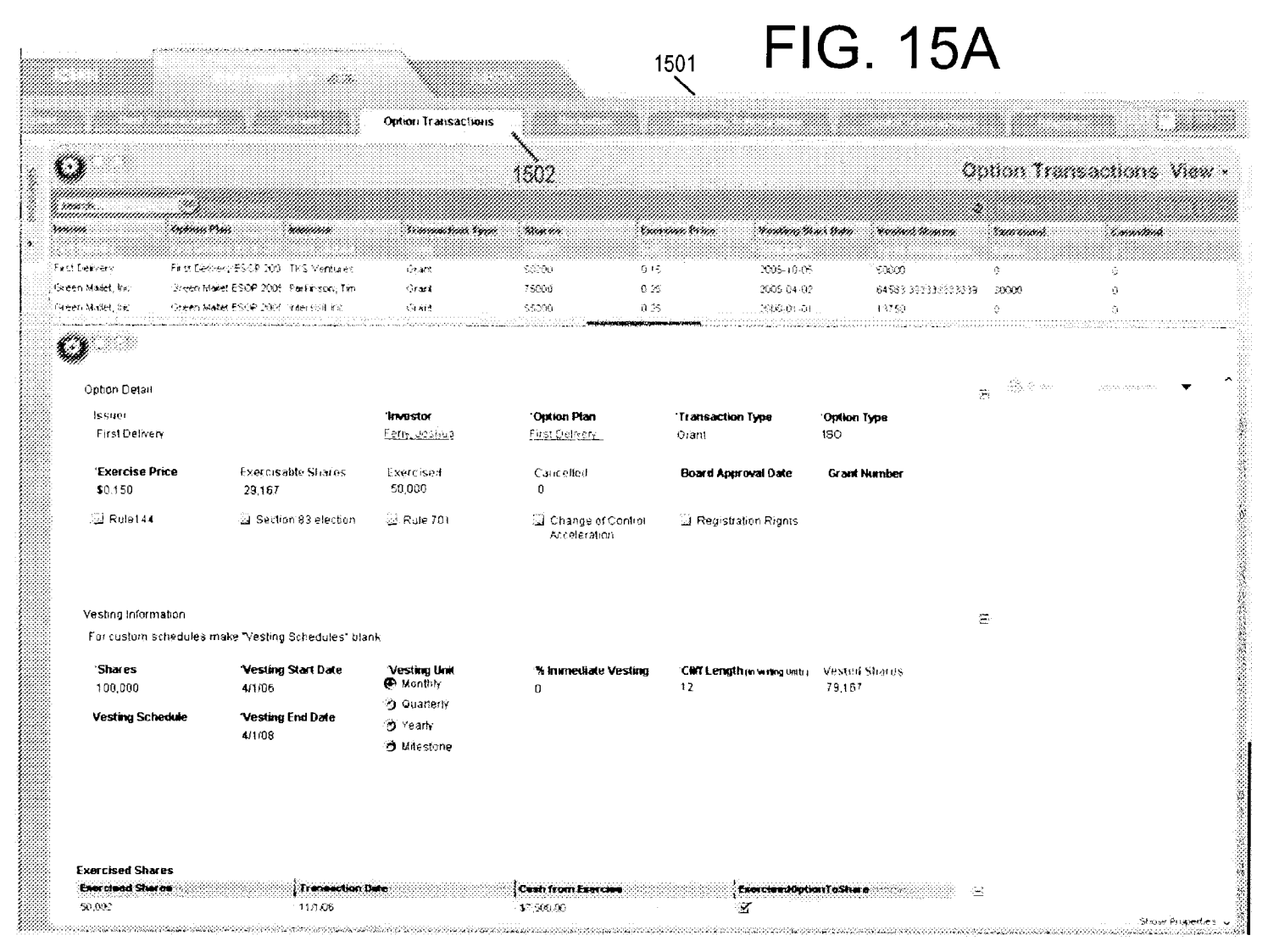
Figure 15B:
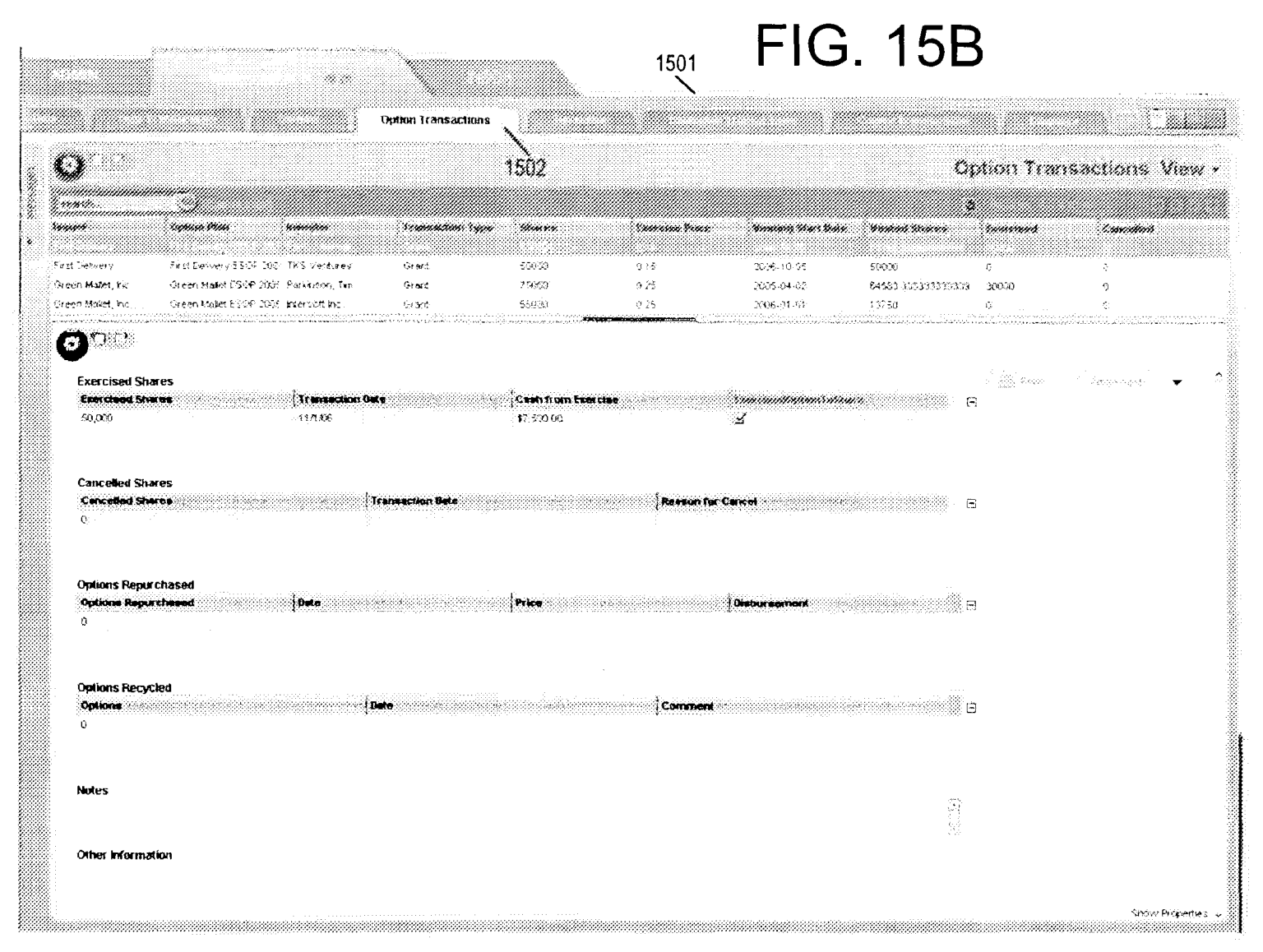

Referring now to FIG. 14 and FIGS. 15A-15B, a screen display 1401 is shown in FIG. 14 that may be generated for example when the user selects options tab 1402. The screen display 1401 is generated using the options tab logic 244. In FIGS. 15A-15B, a screen display 1501 is shown that may be generated for example when the user selects options transactions tab 1502. The screen display 1501 is generated using the options transactions tab logic 246. The options tab 1402 and options transactions tab 1502 may provide similar tools for the user as are provided by the security tab 802 and the transaction tab 1002. That is, the options tab 1402 may be used to create/edit records for new/existing options (instead of securities), and the options transactions tab 1502 may be used to create and edit records for options transactions (instead of securities transactions). The tabs 1402 and 1502 may be used to issue option grants, to exercise option grants, to cancel option grants, to repurchase option grants, and so on.

The exercise of shares and stock options grants awarded to employees in the company may be presented. An exercise option dialog box requests input of how many shares are to be exercised exercise and the transaction date. Based on this information, system 100 calculates the exercise price. If an investor wants to cancel his shares or an employee leaves the company, system 100 automatically chooses the departure date depending on the option plan grace period date and notifies the administrator that the grace period is coming due and will cancel the shares that were not exercised before the given date. The vesting schedule may also be edited. When options are exercised, the traunche calculator recalculates the shares available to be exercised, and the capitalization table in FIG. 4 is automatically updated. As indicated previously, business rules may also be included to ensure that the proper number of shares or securities are authorized by the board of directors.

In one example embodiment, a binomial pricing model is used to value options. The binomial pricing model uses a discrete-time framework to trace the evolution of the option's key underlying variable via a binomial lattice (tree) for a given number of time steps between valuation date and option expiration. Each node in the lattice represents a possible price of the underlying at a particular point in time. This price evolution forms the basis for the option valuation. The valuation process is iterative, starting at each final node, and then working backwards through the tree to the first node (valuation date), where the calculated result is the value of the option. The utilization of a binomial model facilitates handling stepwise pricing of private equity options. Binomial pricing also enables a valuation of options, e.g., employee stock ownership plan, warrants, etc., which permits an active private equity option pricing market based on an index basket of options. That is, it facilitates the creation of a basket of companies in one or more industry groups, and the trading of a basket of options associated with the basket of companies in the industry groups. Binomial pricing also permits mark-to-market valuation of securities using current market pricing.

Figure 16:
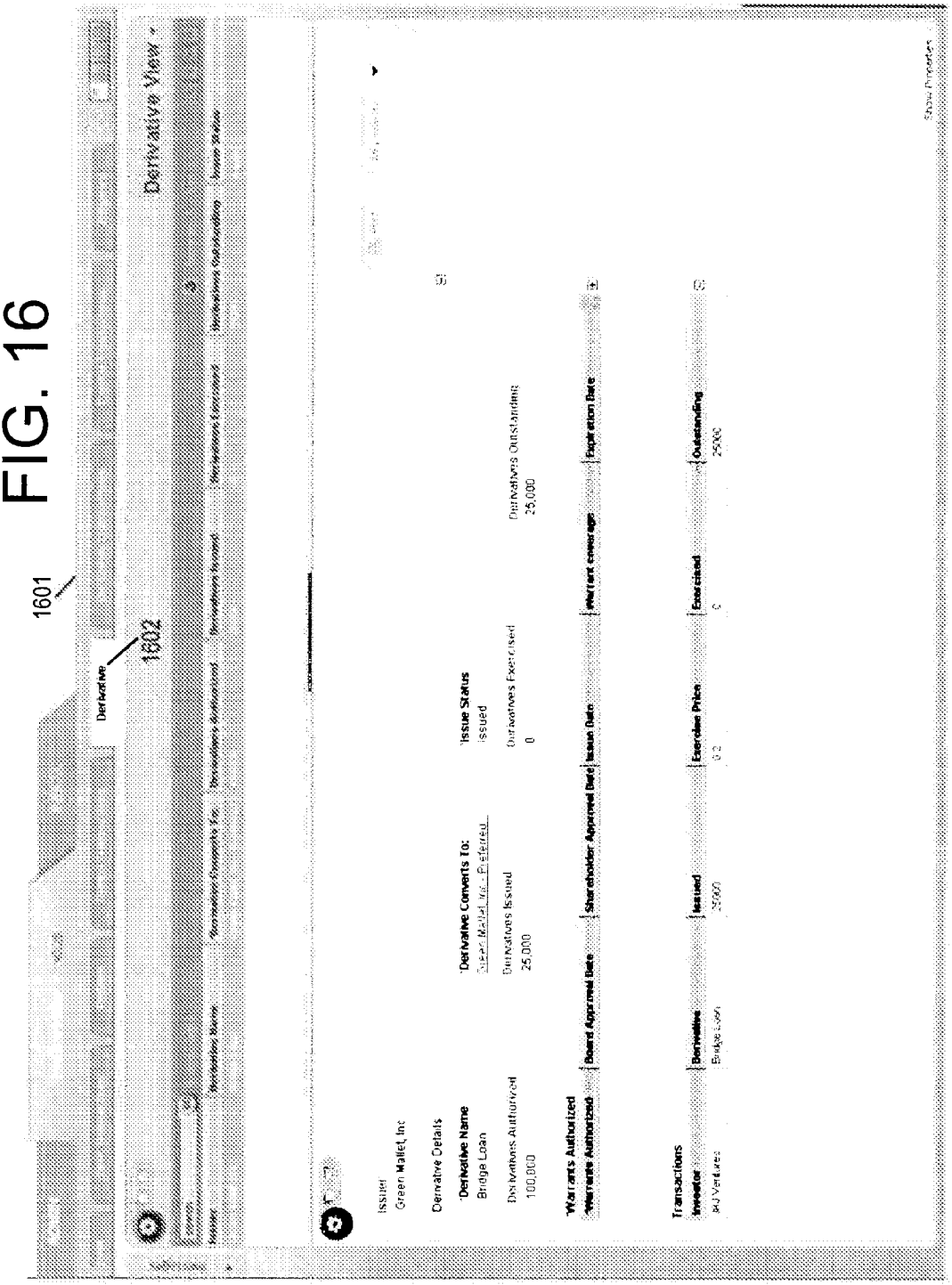
FIG. 16 is a screen display provided in connection with a derivative tab according to an example embodiment.
Figure 17:
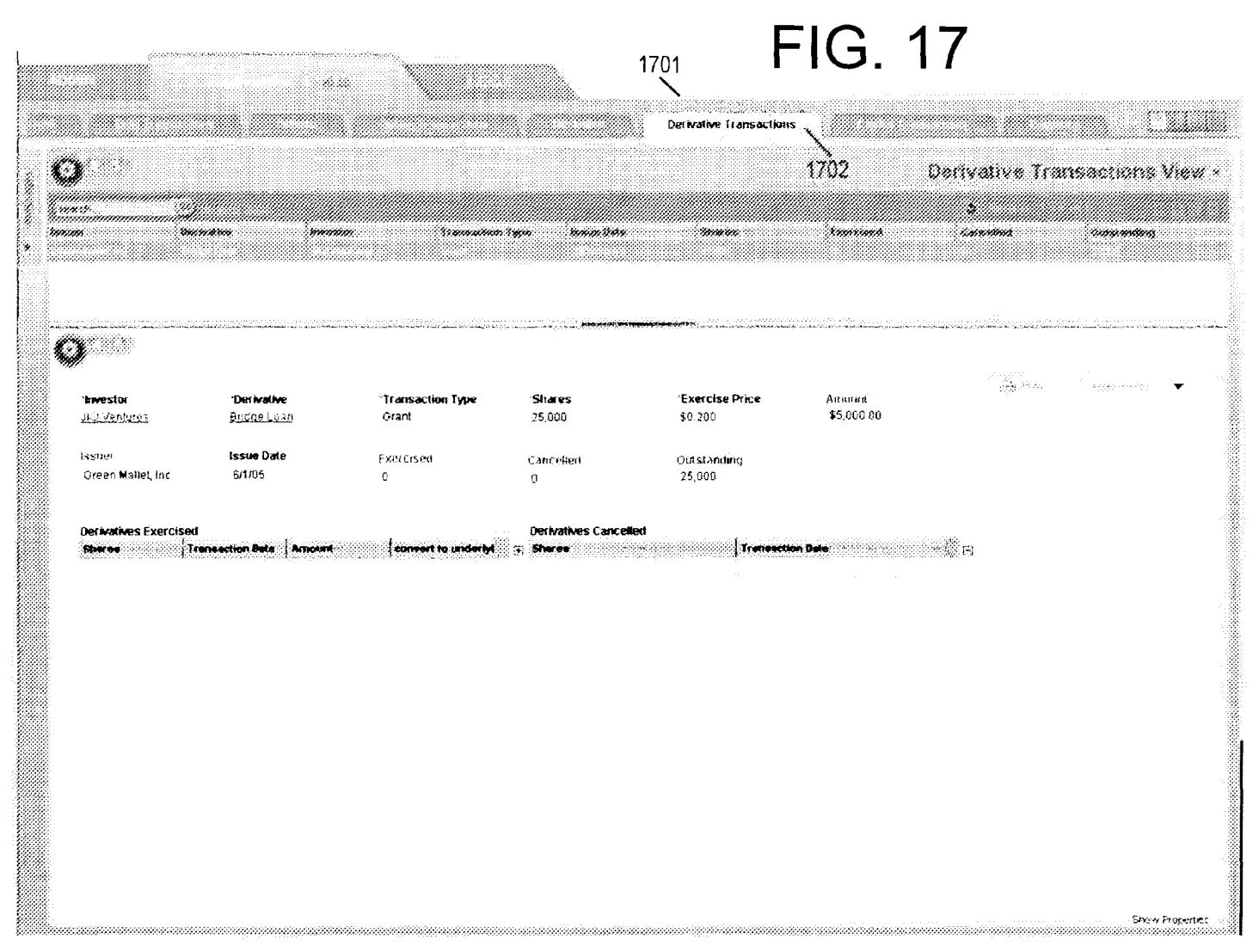

Referring now to FIGS. 16 and 17, a screen display 1601 is shown in FIG. 16 that may be generated for example when the user selects derivatives tab 1602. The screen display 1601 is generated using the derivative tab logic 248. In FIG. 17, a screen display 1701 is shown that may be generated for example when the user selects derivatives transactions tab 1702. The screen display 1701 is generated using the derivative transactions tab logic 250. The derivative tab 1602 and derivative transactions tab 1702 may provide similar tools for the user as are provided by the security tab 802 and the transaction tab 1002. That is, the derivative tab 1602 may be used to create/edit records for new/existing derivatives (instead of securities), and the derivative transactions tab 1702 may be used to create and edit records for options transactions (instead of securities transactions). The derivatives tab 1602 and derivative transactions tab 1702 may be used to create new classes of warrants (derivatives), grant warrants, exercise warrants, and so on.

Figure 18:
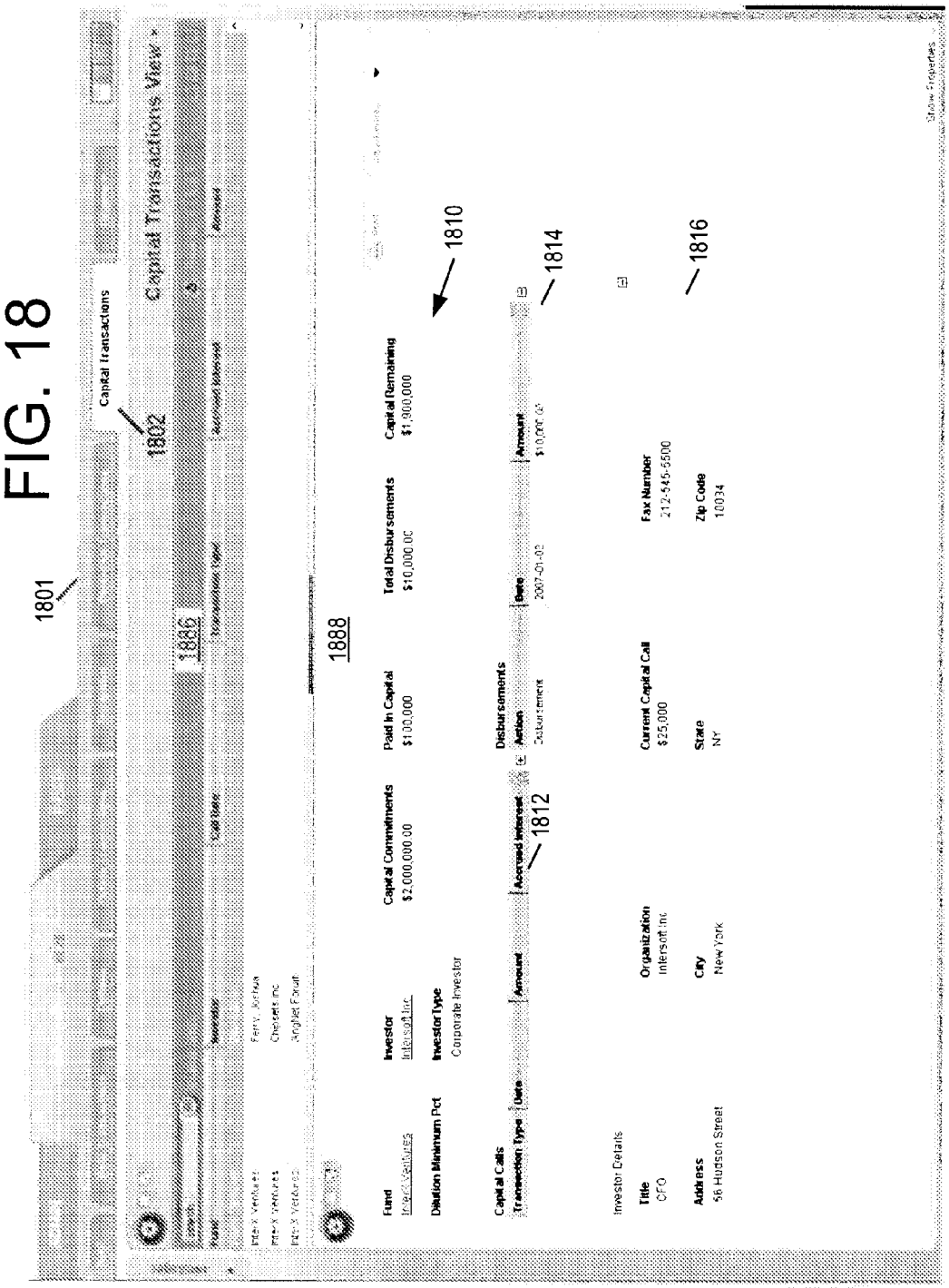
FIG. 18 is a screen display provided in connection with a capital transactions tab according to an example embodiment.

Referring now to FIG. 18, a screen display 1801 is shown that may be generated for example when the user selects capital transactions tab 1802. The screen display 1801 is generated using the capital transactions tab logic 252. The capital transactions tab 1802 provides tools to assist with tracking capital commitments of investors and making capital calls. Upper view pane 1886 includes a listing of investors. For a specific investor selected in upper view pane 1886, lower view pane 1888 shows additional information such as capital commitments, paid in capital, total disbursements, and capital remaining in field 1810. Fields 1812 and 1814 facilitate the making of capital calls and capital disbursements. Field 1816 provides additional investor details.

Figure 19:
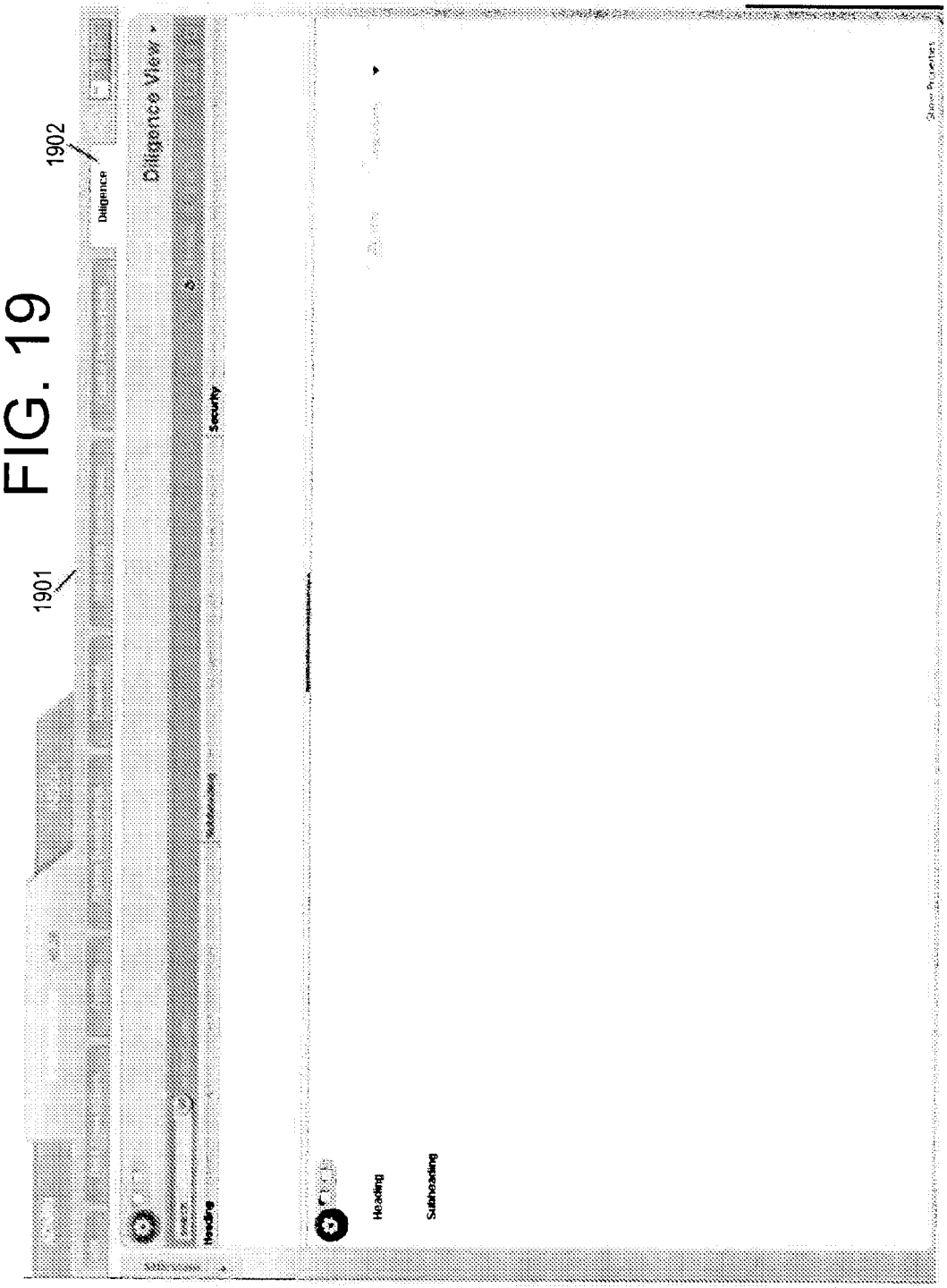
FIG. 19 is a screen display provided in connection with a diligence tab according to an example embodiment.

Referring now to FIG. 19, a screen display 1901 is shown that may be generated for example when the user selects diligence tab 1902. The screen display 1901 is generated using the diligence tab logic 254. The diligence tab 1902 provides an electronic due diligence room which stores documents associated with the due diligence process, including prior purchase agreements, amendments, shareholder agreements, other contracts associated with the operation of the company, information regarding intellectual property, and so on. The documents in the due diligence room may be uploaded by users and made accessible to various parties associated with a proposed transaction.

Figure 20A:
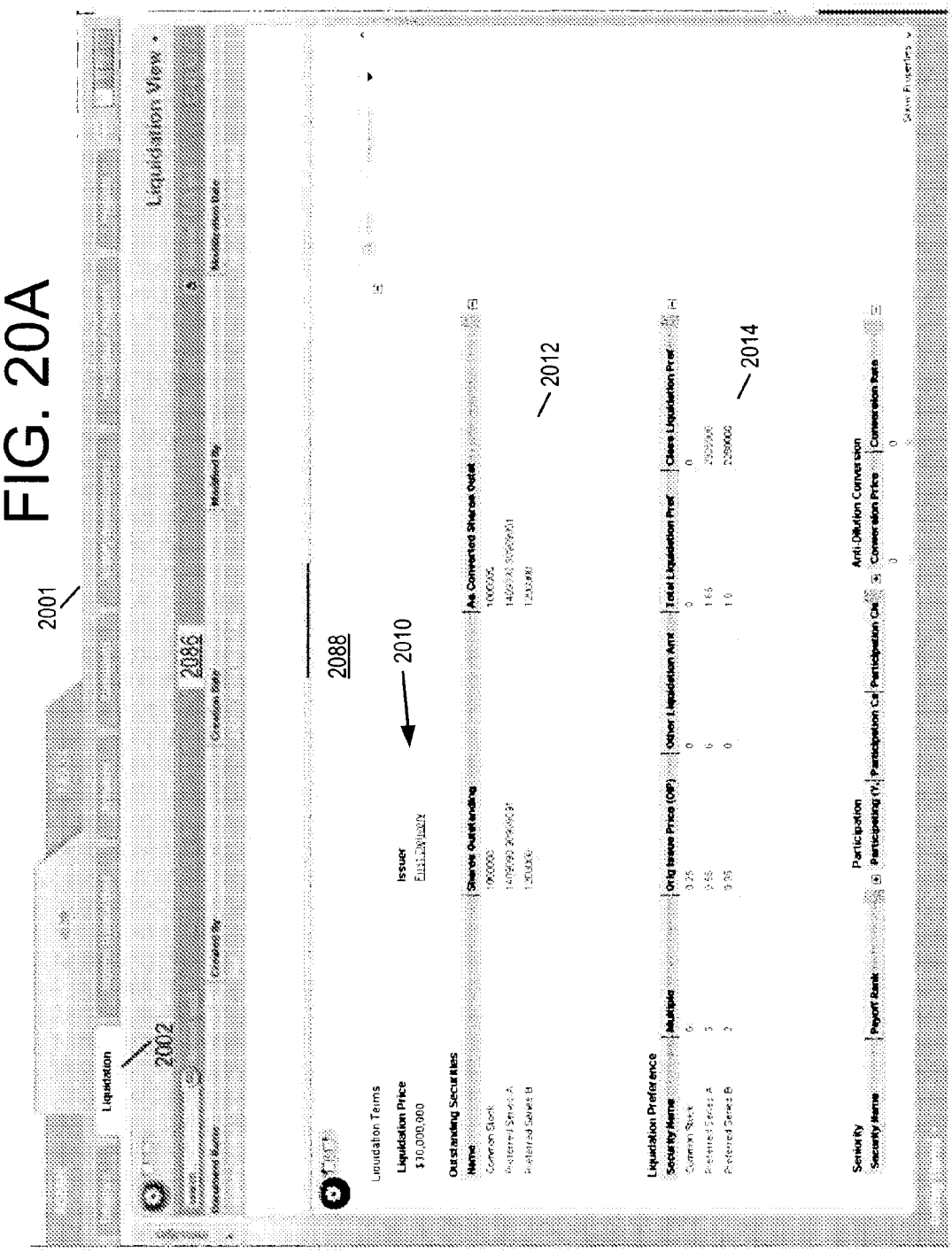
FIGS. 20A-20B are a screen display provided in connection with a liquidation tab according to an example embodiment.
Figure 20B:
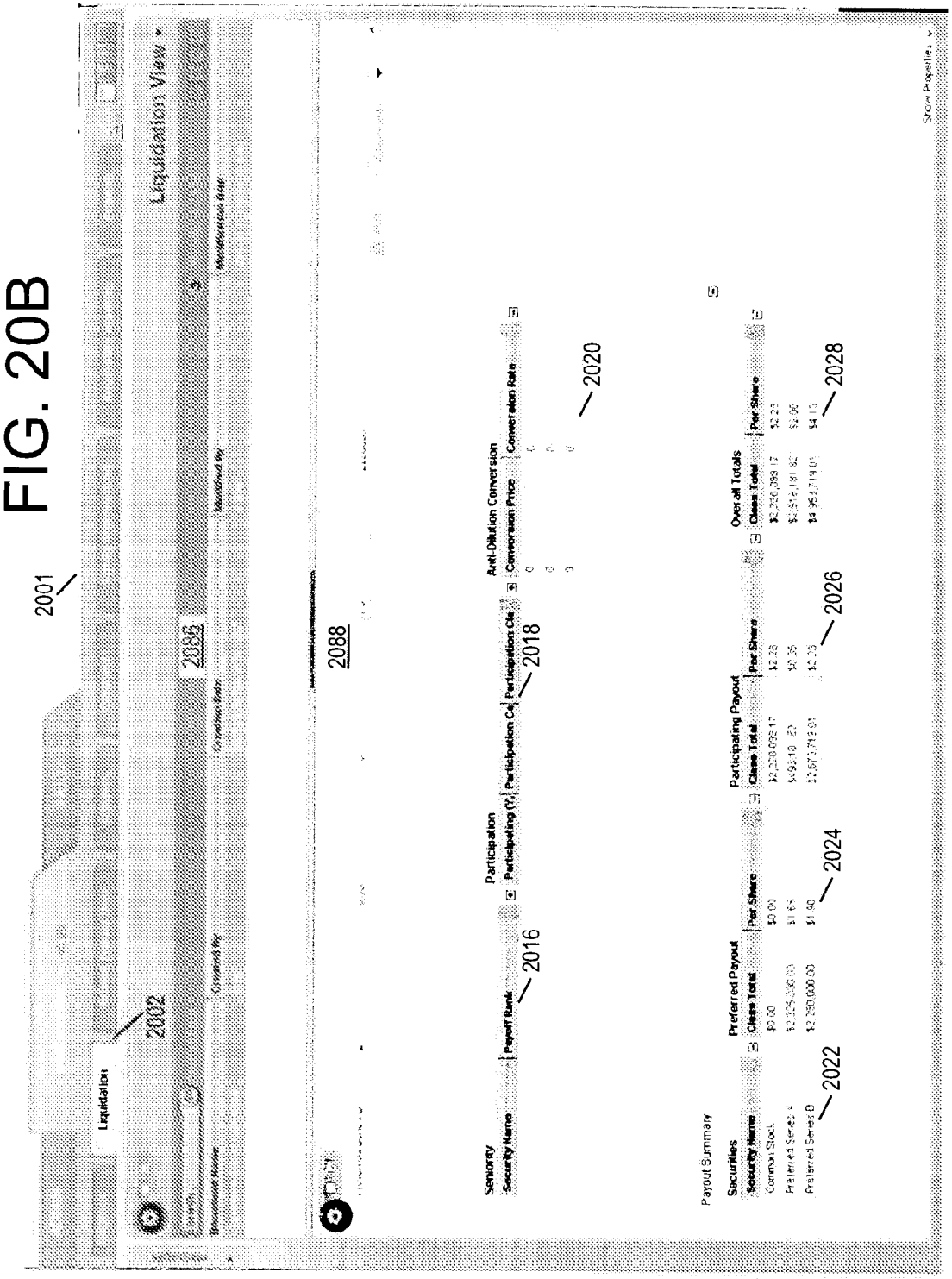

Referring now to FIGS. 20A-20B, a screen display 2001 is shown that may be generated for example when the user selects liquidation tab 2002. The screen display 2001 is generated using the liquidation tab logic 256.

The liquidation tab provides tools for assessing the payouts if a company is liquidated. In upper view pane 2086, various liquidation scenarios are identified. Each scenario is created by the user and is based on a different set of assumptions. In lower view pane 2088, information for a given scenario is entered. In field 2010, a hypothetical liquidation price is entered. Based on the investment structure as set forth in fields 2012-2020 (including a specification of the order in which the securities receive payouts), various securities receive different levels of payouts. The payouts are shown in fields 2022-2028.

Figure 21:
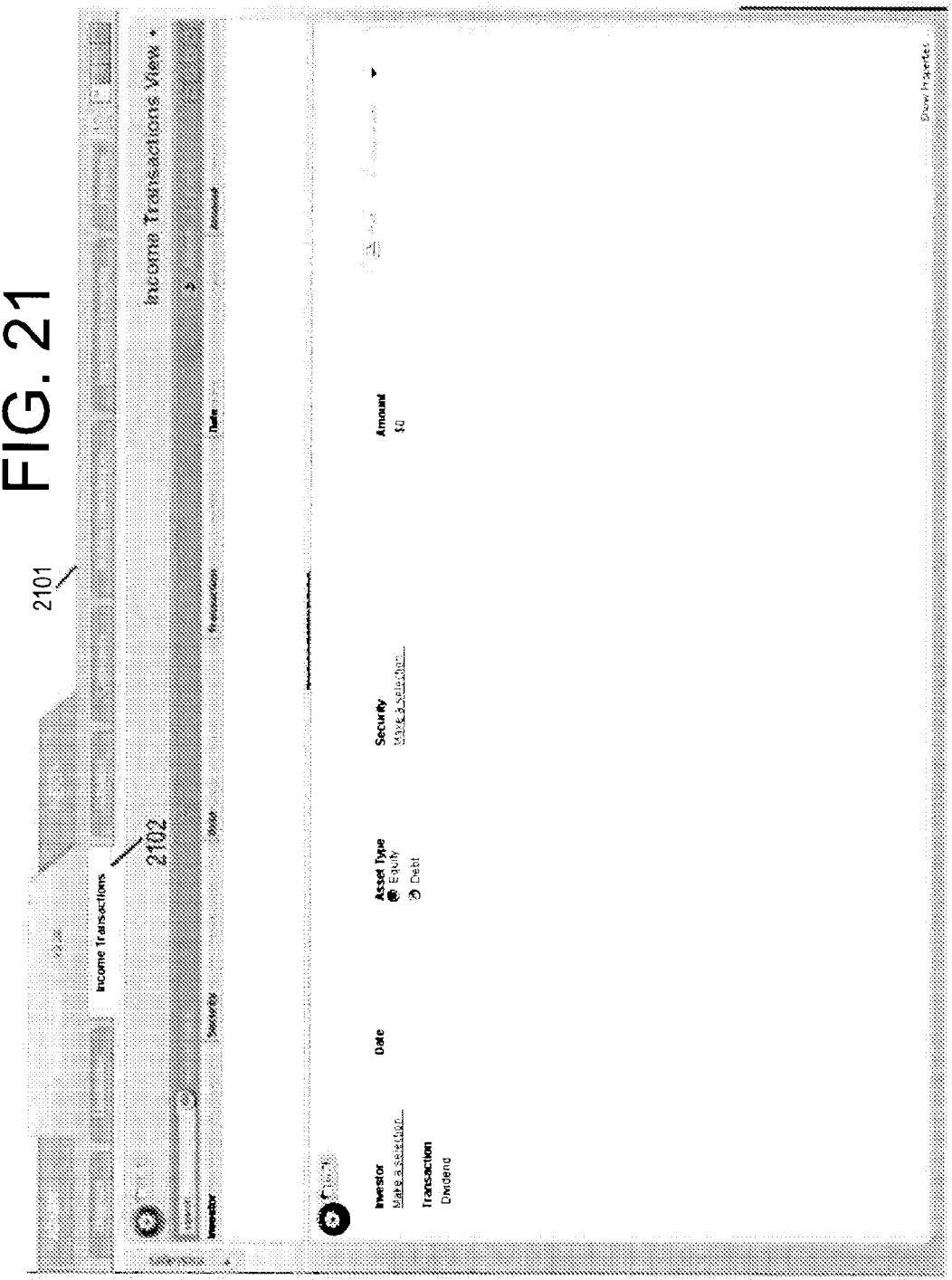
FIG. 21 is a screen display provided in connection with an income transactions tab according to an example embodiment.

Referring now to FIG. 21, a screen display 2101 is shown that may be generated for example when the user selects income transactions tab 2102. The screen display 2101 is generated using the income transactions tab logic 258. The income transaction tab 2102 provides tools to capture information associated with income events, such as the distribution of dividends.

Figure 22:
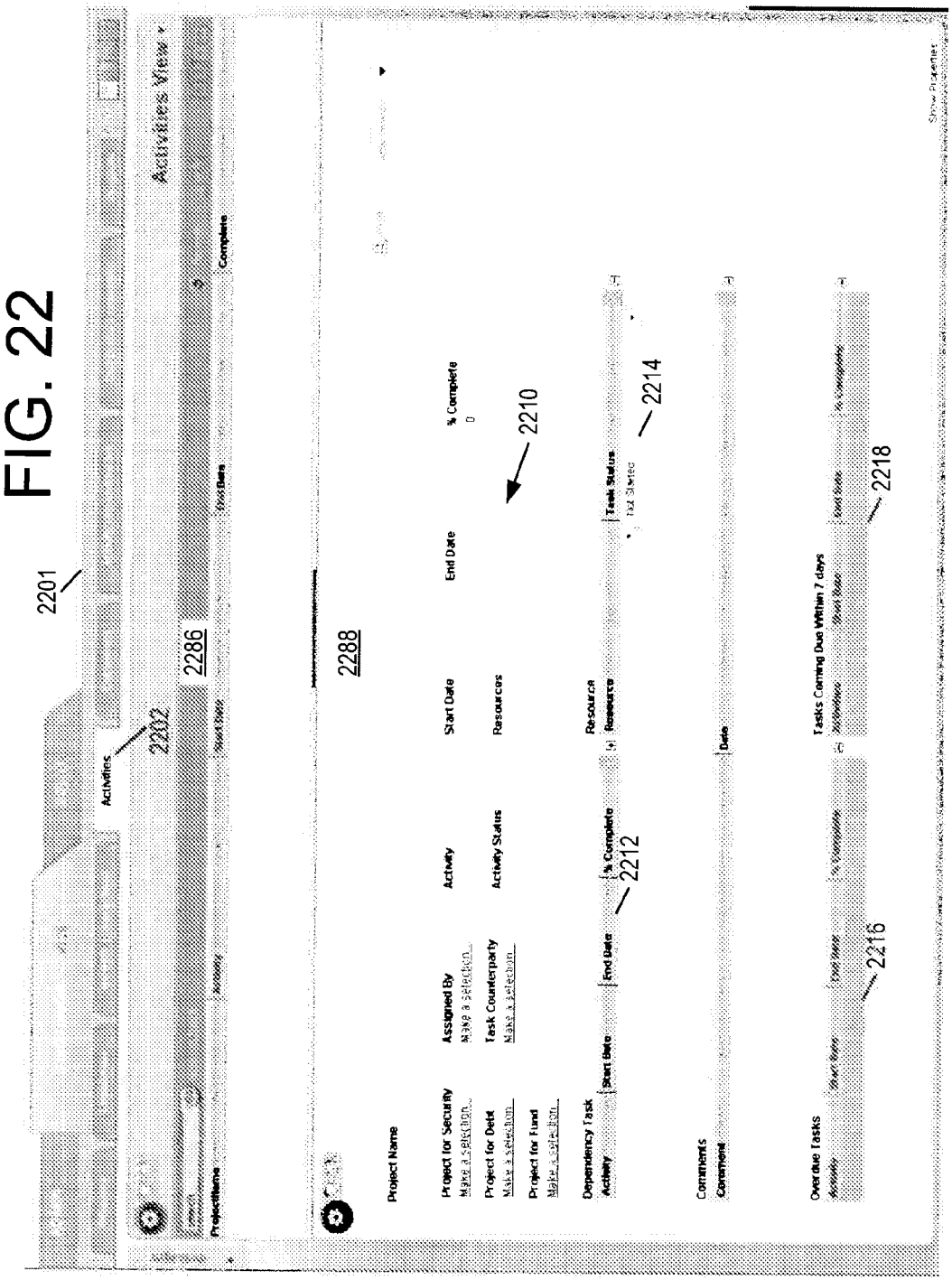
FIG. 22 is a screen display provided in connection with an activities tab according to an example embodiment.

Referring now to FIG. 22, a screen display 2201 is shown that may be generated for example when the user selects activities tab 2202. The screen display 2201 is generated using the activities tab logic 260. The activities tab 2202 provides tools to track due diligence related activities. In field 2210, tasks may be assigned to different parties and information regarding the start date, end date, status, and so on, of the task may be tracked. Task dependencies and resources required may be tracked in fields 2212 and 2214, respectively.

Figure 23:
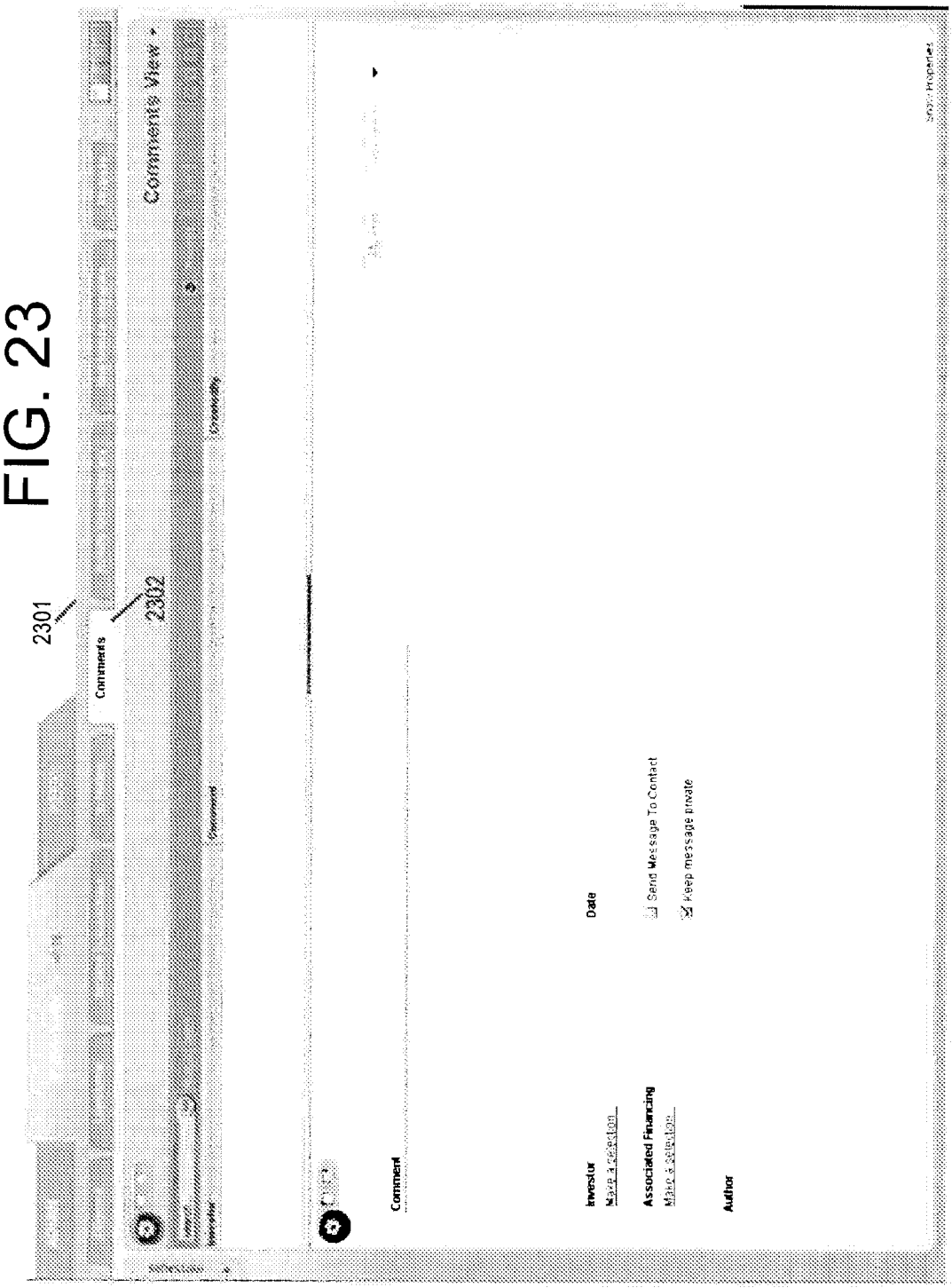
FIG. 23 is a screen display provided in connection with a comments tab according to an example embodiment.

Referring now to FIG. 23, a screen display 2301 is shown that may be generated for example when the user selects comments tab 2302. The screen display 2301 is generated using the comments tab logic 262. The comments tab 2302 provides tools to facilitate the communication of messages between stakeholders in a transaction, e.g., during due diligence, during an initial round of financing, and so on. The messages may be designated as public or may be kept as private.

Figure 24:
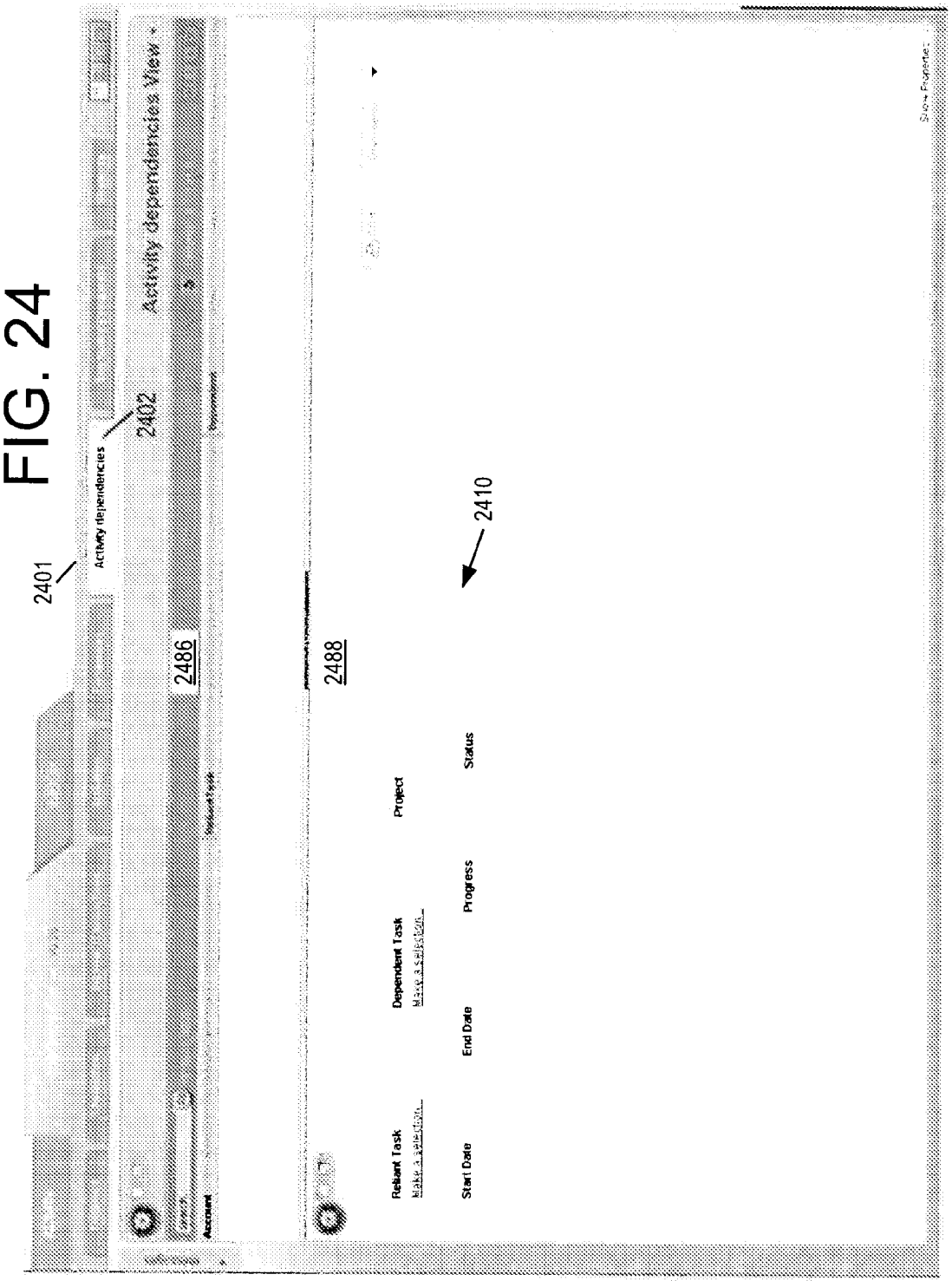
FIG. 24 is a screen display provided in connection with an activity dependencies tab according to an example embodiment.

Referring now to FIG. 24, a screen display 2401 is shown that may be generated for example when the user selects activity dependencies tab 2402. The screen display 2401 is generated using the activity dependencies tab logic 264. The activity dependencies tab 2402 provides tools to track information regarding activity dependencies (e.g., which activities depend on the prior performance of other activities). Such data is used to populate field 2212 of FIG. 22.

Figure 25:
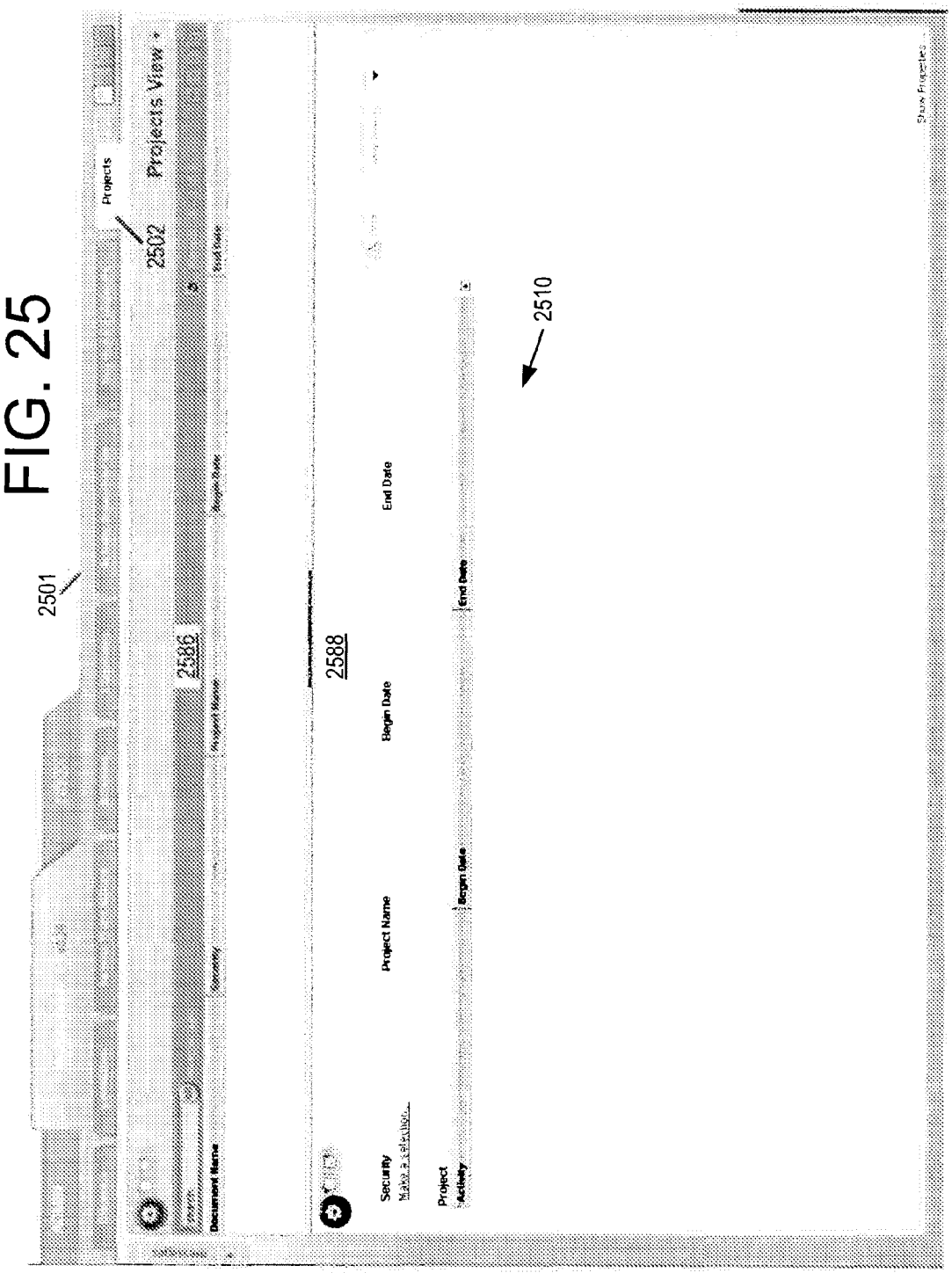
FIG. 25 is a screen display provided in connection with a projects tab according to an example embodiment.

Referring now to FIG. 25, a screen display 2501 is shown that may be generated for example when the user selects projects tab 2502. The screen display 2501 is generated using the projects tab logic 266. Projects tab 2502 may be used for project management. For example, a project plan may be created for a due diligence project. The project may include various activities, as shown in field 2510. Such activities are used to populate the activity dependencies tab 2402. Such a project may involve the performance of activities by individuals on both sides of a transaction (e.g., company and investor). Comments tab 2302 may be used to facilitate the communication of messages between the two sides of the transaction regarding the performance of such activities. The status of activities may be dynamically updated between applications to reflect tasks performed by different stakeholders.

Figure 26:
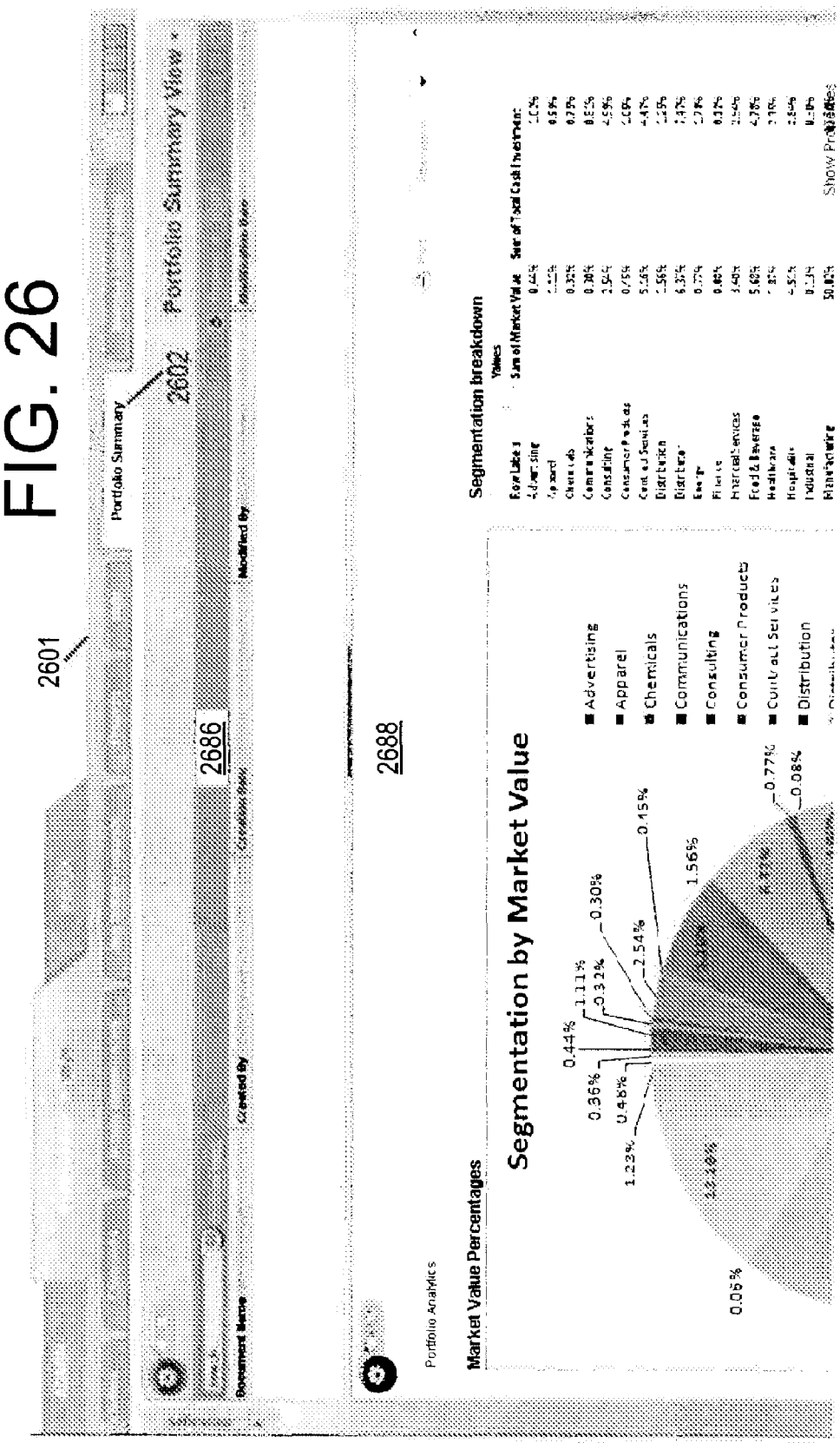
FIG. 26 is a screen display provided in connection with a portfolio summary tab according to an example embodiment.

Referring now to FIG. 26, a screen display 2601 is shown that may be generated for example when the user selects portfolio summary tab 2602. The screen display 2601 is generated using the portfolio summary tab logic 268 and provides the breakdown of the investments in the portfolio. Various portfolio analytics may be provided based on transaction data collected by system 100 and/or based on data from third-party sources. For example, graphical analyses of portfolio companies' market values and segmentation may be shown. Other features may include performance reporting, portfolio segmentation, and portfolio planning and scenario analysis.

Figure 27:
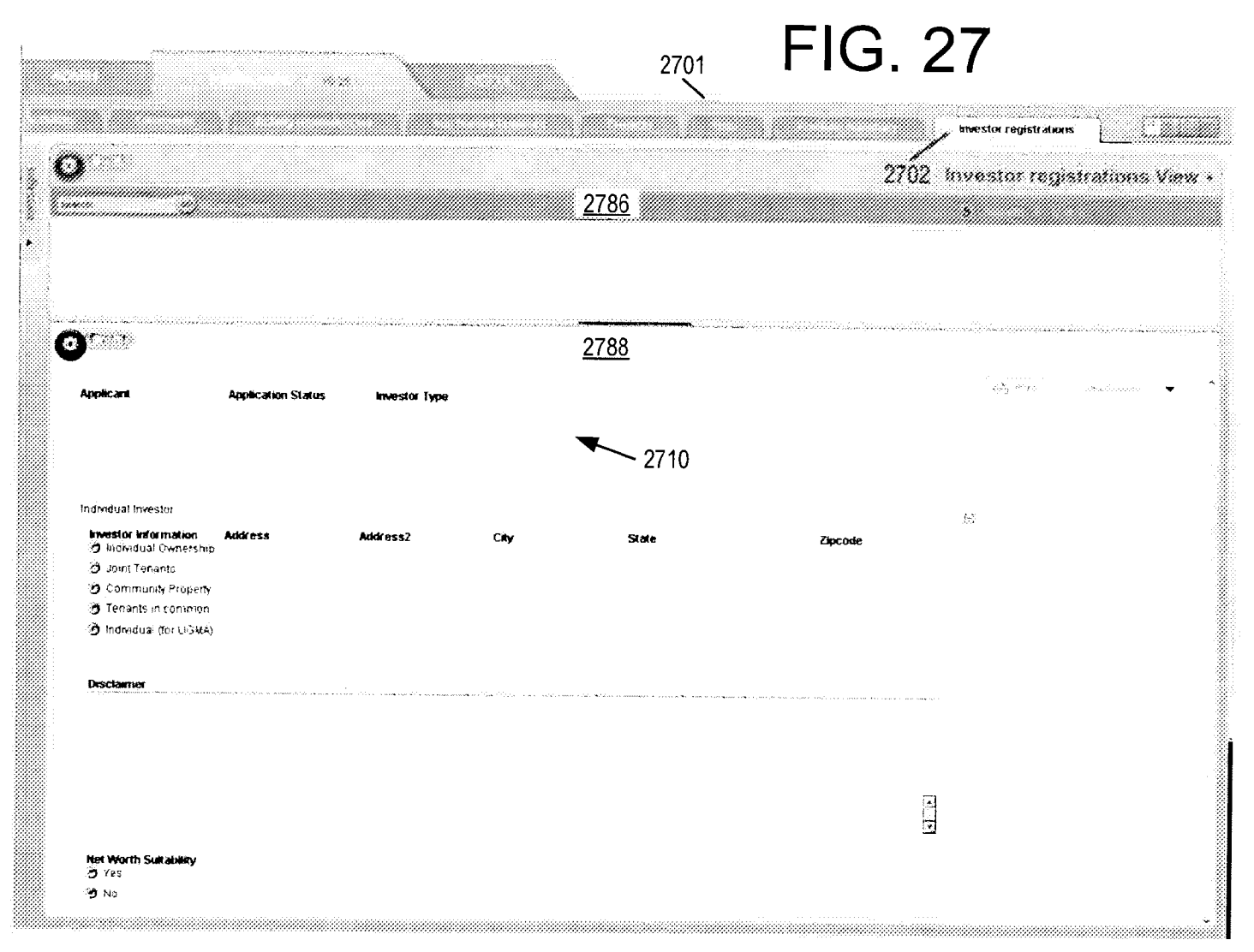

Referring now to FIG. 27, a screen display 2701 is shown that may be generated for example when the user selects investor registrations tab 2702. The screen display 2701 is generated using the investor registrations tab logic 270. For example, if a counterparty in a transaction is not registered in system 100, the counterparty may receive an e-mail inviting the counterparty to register, as previously described. In such an scenario, the counterparty may be taken to investor registration tab 2702 to register and provide investor information. Applications 204-208 may include similar tabs for individual investors, companies, and exchanges, respectively. In the context of a company registration, for example, company information that is collected may include the financials, the competitors, the market size, the management team, the directors, and so on. Again, data may be communicated between applications 202-208 in this regard. For example, when a company registers, the information that is entered may then be used to populate displays provided to investors concerning the company. Likewise, when a new user signs up for the system, the data that is provided by the user may be anonymized, aggregated and used for market analytics.

Figure 28A:
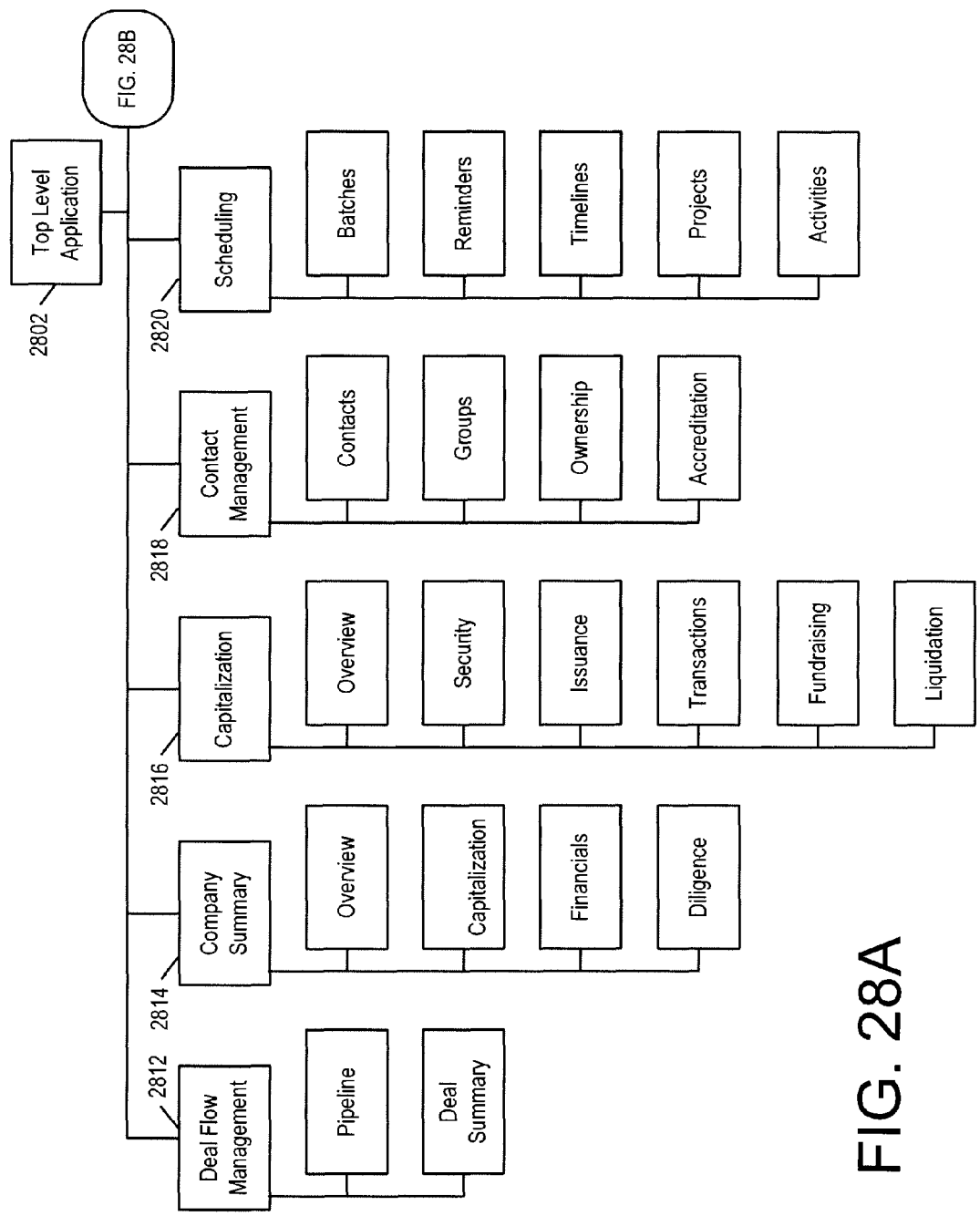
FIGS. 28A-28B depict an alternative layout for the graphical user interface for the PCMS logic of FIG. 1 according to an example embodiment.
Figure 28B:
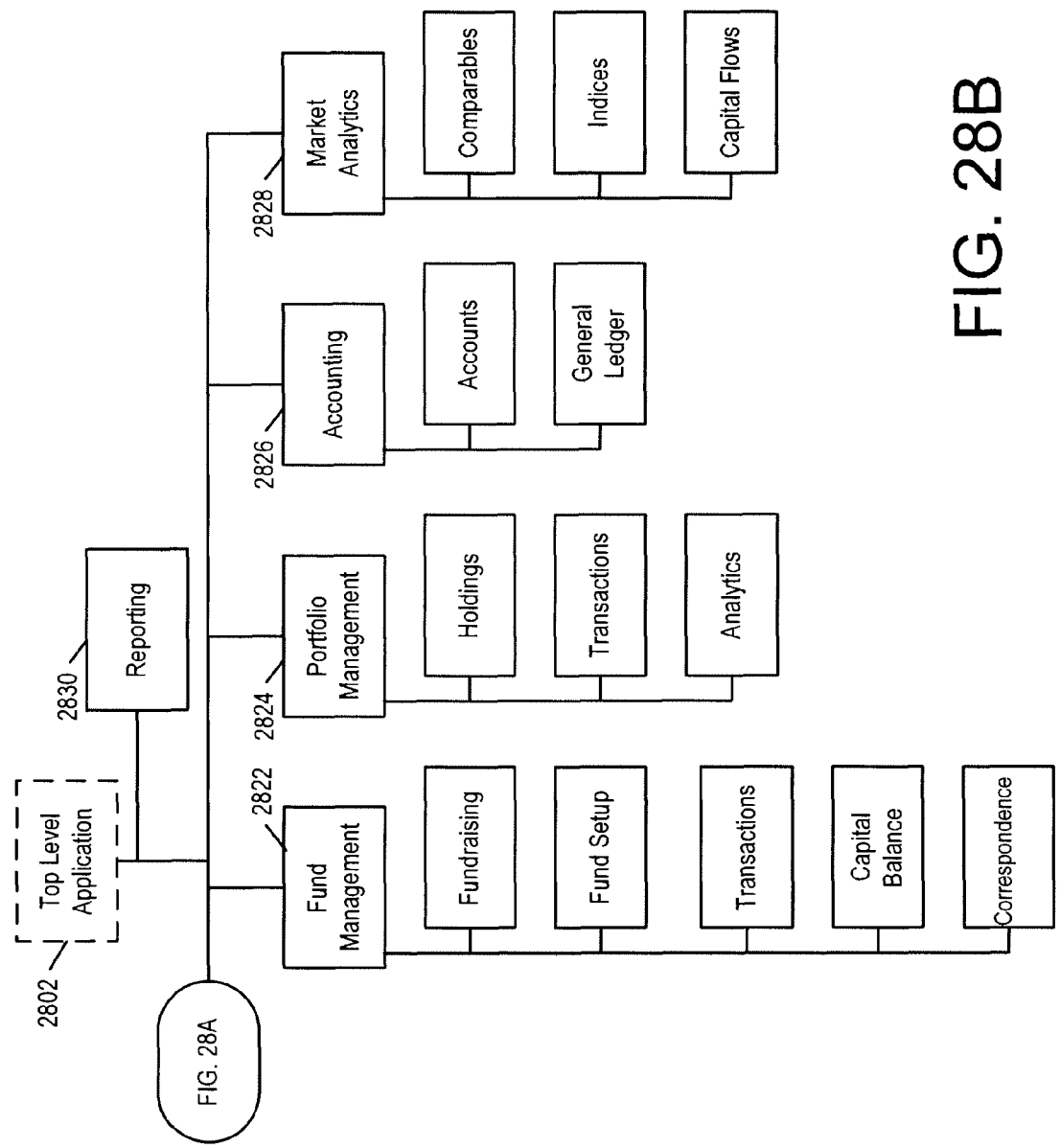

Referring now to FIGS. 28A-28B, an alternative layout for the program logic and graphical user interface for the PCMS logic 126 of FIG. 1 is shown. As described above, the PCMS logic 126 may comprise an institutional investor application 202, an individual investor application 204, a company application 206, and an exchange application 208. The applications 202-208 are represented generically by top level application 2802 in FIGS. 28A-28B. The top level application comprises a number of modules 2812-2828 which, in turn, each comprise a number of sub-modules. The graphical user interface may be similarly organized. Thus, rather than have a single layer of tabs 302-2702 as described above, multiple tiers of tabs may be provided. For example, when the user is using the capitalization module 2614, the user may be provided with the ability to drill down into sub-tabs to utilize overview tools, security tools, issuance tools, transactions tools, fundraising tools, and liquidation tools. The modules that form each application 202-208 may be the same or different for each application 202-208. Each of the modules may communicate through a standard interface protocol such that the modules are able to intercommunicate.

In such an arrangement, the applications 202-208 may be configured generally as described above in connection with FIGS. 1-27. The company application 206 allows companies to log and track investors in their company. The company application 206 is also used to communicate with such investors and keep the investors up-to-date with investment status and analytics. The company application 206 also automates the transfer of data between a company and investors and provides the foundation for a secondary private equity market. The company application 206 is a base application where most of the information contained on the tabs is data that is entered from users and not transferred from other applications. The two main modules in the company application are the company summary module 2814 and the capitalization module 2816 which contain the securities information pertaining to the company. The capitalization module 2816 contains information about each security/warrant/options/debt transaction executed by the company as well as issuance information. The company summary module 2814 has the company market information, capitalization overview, market analytics and liquidation analytics.

The starting point for companies is to fill in the company summary tabs and populate the contacts module with board members, officers, employees and contact people. Issuance and transaction information may also be populated and may be used to consolidate and calculate information to pass along to investors. Other modules that complete the company application are the contact management module 2818, the scheduling module 2820, and the reporting module 2830. These modules may be standard in each of the applications and transfer data between each of the different applications. The contact management module 2818 may also include investor certification. Investors are certified in order to gain access to the private capital management system 100. The certification information is part of their contact information stored in the contact management module 2818. The certification process allows company capitalization data to be transferred to their investor application on a regular schedule. The scheduling module 2820 includes batch processing, project management, time line analysis, and activity tracking. The scheduling module 2820 is able to accept requests for information from investor applications. The report generation module 2830 has a predefined set of reports that may be generated. Some of the reports may be created internally and other reports will export data to generate the reports in outside applications.

The investor application in FIGS. 28A-28B may be used by individual investors or institutional investors. The investor application is modular so modules may be added as needed. The different modules may include fund management module 2822, portfolio management module 2824, deal flow management module 2812, and market analytics module 2828. Such modules may work independently or in concert with the other modules. Potential investors in the fundraising are added via the contact management module 2818 and are certified before being accepted in the fund. The fund manager enters each investor's information and interacts with the PCMS logic 126 to follow the certification process. The fund setup sub-module receives information about potential investments from the company application 206 of companies planning a new round of financing. Once the fund has agreed to invest in a company, the fund information is pushed to a company indications of interest issuance database along with certification information. The portfolio management module 2824 receives information from companies where the fund has investments. Capitalization table data is transferred to the module 2824 periodically from the company summary module 2814 of each company where the fund has investments. The fund manager may also request capitalization data as well as c data from companies. The accounting module 2826 may be used to track portfolio status. The deal flow management module 2812 receive data from the company applications 206 on their investment status. In addition to company summary and capitalization data, companies may also send financial data. This information is used to track deals of an institutional investor's portfolio. The market analytics module 2828 receives company summary and capitalization data for their current investments as well as anonymous company data used to track their portfolio performance. Anonymous company data is provided by PCMS logic 126 and not directly from the individual companies.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented data processing system comprising:
   a data storage system that receives and stores financial information regarding capitalization and financial performance of companies, the capitalization including equity securities and debt securities issued by the companies and traded in private capital markets, the investors having ownership interests in the equity securities and the debt securities; and
   a processor and computer-readable media, the computer readable media having instructions stored therein that when executed by the processor cause the processor to implement capital management logic, the capital management logic being accessible to a plurality of users by way of a communication network, the plurality of users including companies, institutional investors, individual investors, and exchanges, the capital management logic being configured to facilitate pre-financing and post-financing transactions and other interactions between the companies, the institutional investors, the individual investors, and the exchanges throughout one or more rounds of financing of the companies, the capital management logic being configured to track the capitalization and financial performance of the companies.

2. A system according to claim 1, wherein the transactions are conducted through the system, and wherein the system collects data regarding the transactions as the transactions occur, wherein the capital management logic comprises logic to facilitate creation of securities and to receive data regarding the transactions between the companies and the investors including the issuance of the equity securities and the secondary market trading of the equity securities.

3. A system according to claim 2, wherein the capital management logic includes project management logic configured to create a project plan for a due diligence project during the pre-financing interactions, the project plan comprising activities performed by individuals on different sides of the pre-financing interactions, the capital management logic being configured to facilitate communication of messages between the individuals on the different sides of the pre-financing interactions, and the capital management logic being configured to dynamically update information regarding status of activities to reflect tasks performed by the individuals on the different sides of the pre-financing interactions.

4. A computer-implemented data processing system comprising:
   a data storage system that receives and stores financial information regarding capitalization and financial performance of companies, the capitalization including equity securities and debt securities issued by the companies and traded in private capital markets, the investors having ownership interests in the equity securities and the debt securities; and
   a processor and computer-readable media, the computer readable media having instructions stored therein that when executed by the processor cause the processor to implement capital management logic, the capital management logic accessible to a plurality of users by way of a communication network, the plurality of users including companies and investors in the companies, the capital management logic being configured to facilitate transactions between the companies and the investors including issuance of securities by the companies, the securities including debt securities and equity securities, the capital management logic being further configured to facilitate transactions between the investors including secondary market trading of the securities, and the capital management logic being configured to track the capitalization and financial performance of the companies.

5. A system according to claim 4, wherein the transactions are conducted through the system, and wherein the system collects data regarding the transactions as the transactions occur.

6. A system according to claim 5, wherein the capital management logic further comprises logic configured to aggregate and anonymize the data regarding the transactions and to generate market analytics information for presentation to a user based on the aggregated and anonymized data regarding the transactions.

7. A system according to claim 4, wherein the capital management logic comprises security logic and security transactions logic, the security logic being configured to facilitate the creation of equity securities, and the security transactions logic being configured to receive data regarding the transactions between the companies and the investors including the issuance of the equity securities and the secondary market trading of the equity securities.

8. A system according to claim 7, wherein the capital management logic comprises traunches logic, the traunches logic being configured to facilitate issuance of multiple traunches of a security, including being configured to facilitate calculation of a share price for a traunche based on a proposed valuation and proposed issue amount to facilitate comparison by a user of financing scenarios and an impact of the financing scenarios on capitalization of a company.

9. A system according to claim 8, wherein the traunches logic includes term sheet generation logic configured to generate a term sheet for the financing, the term sheet being generated reflecting a share price, total shares issued, and a structure of the financing.

10. A system according to claim 4, wherein the capital management logic comprises options logic and options transactions logic, the options logic being configured to facilitate the issuance of options in equity securities, and the options transactions logic being configured to receive data regarding the transactions between the companies and the investors involving the options.

11. A system according to claim 10, wherein the options logic comprises binomial pricing logic, the binomial pricing logic being configured to provide a valuation of options based on a discrete-time framework analysis.

12. A system according to claim 4, wherein the capital management logic comprises debt logic and debt transactions logic, the debt logic being configured to facilitate the issuance of debt, and the debt transactions logic being configured to receive data regarding the transactions between the companies and the investors involving the debt.

13. A system according to claim 4, wherein the network is the Internet.

14. A computer-implemented data processing system comprising:
- a data storage system configured to receive and store financial information relevant to companies, investors, and exchanges, the information comprising information regarding capitalization and financial performance of the companies, the capitalization including equity securities and debt securities issued by the companies and traded in private capital markets, the investors having ownership interests in the equity securities and the debt securities, the exchanges operating as brokers that bring together the investors with various ones of the companies and/or other ones of the investors;
- a processor and computer-readable media, the computer readable media having instructions stored therein that when executed by the processor cause the processor to implement capital management logic, the capital management logic being configured to track the capitalization and financial performance of the companies, the capital management logic including
    - a company application accessible by way of the communication network to companies, the company application comprising program logic to configure the data processing system to provide the companies with access to at least some of the information in the data storage system;
    - an investor application accessible by way of a communication network to investors, the investor application comprising program logic to configure the data processing system to provide the investors with access to at least some of the information in the data storage system; and
    - an exchange application accessible by way of the communication network to companies, the exchange application comprising program logic to configure the data processing system to provide the exchanges with access to at least some of the information in the data storage system.

15. A system according to claim 14, wherein the company application is configured to permit companies to create and issue securities and to maintain capitalization tables reflecting the creation and issuance of the securities, and wherein the system is configured to dynamically update the capitalization tables to reflect debt conversions and exercised stock options.

16. A system according to claim 15, wherein the investor application is configured to permit investors to view the capitalization tables reflecting the creation and issuance of the securities, wherein the investor application is configured to permit the investors to engage in secondary market trading of the securities.

17. A system according to claim 16, wherein the exchange application is configured to permit investors to register and accredit the companies and the investors.

18. A system according to claim 16, wherein the system is further configured to be accessible by secondary stakeholders including bankers, attorneys and accountants associated with respective ones of the investors and the companies.

19. A system according to claim 14, wherein the network is the Internet.

20. A computer-implemented data processing system comprising a processor and stored program logic that is executable by the processor, the program logic being configured to cause the processor to:
- (A) receive registration and accreditation information to register and accredit companies and investors;
- (B) receive due diligence information including due diligence project plans, due diligence activity assignments, and due diligence documents;
- (C) receive financial information regarding financing of the companies including
    - (1) information regarding the creation of securities of the companies, the securities including debt and equity securities traded in private capital markets,
    - (2) information regarding transactions involving the securities, including information regarding debt conversions and exercised stock options and information regarding primary and secondary market trading of the securities;
- (D) track the capitalization and financial performance of the companies, including
    - (1) dilution analysis to provide assessments of additional issuances of securities,
    - (2) liquidation analytics to provide assessments of payouts in the event of liquidation of one of the companies,
    - (3) comparables analysis to compare individual companies with other companies reflecting a aggregated and anonymized version of the information regarding the transactions involving the securities;
- (E) provide access to the registration and accreditation information, the due diligence information, the financial information, and results of the financial analysis to the companies, the investors, and the exchanges and to secondary stakeholders associated with one or more of the companies, the investors, and the exchanges.

* * * * *